US012523991B2

(12) United States Patent
LaChappelle et al.

(10) Patent No.: US 12,523,991 B2
(45) Date of Patent: Jan. 13, 2026

(54) SYSTEMS AND METHODS FOR DETECTING AND ADDRESSING ISSUE CLASSIFICATIONS FOR OBJECT SORTING

(71) Applicant: COGNEX CORPORATION, Natick, MA (US)

(72) Inventors: Shane LaChappelle, South Lyon, MI (US); Julie Juhyun Lym, Somerville, MA (US); John Jeffrey Link, Mount Juliet, TN (US)

(73) Assignee: COGNEX CORPORATION, Natick, MA (US)

( * ) Notice: Subject to any disclaimer, the term of this patent is extended or adjusted under 35 U.S.C. 154(b) by 904 days.

(21) Appl. No.: 17/681,359

(22) Filed: Feb. 25, 2022

(65) Prior Publication Data
US 2022/0269251 A1 Aug. 25, 2022

Related U.S. Application Data

(60) Provisional application No. 63/153,583, filed on Feb. 25, 2021.

(51) Int. Cl.
B07C 3/14 (2006.01)
B07C 5/10 (2006.01)
G05B 19/418 (2006.01)
G06K 7/14 (2006.01)

(52) U.S. Cl.
CPC .......... *G05B 19/41865* (2013.01); *B07C 3/14* (2013.01); *B07C 5/10* (2013.01); *G06K 7/1413* (2013.01); *G05B 2219/45047* (2013.01)

(58) Field of Classification Search
CPC ....... G05B 19/41865; B07C 3/14; B07C 5/10; B07C 5/1413; B07C 5/3412; G06K 7/1413
See application file for complete search history.

(56) References Cited

U.S. PATENT DOCUMENTS

| 7,161,688 B1* | 1/2007 | Bonner ............... B07C 3/00 356/627 |
| 9,446,908 B2* | 9/2016 | Danelski ............. G06K 7/0004 |
| 11,376,637 B2* | 7/2022 | De Bruijn ............ B65G 47/244 |
| 2009/0060259 A1 | 3/2009 | Goncalves |
| 2010/0059589 A1 | 3/2010 | Goncalves et al. |
| 2010/0217678 A1 | 8/2010 | Goncalves |
| 2013/0020391 A1 | 1/2013 | Olmstead et al. |
| 2021/0101755 A1* | 4/2021 | Wagner ............. B65G 47/1471 |
| 2021/0185233 A1 | 6/2021 | Kempf et al. |

\* cited by examiner

*Primary Examiner* — Patrick H Mackey
(74) *Attorney, Agent, or Firm* — Quarles & Brady LLP

(57) ABSTRACT

Some embodiments of the disclosure provide systems and methods for improving sorting and routing of objects, including in sorting systems. Characteristic dimensional data for one or more objects with common barcode information can be compared to dimensional data of another object with the common barcode information to evaluate a classification (e.g., a side-by-side exception) of the other object. In some cases, the evaluation can include identifying the classification as incorrect (e.g., as a false side-by-side exception).

20 Claims, 23 Drawing Sheets

SYSTEMS AND METHODS FOR DETECTING AND ADDRESSING ISSUE CLASSIFICATIONS FOR OBJECT SORTING

CROSS-REFERENCE TO RELATED APPLICATIONS

This application claims priority to U.S. Patent Application No. 63/153,583 filed Feb. 25, 2021, and entitled, "Systems and Methods for Detecting and Addressing Issue Classifications for Object Sorting," which is hereby incorporated by reference in its entirety.

STATEMENT REGARDING FEDERALLY SPONSORED RESEARCH

Not applicable.

BACKGROUND

Sorting systems generally facilitate the movement of objects though transport systems (e.g., in a logistical object distribution system). As objects move through transport systems, issues can arise that may affect the efficiency and accuracy of routing for the objects. For example, some scans may result in side-by-side classifications that indicate, correctly or incorrectly, that multiple objects are traveling in too-close adjacency for reliable scanning or sorting. Upon receiving a side-by-side or other issue classification for certain objects, known systems can route the objects accordingly, including by recirculating the objects for rescanning or manual intervention.

SUMMARY

Some embodiments of the disclosure provide a computer-implemented method for a sorting system, the sorting system configured to determine dimensions for objects traveling through the sorting system on a single trigger and decode barcodes on the objects. The method can include determining, using one or more processor devices, that side-by-side classifications have occurred for one or more objects associated with common barcode information. The method can include determining, using the one or more processor devices, dimensional data for each of the one or more objects, and determining, using the one or more processor devices, that a plurality of the side-by-side classifications are false side-by-side exceptions. The method can include determining, using the one or more processor devices, common characteristic dimensional data of the one or more objects based on the dimensional data, and associating, using the one or more processor devices, the common characteristic dimensional data with the common barcode information. The method can include using the one or more processor devices, providing the associated common characteristic dimensional data to a runtime module of the sorting system for identification of further false side-by-side exceptions associated with the common barcode information. The method can include obtaining, using the runtime module, barcode information and dimensional data for a runtime that is traveling through the sorting system, and identifying, using the runtime module, a side-by-side classification for the runtime object. The method can include identifying, using the runtime module, the side-by-side classification of the runtime object as a further false side-by-side exception, to control routing of the runtime object, based on comparing the barcode information for the runtime object to the common barcode information and comparing the dimensional data for the runtime object to the common characteristic dimensional data.

In some embodiments, determining that a plurality of side-by-side classifications are false side-by-side exceptions can be based on user input associated with common barcode information.

In some embodiments, a user input can be received based on presenting a representation of at least one of one or more objects to a user for visual identification of whether a side-by-side classification is applicable.

In some embodiments, the method can include presenting to a user, using one or more processor devices, a representation of at least one of one or more objects based on determining that side-by-side classifications satisfy a predetermined threshold. For example, a predetermined threshold can include at least one of a total number of side-by-side classifications, a rate of side-by-side classifications, or a percentage of a total number of objects traveling through a sorting system over a period of time that is constituted by a plurality of false side-by-side exceptions.

In some embodiments, a user input can indicate one or more dimensional thresholds to be associated with a common barcode.

In some embodiments, a user input can cause further common characteristic dimensional data to be associated with a common barcode.

In some embodiments, dimensional data can include at least one of a width of one or more objects, a length of one or more objects, a height of one or more objects, or a volume of one or more objects.

In some embodiments, dimensional data can include each of a width, length, height, and volume of the one or more objects.

In some embodiments, obtained barcode information for the runtime object can be associated with only a single-barcode read.

In some embodiments, the common characteristic dimensional data can include or can be associated with a dimensional threshold. Comparing dimensional data with the common characteristic dimensional data can include determining, using a runtime module, whether the dimensional data is within or exceeds the dimensional threshold. The method can include identifying, using a runtime module, based on the dimensional data being within the dimensional threshold, a side-by-side classification of the runtime object as a further false side-by-side exception. The method can include allowing, using the runtime module, the runtime object to pass through a sorting system unimpeded based on determining that the side-by-side classification is false.

In some embodiments, a method can include determining updated common characteristic dimensional data associated with common barcode information based on dimensional data for the runtime object, and identifying a subsequent side-by-side classification of another object as a false side-by-side exception based on the updated characteristic dimensional data.

In some embodiments, determined side-by-side classifications for one or more objects can include a plurality of side-by-side classifications for at least one of: multiple scans of a same object during repeated travel through a sorting system, or separate scans of at least a first object and a second object.

In some embodiments, associating, using the one or more processor devices, the common characteristic dimensional data with the common barcode information can be based on the dimensional data for each of the one or more objects or the false side-by-side exceptions.

In some embodiments, comparing the barcode information for the runtime object to the common barcode information and comparing the dimensional data for the runtime object to the common characteristic dimensional data can include identifying one or more of: a match between the barcode information for the runtime object and the common barcode information; or a match between the dimensional data for the runtime object and the common characteristic dimensional data.

Some embodiments of the disclosure provide a computer-implemented method for object sorting. The method can include determining, using one or more processor devices, that an issue classification has been repeated for one or more objects, each having a respective barcode with common barcode information, and determining, using the one or more processor devices, that the repeated issue classification is an incorrect issue classification for at least one of the one or more objects. The method can include determining, using the one or more processor devices, characteristic dimensional data for the at least one of the one or more objects based on dimensional data for each of the at least one of the one or more objects. The method can include associating, using the one or more processor devices, the characteristic dimensional data with the common barcode information that is associated with the incorrect issue classification. The method can include obtaining, using the one or more processor devices during runtime, barcode information and dimensional data for an object that is traveling through the sorting system, and identifying, using the one or more processor devices, a runtime instance of the issue classification for the object. The method can include determining, using the one or more processor devices, that the runtime instance of the issue classification for the object is a further incorrect issue classification, based on identifying the barcode information for the object as being the common barcode information and comparing the dimensional data for the object with the characteristic dimensional data associated with the common barcode information.

In some embodiments, a repeated issue classification can be one or more of an adjacency classification or a multi-code classification.

In some embodiments, a repeated issue classification can be one or more of a side-by-side classification or a single-object classification.

Some embodiments of the disclosure provide a sorting system. The sorting system can include a transport system configured to move objects through the sorting system, a dimensioner configured to obtain dimensional data for objects moving through the sorting system, a barcode scanner configured to scan barcodes on objects moving through the sorting system, and one or more processor devices in communication with the transport system, the dimensioner, and the barcode scanner. The one or more processor devices can be configured to determine that side-by-side classifications have occurred for one or more objects associated with common barcode information and that a plurality of the side-by-side classifications are false side-by-side exceptions. The one or more processor devices can be configured to determine characteristic dimensional data associated with the common barcode information based on the dimensional data for the one or more objects obtained using the dimensioner, and to obtain, using the dimensioner, dimensional data for an object moving through the sorting system during runtime. The one or more processor devices can be configured to obtain, using the barcode scanner, barcode information for the object moving through the transport system, the barcode information having the common barcode information, and to identify a side-by-side classification for the object. The one or more processor devices can be configured to determine that the side-by-side classification for the object is a false side-by-side exception, based on the dimensional data and the characteristic dimensional data, and based on determining that the side-by-side classification is a false side-by-side exception, to control routing of the object via the transport system.

In some embodiments, one or more processor devices can be configured to control the routing of the object by at least one of negating a side-by-side classification for an object, preventing recirculation of the object through a transport system, or ignoring the side-by-side classification for movement of the object by the transport system.

In some embodiments, the sorting system can include an imaging device configured to obtain images of objects moving through the sorting system. One or more processor devices can be further configured to present one or more images of one or more objects to a user, and to identify one or more false side-by-side exceptions based on user input associated with the presented one or more images.

In some embodiments, one or more processor devices can be configured to determine, during runtime, updated characteristic dimensional data associated with a common barcode based on obtaining further dimensional data for a further one or more objects moving through a sorting system during runtime.

Some embodiments of the disclosure provide a method for sorting objects using a sorting system. The method can include obtaining barcode information and dimensional data for one or more objects that are traveling through the sorting system. The dimensional data can be at least one of a width of the one or more objects, a length of the one or more objects; a height of the one or more objects, or a volume of the one or more objects. The method can include identifying a side-by-side classification for the one or more objects, and ignoring the side-by-side classification for routing of the object, based on the dimensional data being within a dimensional threshold associated with the barcode information.

In some embodiments, a side-by-side classification can be identified based on dimensional data.

In some embodiments, a dimensional threshold can designate a dimensional range.

In some embodiments, barcode information can indicate a single-barcode read for an object.

Some embodiments of the disclosure provide a method for training a sorting system. The sorting system can be configured to determine dimensions for objects traveling through the sorting system and to decode barcodes on the objects. The method can include determining that a plurality of side-by-side classifications have occurred for one or more objects having common barcode information. The method can include obtaining dimensional data for each of the one or more objects, and based on determining that the side-by-side classifications are false side-by-side exceptions, associating the dimensional data with the common barcode information. The method can include providing the associated dimensional data to a runtime module of the sorting system for identification of further false side-by-side exceptions associated with the common barcode information.

In some embodiments, dimensional data can be associated with common barcode information as a dimension threshold corresponding to one or more objects.

In some embodiments, a dimensional threshold can indicate a range of volumes associated with the common barcode information.

In some embodiments, associating dimensional data with common barcode information can be based on receiving user input that can indicate an acceptable association of dimensional data for identifying false side-by-side exceptions.

Some embodiments of the disclosure provide a method for sorting objects. The method can include receiving a dimensional threshold associated with a plurality of objects having a common barcode, receiving a runtime barcode read for an object that identifies the common barcode information, and receiving runtime dimensional data for the object. The method can include identifying a side-by-side classification for the object, and determining that the side-by-side classification is a false side-by-side exception based on the received barcode read and comparison of the runtime dimensional data with the dimensional threshold.

In some embodiments, identifying a side-by-side classification can be based on runtime dimensional data.

In some embodiments, the method can include during a training process, determining a dimensional threshold based on obtaining multiple sets of dimensional data for multiple side-by-side classifications associated with the common barcode.

In some embodiments, a dimensional threshold can indicate a range of acceptable dimensions for determining that a side-by-side classification is a false side-by-side exception.

Some embodiments of the disclosure provide a method for a sorting system. The sorting system can be configured to determine dimensions for one or more objects traveling through the sorting system on a single trigger and to decode barcodes on the objects. The method can include determining that a plurality of side-by-side classifications have occurred for one or more objects having common barcode information, obtaining dimensional data for each of the one or more objects, determining that the plurality of side-by-side classifications are false side-by-side exceptions, and associating the dimensional data with the common barcode information based on the determination of the false side-by-side exceptions. The method can include providing the associated dimensional data to a runtime module of the sorting system for identification of the false side-by-side exceptions associated with the common barcode, obtaining barcode information and dimensional data, by the runtime module, for an object that is traveling through the sorting system, the dimensional data being at least one of a width of an object, a length of an object, a height of an object; or a volume of an object. The method can include identifying a side-by-side classification for the object, by the runtime module, and ignoring the side-by-side classification for routing of the object, based on the dimensional data being within a dimensional threshold associated with the common barcode information.

In some embodiments, determining that side-by-side classifications are false side-by-side exceptions can be based on user input.

Some embodiments of the disclosure provide a sorting system. The sorting system can include a transport system that can include a conveyor that supports and moves one or more objects along the conveyor. The sorting system can include a dimensioner that can be configured to obtain dimensional data of the one or more objects, as the one or more objects move along the conveyor. The sorting system can include a barcode scanner that can be configured to scan one or more barcodes of each of the one or more objects to obtain corresponding barcode information as the one or more objects move along the conveyor. The sorting system can include one or more computing devices in communication with the dimensioner and the barcode scanner. The one or more computing devices can be configured to obtain, using the dimensioner, first dimensional data of a first object that moves along the conveyor, obtain, using the barcode scanner, first barcode information of the first object, identify, using the first dimensional data, or the first barcode information, an issue classification for the first object corresponding to a first routing path for the first object within the transport system, determine, using the dimensional data and the first barcode information, that the issue classification is false, based on the first dimensional data; and control routing of the first object within the transport system along the first routing path or a second routing path that is different from the first routing path, based on the issue classification for the first object having been determined to be false.

In some embodiments, one or more computing devices can be configured to determine that an issue classification is false by determining, using first barcode information, that a first object has common barcode information with a first type of object, and identifying characteristic dimensional data associated with the common barcode information. Determining that the issue classification is false, using the first dimensional data, can include comparing first dimensional data with the characteristic dimensional data of the first type of object, and based on the comparing of the first dimensional data with the characteristic dimensional data, determining that the issue classification is false.

In some embodiments, characteristic dimensional data can include a dimension threshold. Comparing first dimensional data with characteristic dimensional data can include comparing a dimension of the first dimensional data to the dimension threshold, and based on the dimension of the first dimensional data being within the dimension threshold, determine that the issue classification is false.

In some embodiments, one or more computing devices can be configured to receive a respective common dimension for each of at least one object that is of the first type of object, generate, using the at least one respective common dimension for the at least one object, a statistical model for the common dimension, and determine a dimensional threshold using the statistical model of the dimension.

In some embodiments, at least one object that is of a first type of object is a plurality of objects of the first type. Generating a statistical model can include as each object of the plurality of objects of the first type moves past a dimensioner, iteratively update a running average of the common dimension. The running average of the common dimension can be based on a subset of the plurality of objects.

In some embodiments, one or more computing devices can be configured to control a routing of a first object by at least one of removing an issue classification for the first object, preventing recirculation of the first object through a transport system, or ignoring the issue classification for the first object so that the first object travels through the transport system unimpeded.

In some embodiments, a sorting system can include a redirection device that can be positioned downstream of a dimensioner and a barcode scanner. The redirection device can be configured to move one or more objects to a second routing path from a first routing path. One or more computing devices can be configured to control the routing of a first object by preventing the redirection device from moving the first object to the second routing path, thereby allowing the first object to continue traveling along the first routing path on the conveyor past the redirection device.

In some embodiments, one or more computing devices can be configured to determine that an issue classification is false by determining a probability value for a type of issue classification that includes the issue classification, based on a number of events in which the issue classification is actually false, and based on the probability value, determining that the issue classification is false. The number of events can include a first event of the first type of object, and a second event of a second type of object that is different than the first type of object.

In some embodiments, one or more computing devices can be configured to determine that an issue classification is false by comparing a probability value to a threshold probability value, and based on the probability value being greater than the threshold probability value, determining that the issue classification is false.

In some embodiments, an issue classification can be a first type of issue classification. One or more computing devices can be configured to determine a reference classification rate can for the first type of issue classification, and a runtime classification rate for issue classifications of the first type of issue classification, and to determine that the issue classification is false based on comparing the runtime classification rate to the reference classification rate.

In some embodiments, one or more computing devices can be configured to determine that an issue classification is false based on determining that a runtime classification rate exceeds a threshold associated with a reference classification rate (e.g., a constant or proportional threshold above the reference classification rate).

In some embodiments, one or more computing devices can be configured to determine that an issue classification is false by identifying an issue classification rate of a first type of issue classification that can include the issue classification, comparing the issue classification rate to a threshold issue classification rate, and determining that the issue classification for the first object is false, based on the issue classification rate being greater than the threshold classification rate. The threshold issue classification rate can be of the first type of issue classification for multiple different types of objects.

In some embodiments, one or more computing devices can be configured to determine that an issue classification is false by determining, using first barcode information, that a first object has common barcode information with a first type of object, and determining that the issue classification is false, based on the common barcode information. The common barcode information can indicate that a type of issue classification that is the same as the issue classification is false.

In some embodiments, an issue classification can be a first issue classification of a first type and first barcode information can include common barcode information. One or more computing devices can be configured to determine that the first issue classification is false based on identifying a plurality of previous events. Each of the previous events having a respective object with the common barcode information, and each of the previous events having a second issue classification of the first type of issue classification that have been previously determined to be false.

In some embodiments, one or more computing devices can be further configured to determine that a first issue classification is false based on presenting to a user an image of at least one of the objects of the previous events in response to one or more of a number of the previous events exceeding a threshold number of events, or a frequency of the previous events exceeding a threshold frequency, receiving, from a user input device, a user input indicating that the issue classification for the at least one object is false, and associating the common barcode information with a false classification, based on the user input.

In some embodiments, an issue classification can be a first issue classification. One or more computing devices can be configured to determine that the issue classification is false by determining that first barcode information includes common barcode information associated with a first type of object, determining, using the common barcode information, a value of the first type of object, determining that the value of the first object exceeds criteria, based on the value of the first object exceeding the criteria, querying a database that has a validity for a type of issue classification that is associated with the common barcode information, the type of issue classification can be the same type as the first issue classification, and based on the validity being false for the type of issue classification, determining that the first issue classification is false.

In some embodiments, an issue classification can be a side-by-side classification.

In some embodiments, a sorting system can include a redirection device that can be positioned downstream of a dimensioner and a barcode scanner. A redirection device can be configured to move one or more objects to a second routing path from a first routing path. One or more computing devices can be configured to determine an issue classification for a first object, and determine the issue classification is false for the first object before the first object travels past the redirection device.

In some embodiments, a conveyor can be configured to move one or more objects along the conveyor at a speed of greater than or equal to 1 meter per second.

In some embodiments, a computing device of a barcode scanner can be configured to determine an issue classification for a first object, based on first dimensional data, or first barcode information, determine that an issue classification is false, and control routing of the first object within a transport system, using a redirection device, based on the issue classification for the first object having been determined to be false.

Some embodiments of the disclosure provide a method of sorting an object. The method can include receiving, with one or more processor devices, first dimensional data of a first object as the first object moves along a conveyor, receiving, with the one or more processor devices, first barcode information of the first object as the first object moves along the conveyor, identifying, with the one or more processor devices, an issue classification for the first object, identifying, with the one or more processor devices, common barcode information included in the first barcode information, the common barcode information being associated with objects of a first type, determining, with the one or more processor devices, that the issue classification is false, based on comparing the first dimensional data with characteristic dimensional data associated with the common barcode information, and controlling, with the one or more processor devices, a routing of the first object within the transport system based on the issue classification for the first object having been determined to be false.

In some embodiments, a method can include identifying, using first dimensional data or first barcode information, an issue classification for a first object that can be a first type of issue classification, identifying, using the first barcode information, common barcode information including an issue classification rate associated with the common barcode information, comparing the issue classification rate to a threshold issue classification rate of the first type of issue classification, and determining that the first issue classification is false, based on the issue classification rate exceeding the threshold issue classification rate.

In some embodiments, a method can include receiving a plurality of previous events. Each of the previous events can have a respective object with the common barcode information, and each of the previous events can have a second issue classification of the first type of issue classification. The issue classification for the first object can be of the first type of issue classification. The method can include presenting to a user, with one or more computing devices, an image of at least one of the objects of the previous events in response to one or more of a number of the previous events exceeding a threshold number of events, or a frequency of the previous events exceeding a threshold frequency. The method can include receiving, from a user input device, a user input indicating that the issue classification for the at least one object is false, associating the common barcode information with a false classification for the first type of classification, based on the user input, and determining, with the one or more processor devices, that the issue classification is false, based on the common barcode information being associated with the false classification for the first type of classification.

Some embodiments of the disclosure provide a sorting system. The sorting system can include a transport system including a conveyor that supports and moves one or more objects along the conveyor, a dimensioner that is configured to obtain dimensional data of the one or more objects, as the one or more objects move along the conveyor, a barcode scanner that is configured to scan one or more barcodes of each of the one or more objects to obtain corresponding barcode information as the one or more objects move along the conveyor, and one or more computing devices in communication with the dimensioner and the barcode scanner. The one or more computing devices can be configured to obtain, using the dimensioner, dimensional data for each object of a plurality of objects of a first type of object, obtain, using the barcode scanner, barcode information for each of the plurality of objects, determine, using the dimensional data for each of the plurality of objects, characteristic dimensional data, determine, using the barcode information for each of the plurality of objects, common barcode information, and associate the characteristic dimensional data with the common barcode information.

In some embodiments, an issue classification can be at least one of an adjacency classification, a side-by-side classification, a multi-code classification, or a single-object classification.

Some embodiments of the disclosure can include a sorting system. The sorting system can include a transport system including a conveyor that supports and moves one or more objects along the conveyor, a dimensioner that is configured to obtain dimensional data of the one or more objects, as the one or more objects move along the conveyor, a barcode scanner that is configured to scan one or more barcodes of each of the one or more objects to obtain corresponding barcode information as the one or more objects move along the conveyor, and one or more computing devices in communication with the dimensioner and the barcode scanner. The one or more computing devices can be configured to obtain, using the dimensioner, first dimensional data of a first object, obtain, using the barcode scanner, first barcode information of the first object, identify, using the first dimensional data or the first barcode information, an issue classification for the first object that is a first type of issue classification, identify, using the first barcode information, common barcode information including an issue classification rate associated with the common barcode information, compare the issue classification rate to a threshold issue classification rate of the first type of issue classification, determine that the first issue classification is false, based on the issue classification rate exceeding the threshold issue classification rate, and control routing of the first object within the transport system, based on the issue classification for the first object having been determined to be false.

In some embodiments, one or more computing devices can be configured to determine an issue classification for a subset of plurality of objects having common barcode information, each issue classification can be a first type of issue classification, determine an issue classification rate for the first type of issue classification, based on a subset of a plurality of objects having the issue classification relative to a total number of the plurality of objects, and associate the issue classification rate with the common barcode information.

Some embodiments of the disclosure provide a sorting system. The sorting system can include a transport system including a conveyor that supports and moves one or more objects along the conveyor, a dimensioner that is configured to obtain dimensional data of the one or more objects, as the one or more objects move along the conveyor, a barcode scanner that is configured to scan one or more barcodes of each of the one or more objects to obtain corresponding barcode information as the one or more objects move along the conveyor, and one or more computing devices in communication with the dimensioner and the barcode scanner. The one or more computing devices can be configured to obtain, using the dimensioner, dimensional data for a first object, obtain, using the barcode scanner, barcode information for the first object, identify for the first object, an issue classification that is a first type of issue classification, identify, using the first type of issue classification, a probability value associated with the first type of issue classification, compare the probability value to a threshold probability value, determine that the issue classification is false, based on the probability value exceeding the threshold probability value, and control routing of the first object within the transport system, based on the issue classification for the first object having been determined to be false.

In some embodiments, one or more computing devices can be configured to obtain, using a dimensioner, dimensional data for each object of a plurality of objects that are of a plurality of different types of objects, obtain, using a barcode scanner, barcode information for each of the plurality of objects, identify an issue classification for each of plurality of objects, each issue classification being the first type of issue classification, determine a total number of issue classifications for the plurality of objects that are false, determine the probability value for the first type of issue classification, based on the total number issue classifications that are false, and the number of the plurality of objects, and associate the probability value with the first type of issue classification.

In some embodiments, a statistical model can include a dimensional threshold that can be a standard deviation about an average of a dimension.

In some embodiments, a dimension can be at least one of a length, a height, a width, a volume, or a weight.

In some embodiments, determining a probability value can include receiving a number of events that have been determined to have a type of issue classification, determining a subset of the events in which the type of issue classification is false, and determining the probability value, based on the subset of the events having been determined to have false, and the number of events having been determined to have the type of issue classification.

In some embodiments, common barcode information is a universal product code (UPC).

In some embodiments, a sorting system can include an imaging device that can be configured to obtain one or more images of objects moving through the sorting system. The imaging device can be at least one of a dimensioner, or a barcode scanner.

In some embodiments, an object is at least one of a box, a parcel, or a package.

In some embodiments, a conveyor can be configured to move the one or more objects along the conveyor at a speed of less than 3.3 meters per second.

In some embodiments, a sorting system can include a presence sensor in communication with one or more computing devices. The one or more computing devices can be configured to: receive, from the presence sensor, a trigger event indicative of a first object being sensed by the presence sensor, and based on the trigger event, obtain first dimensional data and first barcode information of the first object.

BRIEF DESCRIPTION OF THE DRAWINGS

The accompanying drawings, which are incorporated in and form a part of this specification, illustrate embodiments of the disclosure and, together with the description, serve to explain the principles of embodiments of the disclosure.

DETAILED DESCRIPTION

Figure 1:
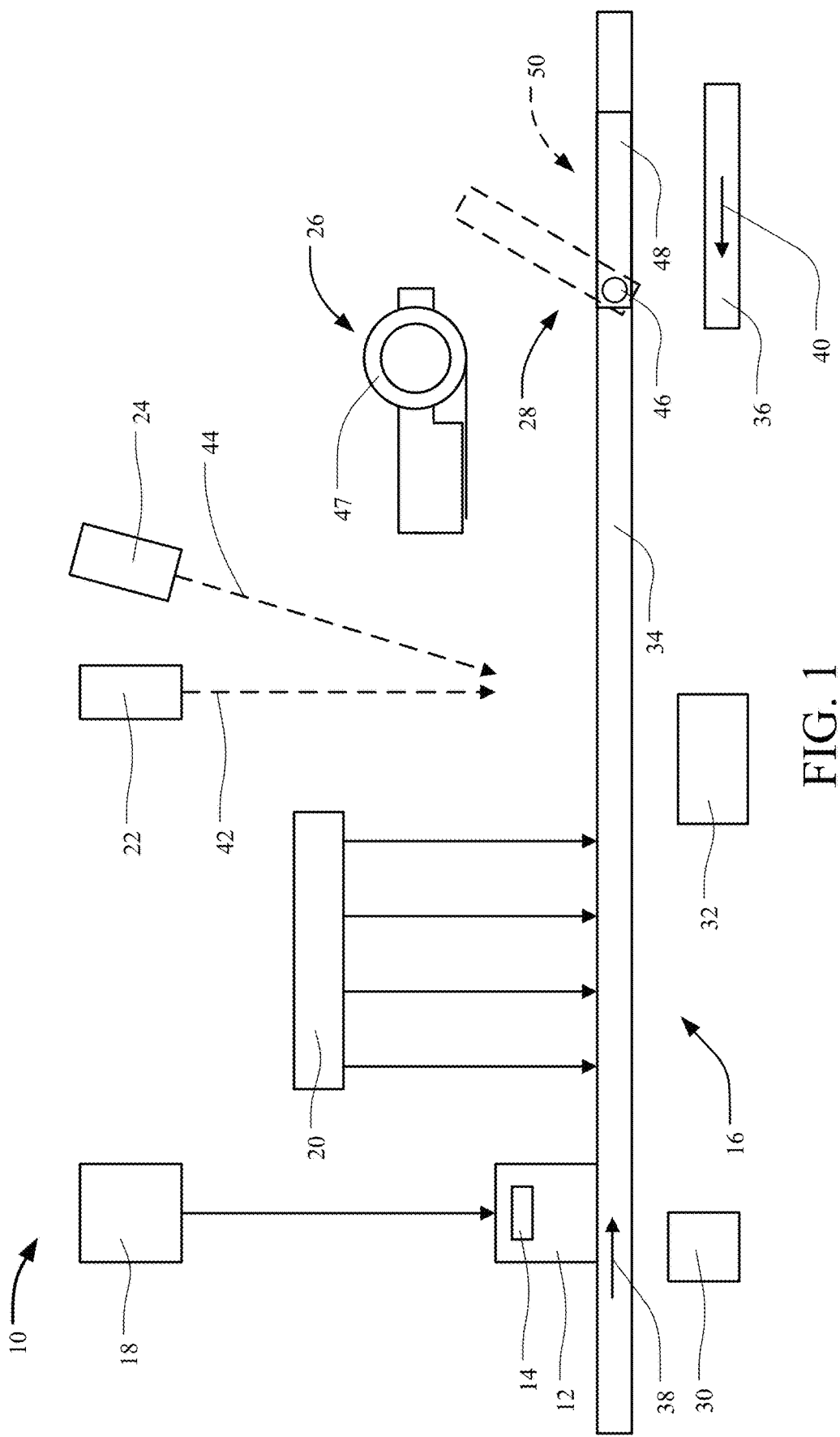
FIG. 1 shows a schematic illustration of a system for analyzing, sorting, etc., one or more objects that pass by (or through) the system.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

In some embodiments, aspects of the disclosure, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the disclosure, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g. "one or the other but not both") when preceded by terms of exclusivity, such as "either," "one of," "only one of," or "exactly one of."

Also as used herein, unless otherwise defined or limited, "common barcodes" refers to barcodes (e.g., 1D or 2D barcodes) that are identical to each other, with respect to the information encoded therein. For example, objects that each have a 1D barcode with the same pattern of barcode lines can be described as having a common barcode. Similarly, "common barcode information" refers to identical information that is encoded in multiple barcodes (e.g., 1D or 2D barcodes), potentially excluding timing patterns, position patterns, alignment patterns, and other non-substantive information. Accordingly, common barcodes generally include common barcode information. Further, in some cases, common barcode information may also imply common barcodes.

While some examples below focus largely on "common barcodes" and "common barcode information," in some configurations the systems and processes herein can be used for "common symbols" and correspondingly "common symbol information." Accordingly, "barcode" can generally be replaced with "symbol" throughout the description, as appropriate. In this case, for example, "common symbols" refers to symbols (e.g., barcodes, DPM text, or other symbols) that are identical to each other, with respect to the information encoded therein. Similarly, "common symbol information" refers be identical information that is encoded in multiple symbols (e.g., multiple instances of a barcode, DPM text, or other symbol), potentially excluding non-substantive information (e.g., consumer direct markings not indicative of identifying information for package routing). For example, "common symbol information" can be an alpha-numeric string (e.g., of at least two characters or numbers, a character and a number, etc.), a numeric string (a number, at least two numbers, etc.), etc., that is the same, and thus is derivable from each of the same symbols from the same type of object. As another example, "common symbol information" can be one or more attributes that are shared by symbols for the same type of object, such as, for example, a size of the symbol (e.g., a width of a symbol, a length of the symbol, an area of the symbol, etc.), a type of the symbol (e.g., 1 1D symbol, a 2D symbol, etc.), a registration mark of the symbol, a trademark of the symbol, a graphic of the symbol, etc., so that the presence of the one or more attributes indicates that the object is of a specific type of object.

Similarly, although some examples below discuss satisfaction of a threshold as a criteria for analysis or determination of an issue classification (e.g., determining whether or not the issue classification is false), other example analyses can rely on determining whether or not a parameter (e.g., dimensional data) satisfies other criteria (e.g., sufficient similarity to a characteristic dimensional data, as indicated by standard statistical measures, adherence to manufacturing tolerances or standards, etc.). In this case, for example, satisfying a criteria (e.g., exceeding a threshold) can indicate that the validity for an issue classification is false, whereas not satisfying the criteria (e.g., not exceeding the threshold) can indicate that the validity for the issue classification is true. In some configuration, including as further presented below, certain criteria can include one or more thresholds (e.g., one or more dimensional thresholds), which can be a fixed value, a moving value (e.g., a moving average, a moving standard deviation, both a moving average and a moving standard deviation, etc.), a range, etc. Thus, for example, assessment of a threshold criteria may include determining whether a particular value is above a threshold value, below a threshold value, or within or outside of a threshold range. In other configurations, the criteria can be a statistical model, which can include one or more thresholds, which can be updated periodically, based on, for example additional data.

The following discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The following detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

While conventional sorting systems have been proven effective at handling vast numbers of objects—saving considerable time, resources, and cost—these sorting systems are not perfect. For example, objects (e.g., packages) that are routed incorrectly can pose a number of issues for not only the facility in which the sorting system operates (e.g., a warehouse), but also the downstream entities (or logistics) that depend on the sorting system(s). As an example, for the facility within which the sorting system operates, an object that is flagged with an issue classification by the system (e.g., as a side-by-side scan or as a multi-code read) can require repeated recirculation through the sorting system before being appropriately routed, or can require direct intervention by operators to address the issue. Either case can increase resource demands or decrease efficiency for the facility, including by decreasing throughput by reintroducing objects that could have been otherwise sorted, or by requiring an operator's time to address the issue. As another example, an object that was sorted incorrectly can end up in the wrong final location (e.g., a warehouse bin, delivery vehicle, or downstream entity). This can lead to escalating inefficiencies and errors.

As alluded to above, sorting of objects can in some cases include assigning classifications to the objects. For example, as an object travels through a transport system (e.g., along a conveyor), the object can be scanned. As a result, information about the object can be identified, including whether a decodable barcode is present, whether there are multiple decodable barcodes, what dimensions the object exhibits, where one or more edges of the object may be located, and so on. Based on this information, a classification can then be assigned, as appropriate. For example, if a dimensional (or other) scan suggests that multiple objects are traveling next to each other so as to be too close for appropriate scanning or sorting, a "side-by-side" ("SBS") classification may be assigned. As another example, if the obtained barcode information suggests that there are multiple barcodes present, which may indicate multiple objects being present, a "multi-code" classification can be assigned. As yet another example, if a dimensional scan suggests that there is an unexpected shape profile for the one or more objects (e.g., an irregular shape that does not match previously scanned shapes of objects) then an unexpected shape classification (or in other words an irregular shape classification) can be assigned. As yet another example, if a dimensional scan suggests that one object is resting on top of another object, a "stacked" configuration can be assigned (e.g., as a special case of a multi-code, a SBS classification, or an unexpected shape profile).

Once a classification (or more than one classification) has been assigned to an object, a transport system may then route or otherwise process the object based on the classification(s). For example, if an object has been designated with an SBS classification, a transport system may recirculate the object to be rescanned or for operator intervention to separate the adjacent objects from each other.

As a related issue, a substantial number of classifications using conventional systems may be incorrect. Accordingly, a substantial number of objects may be routed incorrectly, including for repeated recirculation or for manual intervention. For example, in some cases a package may be incorrectly assigned an SBS classification, despite in reality being only a single package. In this case, a conventional sorting system may continuously recirculate this package, with a high likelihood of repeated incorrect SBS classifications, or may route the package to a region that requires operator involvement (e.g., manually sorting of the object). Again, either case may require considerable resources, particularly when affecting large-scale transport systems that may process many thousands of packages an hour.

In this context, some embodiments of the disclosure can provide improved systems and methods for sorting (and routing) objects. In particular, some embodiments can help to mitigate incorrect classifications of objects traveling through a sorting system, thereby improving the efficiency with which the objects can be correctly routed (e.g., by preventing unnecessary recirculation of the object). For example, some embodiments can analyze classifications applied to an object and determine whether an exception to the classification is justified (i.e., whether the classification is incorrect and should be fixed). If so, routing of the object may then proceed based on the exception (e.g., rather than the underlying classification).

Generally, some embodiments of the disclosure can evaluate classifications based on dimensional information associated with the classified objects. For example, characteristic dimensional data, e.g., average height, length, width, or volume, can be associated with a particular object type via association of the characteristic dimensional data with common barcode information that is associated with objects of that type. In this regard, a set of objects with the same type may have common characteristic dimensional data (i.e., an identical set or range of characteristic dimensional data that is shared by all objects of the set). In the event that a particular object associated with the common barcode information is later classified in a particular way (e.g., with an SBS classification), dimensions of the particular object can be compared to the relevant common characteristic dimensional data to help evaluate whether the classification is correct. For example, if a runtime object has been assigned an SBS classification, but measured dimensions of the object fall within an expected (e.g., statistically determined) range of dimensions for other objects that have common barcode information as the runtime object, it may be determined that the SBS classification is inappropriate (i.e., that the SBS classification should be designated as a false SBS exception).

In this regard, for example, some embodiments of the disclosure provide a sorting system having a dimensioner (e.g., a time-of-flight ("ToF") sensor) that is configured to determine one or more dimensions of passing objects, and a symbol scanner (e.g., an imaging device, line scanner, dedicated barcode scanner, etc.) that is configured to obtain barcode information from barcodes on the objects. Thus, during a scanning event for objects traveling through the sorting system, the sorting system can identify barcode information from barcodes on the objects, and can also identify actual dimensions of the objects. For particular events, the sorting system can then analyze the identified barcode and dimension data to determine whether or not to apply a particular classification to the event (e.g., to one or more objects associated with the event), or to determine whether or not an already-applied classification is correct.

In some implementations, a sorting system can record and analyze statistical information for multiple events to determine if and how to analyze whether or not classifications for subsequent events are correct. For example, a sorting system can select a plurality of events that are associated with common barcode information and with a common classification. The events can then be analyzed in order to identify statistical patterns that may inform analysis of subsequent related classifications. For example, if a sufficient number or rate of events associated with common barcode information and a particular classification (e.g., a side-by-side classification) are identified, subsequent events associated with the common barcode information and the same particular classification may be identified as being relevant for further analysis.

In some cases, these sets of common barcode information and a repeated classification can be identified automatically. In some cases, they may be identified based on user input. For example, once a sufficient number or rate of relevant events have been identified, a user can be alerted and input requested from the user regarding whether the events seem to include false classifications. This may be useful, for example, in order to help efficiently flag for further review like candidates for false classifications (or other problems), based on repeated classifications of a set of similar objects (or of the same object, repeatedly recirculated), including for particular types of objects with common barcode information that are repeatedly flagged with SBS classifications.

In some configurations, a sorting system can record barcode and dimensional data from multiple events and flag a particular common barcode and classification for further analysis based upon satisfaction of a particular condition associated with the events. For example, after a number of events having common barcode information and the same classification exceed a threshold value (e.g., an absolute or relative measure of the number or frequency of the events), the classification and object(s) can be presented to a user to determine whether or not the relevant classification is correct. For example, a representation (e.g., an image) of a representative object of a set with repeated SBS classifications can be presented to a user, so that the user can visually identify whether the SBS classification is correct or whether an exception should be applied. In some cases, using suitable machine learning algorithms, for example, the sorting system can automatically determine whether or not a common classification for a group of events is correct.

Once a classification has been analyzed for a set of events (e.g., by a user, as discussed above), further sorting of similar objects can proceed accordingly. For example, if the classification is determined to be correct, the sorting system may not implement further measures (e.g., may subsequently route objects having the common barcode information according to the classification), or may otherwise indicate that further evaluation of the validity of the classification may not be needed for subsequent similar objects traveling through the sorting system. However, if the classification is determined to be incorrect, or at least to be incorrect for a significant number of the events (e.g., a majority, or another proportion identified by a default or user-provided value), remedial measures may be taken, including as further described below.

In some embodiments, when a classification for a set of related events (e.g., objects with common barcode information) is determined to be incorrect, a sorting system can flag the common barcode information for automated evaluation of a similar classification during subsequent events. For example, a sorting system can associate characteristic dimensional data for an object with a particular common barcode or barcode information, and can evaluate the accuracy of future classifications for that common barcode or barcode information based in part on the characteristic dimensional data. For example, if previous operations (e.g., including user input) have determined that an SBS classification for an object with particular common barcode information and a particular characteristic dimensions (e.g., a range of widths, heights, lengths, or volumes) is not correct, future SBS classifications of objects that share the common barcode information and appropriately match the characteristic dimensions may be automatically designated as false SBS exceptions. As appropriate, the SBS classifications can be ignored during further routing of the associated objects.

In some embodiments, a sorting system can automatically determine characteristic dimensional data for a group of events having common barcode information, including runtime or pre-runtime operations. As also noted above, for example, some embodiments can identify sets of events that have common barcode information and classifications (e.g., during pre-runtime training). In some cases, dimensional data for the objects associated with those events can be determined and saved, to create a record of dimensions that have been historically associated with particular common barcode information and one or more particular classifications (e.g., an SBS classification). The collected dimensional data can then be analyzed in order to identify characteristic dimensional data for the object(s) that are associated with the particular events (and classification(s)).

Generally, characteristic dimensional data indicates a value or range of value for one or more dimensional aspects of an object (or objects) that may be associated with a particular set of events (e.g., with particular common barcode information). In some embodiments, characteristic dimensional data can include all (or a subset) of the dimensional data for the group of events (e.g., expressed as one or more ranges of possible dimensions), a curve or other model of dimensional data determined from the relevant dimension (e.g., length, width, height, volume, etc.) for the group of events, statistical information (e.g., a mean, a standard deviation, a confidence interval, etc.) for the distribution of dimensional data for one or more dimensions for the group of events, etc. For example, this can include a running average of one or more dimensions, a weight, etc., for the same type of object, which can include a subset of the one or more dimensions (e.g., only a subset of particular events). As another example, this can include a running average of a standard deviation of one or more dimensions, a weight, etc., for the same type of object (e.g., only a subset of particular events).

Generally, after characteristic dimensional data has been determined, it can be associated with the relevant common barcode information. For example, characteristic dimensional data can be stored in a look-up table to be associated with common barcode information that is associated with the objects that were analyzed in order to determine the characteristic dimensional data. Further, in some cases, characteristic dimensional data can be iteratively updated, including by conducting dimensional analysis as discussed above, but based on subsequent events that are associated with the relevant common barcode information and classification. In some cases, characteristic dimensional data can be predetermined, without analysis of actual object dimensions by a sorting system. For example, dimensional data can sometimes be obtained from outside databases or other data sources that may provide predetermined ranges of dimensions that are associated with objects that share common barcode information.

Once identified, characteristic dimensional data that is associated with common barcode information and a particular classification can be utilized (e.g., by a runtime module) for analysis of subsequent objects that travel through the sorting system. For example, as also generally discussed above, after determining associated characteristic dimensional data for common barcode information and a particular classification, a sorting system can determine the dimension(s) and barcode information of a further object traveling through the system. If the sorting system also determines a relevant classification for the object as well as the relevant common barcode information (i.e., as may indicate the same object or type of object as previously analyzed), the sorting system can test the validity of the classification based on comparing the associated characteristic dimensional data for the common barcode information with obtained (e.g., currently measured) dimensional data for the object. If an appropriate match between the obtained dimensional data and the characteristic dimensional data is identified, the classification can then be determined to be an incorrect classification and, as applicable, ignored or otherwise mitigated.

In some cases, characteristic dimensional data can include or be evaluated based on a threshold, including as may indicate a range of acceptable dimensions for objects having particular common barcode information. For example, characteristic dimensional data associated with particular common barcode information can sometimes be a range that is defined by a mean value for a dimension (e.g., a height) and endpoints (i.e., end thresholds) on either side of the mean (e.g., as defined by one or more multiples of a standard deviation for the dimension). Thus, for example, during runtime, if a determined height of an object with relevant common barcode information is within this range, an associated classification (e.g., an SBS classification) can be deemed to be incorrect. In contrast, if the determined height of the object exceeds this range, the associated classification can be deemed to be correct. In other cases, the characteristic dimensional data can include or be associated with other criteria, such that when dimensional data for an object satisfies the criteria, this indicates that the issue classification for a particular object is false. Including as discussed above, in some configurations, relevant criteria can include one or more dimensional thresholds (e.g., a dimensional range), which can include a dimensional threshold for each type of dimension (e.g., the width, the height, the length, the volume, the weight, the mass, the density, etc.).

In any event, after evaluating the correctness of a classification, a sorting system can control routing of an object accordingly. For example, if the classification is deemed to be incorrect the sorting system can ignore the classification (and potentially remove the classification from the event), and can accordingly allow the object to pass through the sorting system as normal (e.g., unimpeded, without being rerouted, recirculated, or routed to an area for manual sorting of objects). Alternatively, if the classification is deemed correct, the sorting system can route the object according to the classification (e.g., reroute, recirculate, or route to a station for operator intervention). In some embodiments, a sorting system can control routing of an object via transmission of control signals to external devices (e.g., as may be similarly employed for controlling image acquisition, obtaining dimensional data, etc.). For example, to control routing of an object, a sorting system may send a control signal to a central routing managements system or to a particular routing device (e.g., a conveyor or redirection device) to command one or more particular routing operations or paths for one or more objects.

In some embodiments, as briefly noted above, dimensional data obtained after initial evaluation of a classification (e.g., dimensional data obtained during runtime) can be utilized to update characteristic dimensional data associated with particular common barcode information. For example, the processes above including the validity of events determination, the characteristic dimensional data determination, and association of the characteristic dimensional data for events having common barcode information can be used to update the characteristic dimensional data that is associated with particular common barcode information at various intervals. In some cases, these updating intervals can occur daily, weekly, etc., or including directly after receiving the current dimensional data of the subsequent object. This dynamic updating can further refine the characteristic dimensional data, which can improve accuracy (e.g., by increasing the sample size) and allows for adjustments so as to handle external changes (e.g., changes in packaging) for objects having common barcode information.

As a specific example, the dimensional data for events having common barcode information can sometimes form a bimodal (or multimodal) distribution. This may result, for example, due to packaging changes, where one peak relates to the previous packaging and another peak relates to the current packaging. Or similar multi-modal dimensional data may result from packages that exhibit other multi-model dimensional characteristics, including objects that are not reliably scanned by dimensioners (e.g., objects with transparent or other features that are not always recognized by dimensioning scans) and boxes or other packages that frequently come open, with the open and closed flaps (or other features) resulting in different height measurements for different events. Correspondingly, associated characteristic dimensional data can be updated to account for both (or other) dimensional peaks in order to appropriately handle the likely mix of dimensional results during subsequent runtime scans. In some cases, dynamic adjustment in characteristic dimensional data can be supplemented by removing or deleting previous characteristic dimensional data (or events used to derive the characteristic dimensional data) associated with a particular common barcode information (e.g., at various time intervals, or based on user input).

In some embodiments, the specific entity that performs computational tasks according to processes herein and where the entities are located can be advantageous. For example, in logistics settings (e.g., parcel receiving, parcel outgoing, etc.), packages move along a conveyor at relatively fast speeds, which can be greater than 1 meter per second (and less than 3.3 meters per second). These speeds are typically much faster than typical point of sale conveyors (e.g., conveyors at a retail brick and mortar store), and thus, the amount of time allotted between determining an issue and addressing the issue can be quite small, especially considering that, in an ideal case, the issue should be addressed before rerouting the package (e.g., recirculating the package) to maintain high package throughout. In this regard, a sorting system has a limited amount of time allotted to computationally determine an issue is present and address the issue before the package passes by a redirection device that would otherwise move the package to a recirculation route (or other path that requires a user to manually address the package). Thus, the symbol scanner (e.g., a barcode scanner, an imaging device, etc.) implementing computational tasks can be advantageous in that the symbol scanner does not have to query an external database (e.g., a server external to the facility the sorting system is located), which can take considerable time and may typically not even be possible to complete before the package reaches the redirection device. In other words, the time required to query an external database may be too long to complete before the package reaches the redirection device, which would then cause the redirection device to undesirably automatically move the package to recirculate the package.

In some configurations, rather than querying an external database that requires substantial time, a computing device that includes the database can be located within the facility the sorting system is also located within. In this way, the symbol scanner can query the database, via the computing device, relatively quickly because the computing device is in close proximity to the symbol scanner. Thus, advantageously, the symbol scanner can leverage the computing device for computational tasks because the computing device can have a larger computational and memory resources (e.g., so the symbol scanner does not have to store the database, and may not even be able to due to the substantially high number of packages). In some configurations, the symbol scanner (or other computing device) can determine characteristic dimensional data using a subset of the packages of the same type, rather than storing and utilizing data from every package of the same type of package seen by the sorting system. For example, the symbol scanner can update the characteristic dimensional data using the package of the same type last seen by the sorting system, which can include removing data from a previous package of the same type. In this way, the symbol scanner can utilize a moving average of a dimension (and a moving standard deviation of the dimension), which can be less computationally taxing (or less taxing with regard to memory) than storing data from every single event. In some embodiments, the symbol scanner (or other computing device) can iteratively update the characteristic dimensional data, using data for a subsequent package that is the same type of package. For example, for a subsequent package that is of the same type of package as the characteristic dimensional data, a dimension of the subsequent package can be used in the moving average of the dimension (and the moving average of the dimension), which can be less computationally taxing (or less taxing with regard to memory), but can also reflect every package of the same type of package.

In some configurations, the symbol scanner does not have the time to query a database at all (e.g., due to the time constraints of the fast conveyor, which even includes a database stored in the memory of the symbol scanner), or the type of package has not been identified previously by the sorting system (e.g., or there is no data in the database for the type of package). In these cases, however, the symbol scanner can still implement a more accurate package sorting process. For example, a computing device can, for each type of issue classification (e.g., a SBS classification), determine a probability value, which can be used by the symbol scanner to evaluate a validity of a classification. In particular, the computing device can for a plurality of packages (e.g., which can be different types of packages, such as each having different common barcode information) that have been determined previously to have a first type of issue classification, determine which of these packages are false (or true). Then, the computing device can determine the probability value (e.g., 90 percent) for the first type of issue classification by dividing the number of false issue classifications of the first type of issue classification by the total number of packages having the first type of issue classification. After, the computing device can associate the probability value with the first type of issue classification. Then, the symbol scanner (or other computing device, including a computing device of the dimensioner), can compare the probability value (e.g., 90 percent false) to a probability threshold (e.g., 70 percent false), and based on the probability value exceeding the probability threshold, the symbol scanner can determine that the issue classification (e.g., that is of the first type of classification) for a subsequent package is false. In this way, the sorting system can advantageously use historic data from different types of issue classification in the validity determination of similar corresponding issue classifications for subsequent packages.

In some embodiments, utilizing the characteristic dimensional data for validity determination of issue classifications for objects of a particular type (e.g., a package) can be advantageous. For example, in the logistics space, packages in a receiving area (or an outgoing area) can be roughly the same size for one or more dimensions. For example, packages can typically be cuboid in shape, can be clear and contain objects also being clear, etc. Thus, the dimensional variability between these packages can be significantly less than, for example, some objects in the retail environment (e.g., produce). Accordingly, with relatively low dimensional variability, the characteristic dimensional data for a specific type of object can be advantageously used on packages with a high certainty of accurate validity determinations. In other words, because a dimension tolerance is relatively small for a common dimension of objects of the same type, there is a greater confidence that an issue classification can be accurately determined to be false.

FIG. 1 shows a schematic illustration of a system 10 for analyzing, sorting, etc., one or more objects that pass by (or through) the system 10. For example, the system 10 can capture one or more images of one or more sides of one or more objects that pass by or through the system 10. In some cases, the system 10 can evaluate symbols (e.g., barcodes, two-dimensional (2D) codes, etc.) on objects (e.g., including an object 12) moving through the system 10, such as, for example, evaluating an image of a symbol 14 of the object 12. In some embodiments, the symbol 14 can be implemented in different ways. For example, the symbol 14 can be a 1D barcode, a 2D barcode, etc. In some cases, the object 12 (and others that travel through the system 10) can be substantially (i.e., deviating by less than 10 percent from) cuboid. In other cases, however, the object 12 (and others that are moved through the system 10) can have any other suitable geometries. In addition, while the symbol 14 is illustrated as being positioned on a lateral side of the object 12, the symbol 14 can be placed on other sides of the object 12, including, for example, a top side of the object 12.

As shown in FIG. 1, the system 10 can include a transport system 16, a presence sensor 18, a dimensioner 20, imaging devices 22, 24, a printer 26, a redirection device 28, an encoder 30, and a computing device 32. The transport system 16 can be configured to move objects through the system 10 at a consistent rate, and can be implemented in different ways. For example, the transport system 16 can include one or more conveyors, one or more rollers (e.g., a conveyor roller), one or more conveyor belts, one or more translatable linkages, one or more motors (e.g., that power and translate these linkages), one or more sensors (e.g., an encoder, such as a rotary encoder that sense the speed or other aspects of movement of the transport system 16), etc. In some cases, the transport system 16 can include a main conveyor (e.g., a conveyor belt) that objects travel along in one direction, and an ancillary (e.g., recirculating) conveyor (e.g., a conveyor belt) that can connect with the main conveyor, in which objects travel along in another direction (e.g., different than the one direction). In this case, for example, objects that travel along the ancillary (e.g., recirculating) conveyor can eventually return to the main conveyor (e.g., at the start or a different location of the main conveyor belt). As shown in FIG. 1, the transport system 102 can include conveyors 34, 36, each of which can move objects in a different direction. For example, the conveyor 34 can move objects in a direction 38 (e.g., when the objects are supported by the conveyor 34), while the conveyor 36 can move objects in a direction 40 (e.g., when the objects are supported by the conveyor 36). In some cases, the direction 38, 40 can be different (e.g., the directions 38, 40 being opposite).

As shown in FIG. 1, the object 12 can be positioned on the conveyor 34 that is configured to move objects in the direction 38 (e.g., a horizontal direction) at a relatively predictable and continuous rate, or at a variable rate measured by a device, such as an encoder (e.g., the encoder 30). In some cases, the conveyor 34 can move one or more objects in other ways (e.g., with non-linear movement). In some configurations, the conveyor 34 can be configured to move one or more objects along the conveyor 34 at speeds of greater than or equal to 1 meter per second (e.g., including less than 3.3 meters per second), which can be faster than the speeds of conveyors in point of sale situations (e.g., conveyors at a kiosk of a retail store). In some configurations, the conveyor can have a width of 3 feet or greater.

In some embodiments, the presence sensor 18 can detect the presence of the object 12 (or other objects) that travel along the conveyor 34, which can provide an indication for when to obtain one or more images of the object 12. For example, each imaging device 22, 24 can be configured to obtain one or more images based on a single trigger event, which can be detected by the presence sensor 18. As a more specific example, the detection by the presence sensor 18 can indicate that the object 12 is positioned within a field of view ("FOV") of each of the imaging devices 22, 24. The presence sensor 18 can be implemented in different ways (e.g., to detect a presence of an object and subsequently obtain an image based on the detection of the object). For example, the presence sensor 18 can be a photo eye, an array of photo eyes, a laser curtain, a dimensioner, an imaging sensor, a photoresistor, a phototransistor, a time of flight sensor, etc. In some configurations, the presence sensor 18 can be positioned upstream of each of the imaging devices 22, 24. In this way, when the presence sensor 18 senses the object 12, each imaging device 22, 24 can receive an indication to begin obtaining an image of the object 12 (e.g., after a delay). Thus, the positioning of the presence sensor 18 can help to ensure an image of the object 12 can be obtained, such as due to the delay between sensing the presence of the object 12 and obtaining an image of the object 12. While FIG. 1 illustrates the presence sensor 18 as being separate from the imaging devices 22, 24, in other configurations, the presence sensor 18 can be integrated within each imaging device 22, 24. For example, each imaging device 22, 24 can include a presence sensor coupled to (or otherwise integrated within) the respective housing of the imaging device 22, 24.

In some embodiments, the dimensioner 20 can be configured to determine dimensional data (e.g., one or more dimensions) of one or more objects (e.g., the object 12), as the one or more objects travel along the transport system 16

(e.g., travel along the conveyor 34). For example, the dimensioner 20 can determine a height, a length, a width, a volume, etc., of each of the one or more objects. In some cases, the dimensioner 20 can be configured to determine a distance from the dimensioner 20 and to a top surface of the object 12, and can be configured to determine a size or orientation of a surface facing the dimensioner 20. In some embodiments, the dimensioner 20 can be implemented using various technologies. For example, the dimensioner 20 can be implemented using a 3D camera (e.g., a structured light 3D camera, a continuous time of flight 3D camera, etc.). As another example, the dimensioner 20 can be implemented using a laser scanning system (e.g., a LiDAR system), for example, that uses one or more laser curtains. In some configurations, the dimensioner 20 can be implemented using a 3D-A1000 system available from Cognex Corporation. While the dimensioner 20 is illustrated in FIG. 1 as being separate from the imaging devices 22, 24, in other configurations, one or more of the imaging devices 22, 24 can be the dimensioner 20.

In some embodiments, the dimensioner 20 can create a 3D point cloud of the object 12, which can be used to determine the dimensional data (e.g., the volume of the object). In addition, the dimensioner 20 can determine 3D coordinates of each corner of the object 12 in a coordinate space defined with reference to one or more portions of system 10. For example, the dimensioner 20 can determine 3D coordinates of each of eight corners of the object 12 (e.g., that is at least substantially cuboid in shape) within a Cartesian coordinate space defined with an origin at the dimensioner 20. As another example, the dimensioner 20 can determine 3D coordinates of each of eight corners of the object 12 within a Cartesian coordinate space defined with respect to the transport system 16 (e.g., the conveyor 34 in which the Cartesian coordinate space is defined with respect to an origin that originates at a center of conveyor 34).

In some embodiments, each imaging device 22, 24 can each include one or more image sensors, at least one lens arrangement, and at least one control device (e.g., a processor device) configured to execute computational operations relative to the image sensor. In some embodiments, the imaging devices 22, 24 can include or can be associated with a steerable mirror (e.g., as described in U.S. application Ser. No. 17/071,636, filed on Oct. 15, 2020, which is hereby incorporated by reference herein in its entirety). Each imaging device 22, 24 can selectively obtain image data from different fields of view (FOVs), corresponding to different orientations of the associated steerable mirror(s).

In some embodiments, each imaging device 22, 24 can be positioned at an angle relative to the top side of the conveyor 34 (e.g., at an angle relative to a normal direction of symbols on the sides of the object 12 or relative to the direction of travel provided by the conveyor 34), resulting in an angled FOV, while in other configurations, each imaging device 22, 24 can be positioned substantially perpendicular to a top side of the conveyor 34, a direction of travel provided by the conveyor 34, etc. For example, FIG. 1 shows the imaging device 22 having an optical axis 42 that is substantially perpendicular to the direction 38, and the imaging device 24 having an optical axis 44 that is angled relative to the direction 38. In some cases, including when the imaging devices 22, 24 have a corresponding steerable mirror, the optical axes 42, 44 of the respective imaging device 22, 24 can be when a steerable mirror is in a neutral position. In some configurations, the FOV of the imaging device 22 can overlap with the FOV of the imaging device 24. However, in other configurations, the FOV of the imaging device 22 does not overlap with the FOV of the imaging device 24.

In some embodiments, the system 10 can be configured to capture one or more images of one or more sides of one or more objects that are moved by the transport system 16 (e.g., the conveyor 34). These captured images can then be used to identify symbols on each object (e.g., the symbol 14), which can be decoded (as appropriate, such as by the respective imaging device that obtained the image). In some configurations, while two imaging devices 22, 24 are illustrated in FIG. 1, the system 10 can include other numbers of imaging devices, such as, for example, a single imaging device, three imaging devices, four imaging devices. In addition, while the imaging devices 22, 24 are illustrated as being positioned above the conveyor 34, each imaging device 22, 24 can be positioned below the conveyor 34 (e.g., below the conveyor 34 and to a side of the conveyor 34).

Each imaging device 22, 24 can be implemented using any suitable type of imaging device(s). For example, imaging devices 22 can be implemented using 2D imaging devices (e.g., 2D cameras), such as area scan cameras, line scan cameras, etc. In some embodiments, each imaging device 22, 24 can include one or more image sensors (e.g., a CCD or CMOS sensor), at least one lens arrangement, at least one control device (e.g., a processor device) configured to execute computational operations relative to the imaging sensor.

In some embodiments, the printer 26 can be configured to print and apply one or more labels on each object as the object travels along the transport system 16 (e.g., travels along the conveyor 34 and past the printer 26), in which each label can include one or more symbols, such as, for example, a barcode (e.g., a 1D barcode, a 1D barcode, etc.). In some cases, the printer 26 can include a label reel 47, which can provide a stock of labels for printing of the one or more symbols on the label prior to the application on the object. In this regard, the printer 26 can include one or more actuators to extend and thus apply a printed label to the object as the object moves along the transport system 16 (e.g., the conveyor 34). For example, as the object 12 travels along the conveyor 34, the printer 26 can print a label (e.g., in real-time), and can apply the printed label on a surface of the object 12 as the object 12 moves past the printer 26.

As shown in FIG. 1, the printer 26 can be positioned downstream of the dimensioner 20, and the imaging devices 22, 24, which can be advantageous in minimizing reworking of objects (e.g., objects that are to be manually attended to by a user, including a user printing and manually applying the printed label on the object 12). For example, if an issue is determined after obtaining dimensional data, one or more images, etc., but before passing through the printer 26, the printer 26 can print and apply a label to the object as the object passes by the printer 26. In this way, the object does not have to be recirculated, sent to a reworking area, etc., thereby improving efficiency of the system 10. In other words, if the printer 26 was positioned upstream of the imaging devices 22, 24 (and the dimensioner 20), the object must be recirculated in order to print and apply a new label to the object by the printer 26 (e.g., the object must be recognized by the system 10).

In some embodiments, the redirection device 28 can be configured to redirect one or more objects along a different path of the transport system 16, which can include redirecting one or more objects to a recirculation path of the transport system 16 (e.g., that eventually reconnects with an upstream end of the conveyor 34), a reworking path of the transport system 16 (e.g., in which objects are to be manually reworked), etc. The redirection device 28 can be implemented in different ways. For example, the redirection device 28 can include an actuator that can force an object to be moved off of the conveyor 34 (and onto a different conveyor). For example, as shown in FIG. 1, the redirection device 28 can include a platform 48 coupled to the actuator 46. In this way, if the system 10 determines that the object is to be redirected, the system 10 can cause the platform 48 to move away from the conveyor 34 (e.g., lift upwardly), thereby opening a chute 50 to force the object to fall through the chute 50 and be redirected (e.g., by the object falling onto the conveyor 36). As another example, the actuator 46 can be implemented in other ways, in which the actuator 46 can be extended to physically move objects to change a movement path of the object along the transport system 16 (or otherwise redirect the object). For example, the actuator 46 can have a ram that extends to contact an object, pushing the object off the conveyor 34, and onto the conveyor 36.

In some embodiments, the encoder 30 can be linked to the imaging devices 22, 24, and can determine the amount of travel of the conveyor 34, and the one or more objects supported thereon (e.g., the object 12), over a known amount of time. Thus, the encoder 30 can coordinate capture of images of each object (e.g., the object 12), based on calculated locations of the object relative to a field of view of a relevant imaging device. For example, the encoder 30 can generate an encoder pulse count that can be used to identify the position of conveyor 34 along the direction 38. In particular, the encoder 30 can provide the encoder pulse count to a computing device (e.g., the computing device 32) to identify and track the positions of the one or more objects on the conveyor 34. In some embodiments, the encoder 30 can increment an encoder pulse count each time conveyor 34 moves a predetermined distance (encoder pulse count distance) in the direction 38. Accordingly, the position of an object can be determined based on an initial position, the change in the encoder pulse count, and the encoder pulse count distance. Then, when the position between the object and each imaging device 22, 24 is determined to be adequate (e.g., below a threshold), the computing device can cause each imaging device 22, 24 to obtain an image of the object In some embodiments, the computing device 32 can be in communication (e.g., bi-directional communication) with some or all of the components of the system 10. Thus, the computing device 32 can coordinate operations of various components of system 10. For example, the computing device 32 can cause the dimensioner 20 to obtain dimensional data of an object supported by the transport system 16, can cause each imaging devices 22, 24 to obtain one or more images of the object (e.g., including a symbol of the object), can cause the printer 26 to print and apply a label that includes a symbol on the object (e.g., as the object moves past the printer 26), can cause the redirection device 28 to redirect the object (e.g., away from the conveyor 34). As another example, the computing device 32 can control each steerable mirror of each imaging device 22, 24, receive an indication from the presence sensor 18 (e.g., indicating a trigger event, such as a single trigger event), receive encoder data from the encoder 30, analyze one or more images obtained by the imaging device 22, 24 (e.g., decoding one or more symbols), etc. While not shown in FIG. 1, the system 10 can include one or more illumination sources (e.g., each including a light source) to illuminate one or more surfaces of an object, and the computing device 32 can control the operation of the one or more illumination sources (e.g., causing the one or more illumination sources to emit light).

In some embodiments, the computing device 32 can be in communication with other computing devices (e.g., a server), via, for example, a communication network. In this way, the computing device 32 can receive data from, and transmit data to the other computing devices. For example, the computing device 32 can query a database stored on a different computing device, and can receive data from the computing device.

Figure 2:
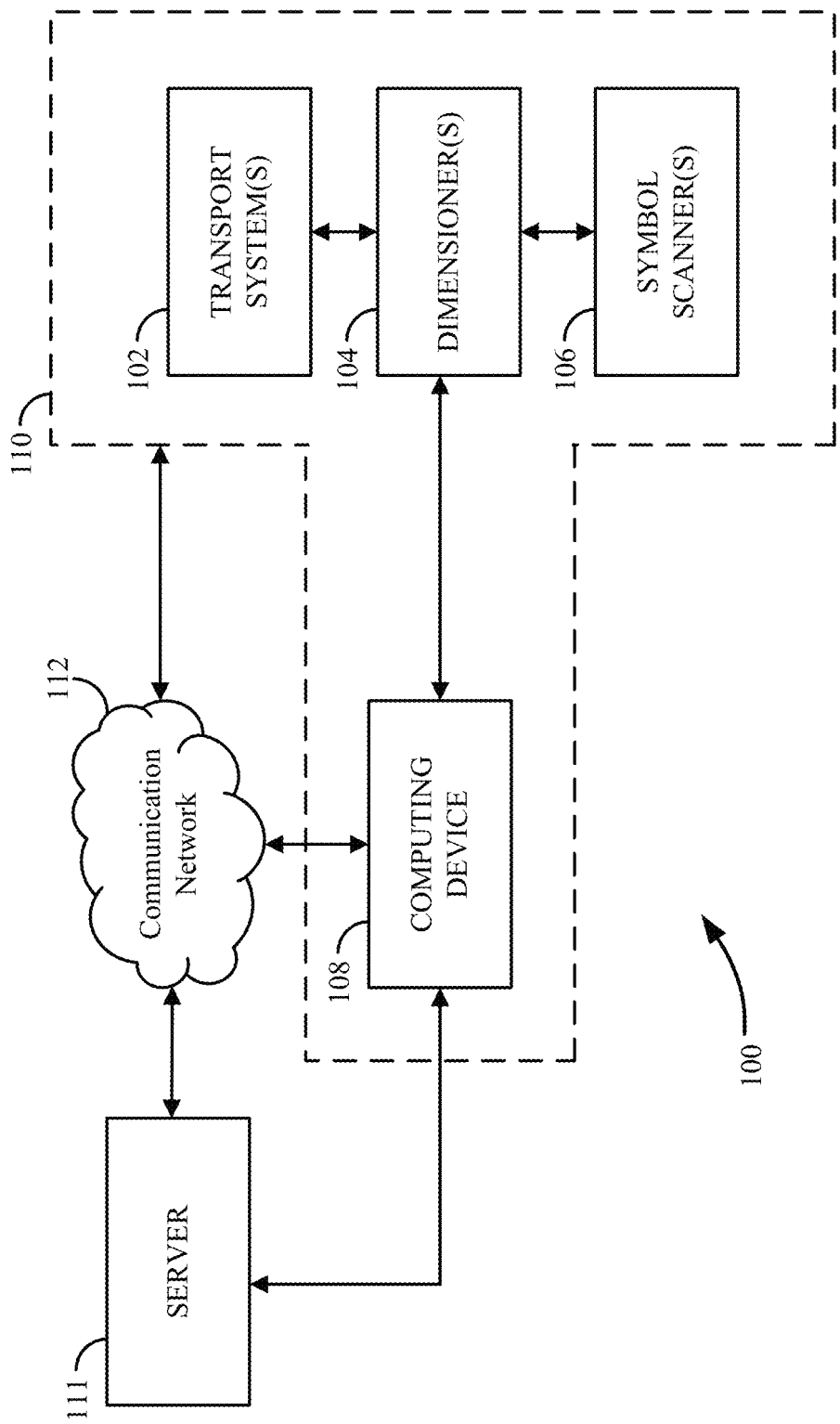
FIG. 2 shows a schematic illustration of another sorting system.

FIG. 2 shows a schematic illustration of a sorting system 100 according to an embodiment of the disclosure. The sorting system 100 can include a transport system 102, a dimensioner 104, a symbol scanner 106, a computing device 108, and a server 111. The transport system 102, the dimensioner 104, the symbol scanner 106, and the computing device 108 can be situated within a facility 110. In some cases, the facility 110 can be an upstream logistical entity (e.g., a parcel distribution warehouse) that supports downstream logistical entities (e.g., retail stores). The transport system 102, the dimensioner 104, the symbol scanner 106, and the computing device 108 can each be in communication (e.g., local communication, such as over WiFi) with each other. Additionally, as shown, the transport system 102, the dimensioner 104, the symbol scanner 106, the computing device 108, and the server 111 can be in communication with each other, via the communication network 112. Although shown external to the facility 110 in FIG. 2, in some cases either or both of the server 111 and the communication network 112 can be partly or wholly contained by the facility 110.

In some embodiments, the communication abilities of these components can include the transmission (and receiving) of data, instructions, etc., between each other. For example, in some configurations, such as when the computing device 108 is remote to the facility 110, the computing device 108 can receive data from each of the transport system 102, the dimensioner 104, and the symbol scanner 106 and can similarly transmit instructions to cause each of the transport system 102, the dimensioner 104, and the symbol scanner 106 to implement particular functionalities. In some embodiments, the computing device 108 can take any of a variety of forms, including traditional computer systems (e.g., a desktop system), mobile devices (including a tablet or a smartphone), etc.

In some embodiments, the transport system 102 supports, moves, and sorts objects to particular intended destinations within a facility. For example, the transport system 102 can receive and translate objects along various paths (e.g., along different conveyor belts), and can physically change the paths objects travel along through the facility (e.g., with an actuating arm). This adjustment of travel paths or other controlled routing of objects within the facility can adjust the final intended destination or other travel characteristics of the object.

The dimensioner 104 and the symbol scanner 106 can be mounted relative to (e.g., above) the transport system 102 to obtain data of the objects as the objects travel along the transport system 102. For example, the dimensioner 104 can, as the objects travel, obtain dimensional data of these objects. This dimensional data can include the length of an object, the width of an object, the height of an object, the volume of an object, etc. In some cases, dimensional data can include other measured aspects of an object, including object weight or other related quantities, although any examples herein focus generally on distance-related dimensions. Additionally, the symbol scanner 106, as objects travel, can scan objects to locate and obtain barcode (or other symbol) data.

The dimensional data obtained from the dimensioner 104, and the barcode data obtained from the symbol scanner 106 can be utilized by a computing device (e.g., the computing device 108) to determine and apply a classification for an object. For example, if the dimensional data obtained for a particular event is indicative of two objects traveling side-by-side (e.g., indicating a gap between objects) the computing device can apply a SBS classification to the event. As another example, if the dimensional data is indicative of two objects traveling side-by-side and the barcode information includes two barcode reads, the computing device can similarly apply an SBS classification to the event.

In some embodiments, the dimensional data obtained by the dimensioner 104 can be used to determine a shape profile of the one or more objects being transported along the transport system 102, the location of the one or more objects relative to a reference location on the transport system 102 (e.g., a centerline of a conveyor), the distance between two packages (e.g., a gap in the direction of travel), a volume of a bounding box that envelopes the one or more objects (e.g., the volume of the 3D shape, such as a rectangular prism, that circumscribes the one or more objects), an actual volume of the one or more objects (or in other words a liquid volume of the one or more objects). In other words, the dimensional data can be either a true dimension of an object (e.g., the true volume), or an estimated dimension of an object (e.g., an estimated volume). In this way, the estimated dimension, which can be obtained more quickly than a true dimension, can still be used in the processes herein (e.g., while providing increased speed in determining the dimensional data).

In some embodiments, the barcode information obtained by the symbol scanner 106 can include, for each event (e.g., as one or more objects travel along the transport system 102), the location on the one or more objects for each identified barcode (e.g., which side of the object each barcode is located on, and any remaining sides of the one or more objects that do not include a barcode), the total number of barcodes identified on the one or more objects, the barcode size for each barcode (e.g., the physical size of the barcode, or the number of pixels per module read by the symbol scanner 106), the symbology type of each barcode, the barcode string for each barcode, the locations of one barcode relative to another barcode (e.g., if more than one barcode is identified), etc.

Figure 4:
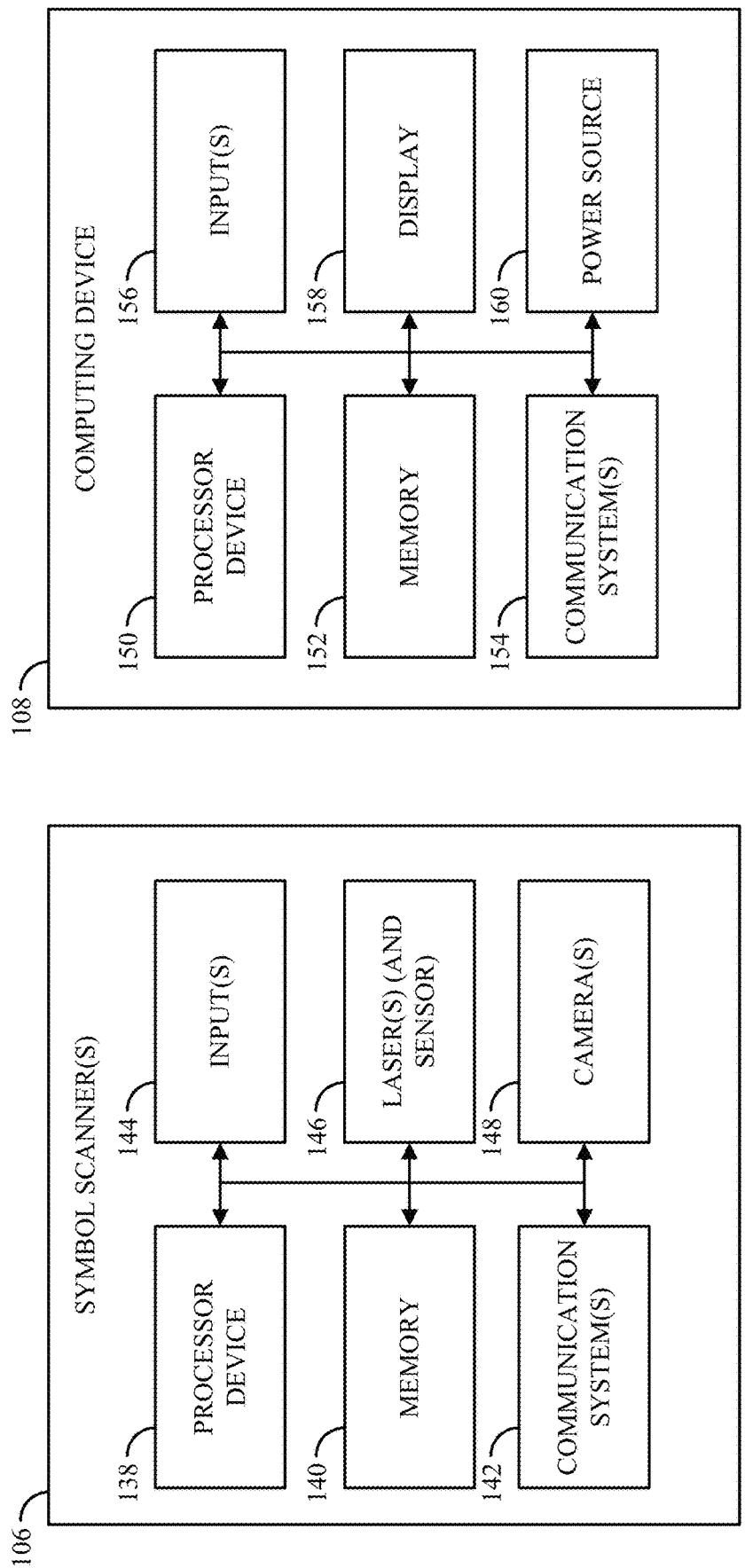
FIG. 4 shows schematic illustrations of the symbol scanner, and the computing device of the sorting system of FIG. 2.

FIG. 4 shows schematic illustrations of the transport system 102, and the dimensioner 104 according to an embodiment of the disclosure. In some embodiments, the transport system 102 can be typically structured, such as including conveyor belts (having rotational encoders), motors, etc. Similarly, the dimensioner 104 can be typically structured, such as including cameras or other light sensors, light sources, etc.

As shown, the transport system 102 can include a processor device 114, memory 116, a communication system 118, an input 120, a conveyor 122 (e.g., a conveyer belt), and an actuator 124. The processor device 114 can control specific features of the transport system 102, such as activating a motor to move objects along the conveyor 122, causing the actuator 124 to move an object from one travel path to another, etc. In some implementations, the processor device 114 can implement some or all of the processes (or methods) described in the present disclosure. The processor device 114 can be any suitable hardware processor or combination of processors, such as a central processing unit ("CPU"), a graphics processing unit ("GPU"), etc., which can execute a program (e.g., retrieved from memory 116), including for one or more of the processes described below.

In some non-limiting examples, the transport system 102 can include memory 116. The memory 116 can include any suitable volatile memory, non-volatile memory, storage, or any suitable combination thereof. For example, the memory 116 can include random-access memory ("RAM"), static random-access memory ("SRAM"), read-only memory ("ROM"), electrically erasable programmable read-only memory ("EEPROM"), one or more flash drives, one or more hard disks, one or more solid state drives, one or more optical drives, etc. In some non-limiting examples, the memory 116 can have encoded thereon a computer program for controlling operation of the processor device 114, including as may be interpreted and executed by the processor device 114 to control other devices.

The communication system 118 can include any suitable hardware, firmware, or software for communicating with components external to the transport system 102. For example, the communications system 118 can include one or more transceivers, one or more communication chips or chip sets, etc. In a more particular example, communications system 118 can include hardware, firmware or software that can be used to establish a coaxial connection, a fiber optic connection, an Ethernet connection, a universal serial bus ("USB") connection, a Wi-Fi connection, a Bluetooth connection, a cellular connection, a serial interface connection, etc.

In some embodiments, the input 120 of the transport system 102 can include actuatable buttons, a keyboard, a mouse, a graphical user interface, a touch-screen display, etc., to provide a user input to the transport system 102. In some configurations, the input 120 can include sensors, data-in pins/connections, data-out pins/connections, etc.

In some embodiments, the conveyor 122 of the transport system 102 can include translatable linkages, motors (e.g., that power and translate these linkages), sensors (e.g., rotary encoders that sense the speed or other aspects of movement of the conveyor 122), etc. In some cases, the conveyor 122 can include a main conveyor belt that objects travel thorough in one direction, and an ancillary (e.g., recirculating) conveyor belt that connects with the main conveyor belt. In this case, for example, objects that travel along the ancillary (e.g., recirculating) conveyor belt may eventually return to the main conveyor belt (e.g., at the start or a different location of the main conveyor belt).

In some embodiments, the actuator 124 can be extended to physically move objects to change a path of conveyance for the object. For example, in some cases the actuator 124 can have a ram that extends to contact an object, pushing it from one transport path (e.g., one conveyor) to another transport path (e.g., a second conveyor). As another example, the actuator 124 can create an opening, which the object travels through, thereby adjusting the current (or future) travel path of the object.

Figure 3:
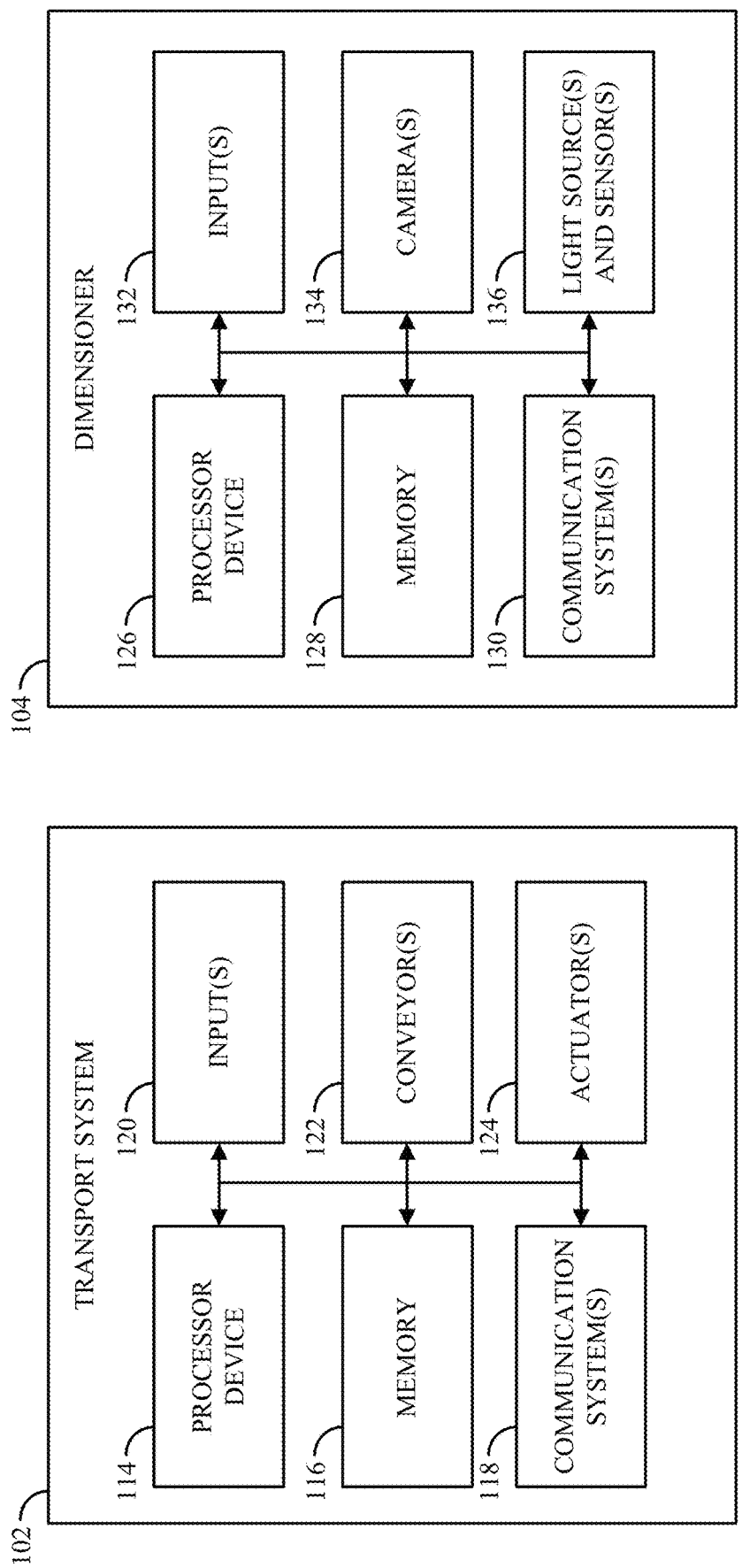
FIG. 3 shows schematic illustrations of the transport system, and the dimensioner of the sorting system of FIG. 2.

As shown in FIG. 3, the dimensioner 104 can include one or more of a processor device 126, memory 128, a communication system 130, an input 132, a camera 134, and a light source and a corresponding sensor 136. Considering that the dimensioner 104 includes similar components as the transport system 102, the descriptions of these components with regard to the transport system 102 also applies to these components of the dimensioner 104. Similarly to the transport system 102, the processor device 126 of the dimensioner 104 can control specific features of the dimensioner 104, such as sensing (and emitting) signals (e.g., obtaining an image), etc. The processor device 126 can implement some or all of the processes (or methods) described in the present disclosure.

In some embodiments, the camera 134 of the dimensioner 104 can include a lens arrangement and an image sensor to obtain image data of an object (as it travels along the transport system 102). In some cases, the processor device 126 can determine dimensions of the object from the image data. The dimensioner 104 can also include a light source and a corresponding sensor 136. For example, this arrangement could be configured as one or more light curtains, such that as the object travels through the light curtain the object obstructs the light path, and thus a dimension of the object can be determined (e.g., the width of the object). As another example, as also noted above, the dimensioner 104 can be a ToF sensor. Regardless of the particular configuration of the dimensioner 104, the dimensioner 104 can generally determine one or more dimensions of the object as it travels along the transport system 102, which can include the width of the object, the length of the object, the height of the object, the volume of the object, etc.

Figure 5:
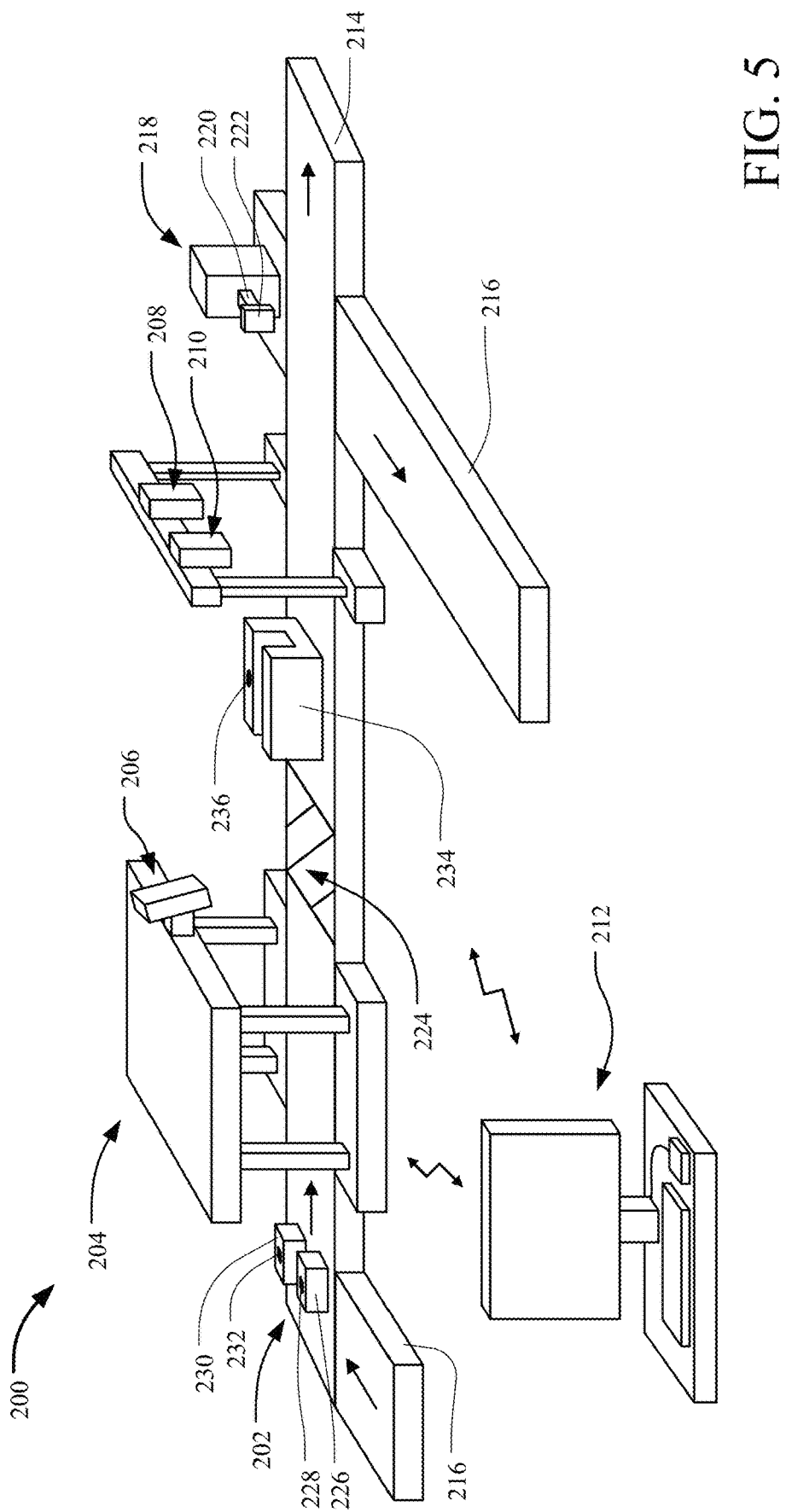
FIG. 5 shows a schematic view of another sorting system.

FIG. 5 shows schematic illustrations of the symbol scanner 106, and the computing device 108 according to an embodiment of the disclosure. In some embodiments, the computing device 108 can be typically structured (e.g., being a desktop, a tablet, a smartphone, etc.). Similarly, the symbol scanner 106 can be typically structured (e.g., as various generally known types of dedicated barcode scanners).

For example, as shown, the symbol scanner 106 can include one or more of a processor device 138, memory 140, a communication system 142, an input 144, a laser 146, and a camera 148. Considering that the symbol scanner 106 includes certain similar components as the transport system 102 (e.g., the processor device 138 and the memory 140), the descriptions of these components with regard to the transport system 102 also applies to these components of the symbol scanner 106. Similarly to the transport system 102, the processor device 138 of the symbol scanner 106 can control specific features of the symbol scanner 106, such as sensing (and emitting) signals (e.g., to obtain an image), etc. The processor device 138 can implement some or all of the processes (or methods) described in the present disclosure.

In some embodiments, the symbol scanner 106 can include a laser 146 (and a corresponding sensor). For example, the laser 146 can be configured to emit light of a particular wavelength, and receive the light (emitted by the laser) that reflects off an object. In some cases, the symbol scanner 106, based on the received light sensed by the sensor, determine symbol information (e.g., barcode information) from each symbol (e.g., each barcode) on the object. In some embodiments, the symbol scanner 106 can include the camera 148 that has a lens arrangement and an image sensor to obtain image data of an object (as the object travels along the transport system 102). In particular, the symbol scanner 106 can obtain image data of a surface of an object that has one or more symbols (e.g., barcodes) to be decoded (e.g., by determining one or more attributes of the symbol, etc.). Regardless of the particular configuration of the symbol scanner 106, the symbol scanner 106 can generally determine symbol information (e.g., barcode information) for each symbol (e.g., barcode) on an object as the object travels along the transport system 102 (e.g., by identifying and decoding each barcode).

As shown, the computing device 108 can include a processor device 150, memory 152, a communication system 154, an input 156, a display 158, and a power source 160. Considering that the computing device 108 includes certain similar components as the transport system 102, the descriptions of these components with regard to the transport system 102 also applies to these components of the computing device 108. Similarly to the transport system 102, the processor device 150 of the computing device 108 can control specific features of the computing device 108, such as presenting a presentation on the display 158, receiving a user input from a user (e.g., via a user input device), etc.

In some embodiments, the computing device 108 can include the display 158. In some embodiments, the display 158 can present a graphical user interface. In some embodiments, the display 158 can be implemented using any suitable display devices, such as a monitor, a touchscreen, a television, etc. In some specific embodiments, the display can be a liquid crystal display ("LCD"), an organic light-emitting diode ("OLED"), etc. In some embodiments, the power source 160, as appropriate, can supply power to all of the components of the computing device 108. Thus, the power source 160 can be implemented in different ways, including being a hardwired connection, an electrical storage device (e.g., a battery), a power supply, etc.

As generally noted above, in some implementations, certain of the components of the sorting system 100 can each be configured to implement functionality for a particular event. For example, the dimensioner 104 and the symbol scanner 106 can be configured to collectively operate during a single event to identify dimensional data and barcode information for a particular object that is moving through a particular area (or areas) of the transport system 102. In some cases, multiple operations can be implemented based on a single trigger. For example, the dimensioner 104 and the symbol scanner 106 can be configured to operate in concert (e.g., simultaneously or in sequence) to obtain dimensional data and barcode information for a particular object based on the object passing an optical eye or other presence sensor or based on encoder-based or virtual tracking of an object through the transport system 102 that provides a common trigger for these (and potentially other) operations.

FIG. 5 shows a schematic view of a sorting system 200, according to an embodiment of the disclosure. The sorting system 200 is a specific implementation of the sorting system 100 and thus the previous description of the sorting system 100 also generally pertains to the sorting system 200.

As shown in FIG. 5, the sorting system 200 includes a transport system 202, dimensioners 204, 206, symbol scanners 208, 210, and a computing device 212. The transport system 202 includes two travel paths 214, 216 that facilitate movement of objects along the respective path (e.g., if an object is supported on the path). Although the entire travel path 216 is not shown in FIG. 5, the travel path 216 can sometimes be configured as a recirculation path, such that the travel path 216 eventually reconnects with the travel path 214, directly or indirectly. For example, a first end of the travel path 216 emanates from a location of the travel path 214, and an opposite second end of the travel path 216 may reconnect with the travel path 214 (e.g., at the start of the travel path 214). Accordingly, an object that is placed on the first end of the travel path 216 can sometimes move along the extent of the travel path 216 and eventually return to the travel path 214 (via the second end of the travel path 214). In other embodiments, however, the travel path 216 may not reconnect with the travel path 214. In some configurations, the travel paths 214, 216 include conveyors, rollers, etc., that can directly (e.g., by a physically moving surface, powered by a motor), or indirectly (e.g., via gravity, such as with rollers) translate and move objects along the respective path 214, 216.

In some embodiments, the transport system 202 can include actuators that can physically move objects from one travel path to another. For example, as shown, the transport system 202 includes an actuator assembly 218 that can physically move an object traveling along the travel path 214 to the travel path 216 (e.g., so that this object travels along the travel path 216 rather than the travel path 214). The actuator assembly 218 includes an actuator 220 and a ram 222 attached to an end of the actuator 220, so that when the actuator 220 extends, the ram 222 contacts and physically moves an object from the travel path 214 to the travel path 216. In some cases, the computing device 212 can cause the actuator to move (extend and retract), such as, by activating a motor within the actuator assembly 218 that when activated extends the actuator 220. In some configurations, the actuator assembly 218 can embody different forms, other than the illustrated embodiment. For example, the actuator assembly 218 can be configured as a chute, that when activated, allows an object to pass through the chute (to travel on a different travel path, so as to adjust routing of the object). Similarly, deactivation of the chute, allows the object to continue passing along the travel path 214. Additionally, while the travel path 216 is illustrated as being a recirculation travel path, in other embodiments, the travel path 216 can be constructed or routed to different locations within the facility. For example, in alternative embodiments, the travel path 216 can lead to a different location as the travel path 214, such as an operator required station. In particular, this operator required station can include those objects that are unable to be properly sorted by the sorting system 200 and must be handled by an operator (e.g., manual routing of the object, adjustment of the object such as removing a faulty or extraneous barcode, etc.).

In the illustrated embodiment, the sorting system 200 includes the dimensioners 204, 206, which can both be typically constructed dimensioners. The dimensioner 204 includes a support structure that surrounds the travel path 214. As objects travel along the travel path 214, the dimensioner 204 is configured to determine various dimensions of the objects, which can include the length, the width, the height, the volume, etc., of the object. For example, the dimensioner 204 can include one or more light curtain assemblies (e.g., including appropriate lights, such as lasers, and corresponding sensors) that can detect a cross-sectional profile of the object as the object passes through the light curtain, which can determine the various dimensional characteristics of the object. The dimensioner 206 is also mounted to the support structure that surrounds the travel path 214, and is configured as an image based dimensioner. For example, the dimensioner 206 can include one or more image sensors with corresponding lens assemblies that can obtain image data, which can be used to determine the various dimensions of the objects (e.g., including the length, the width, the height, the volume, etc., of the object). In particular, the dimensioner 206 can obtain images of various sides of the objects as they travel along the travel path 214 to be used to determine dimensions of these objects. Thus, although not shown in the illustrated embodiment, more than one dimensioner 206 could be oriented to measure different dimensions of the objects.

As shown in FIG. 5, the computing device 212 is in communication with both of the dimensioners 204, 206 and thus the computing device 212 can receive raw (or processed) data from the dimensioners 204, 206. For example, the computing device 212 can receive the time-based cross-sectional profiles from the dimensioner 204, and the images from the dimensioner 206 for subsequent analysis, including to extract the dimensions from the dimensional data. Similarly, the dimensioners 204, 206 can determine the dimensions for each object and transmit these dimensions to the computing device 212.

In the illustrated embodiment, the sorting system 200 includes the symbol scanners 208, 210, which can both be typically constructed. The symbol scanners 208, 210 are coupled to a support structure and are positioned above the travel path 214 so that the field of views of the symbol scanners 208, 210 are directed onto the travel path 214. As objects travel along the travel path 214, the symbol scanners 208, 210 are configured to obtain barcode information of barcodes that are on the objects. For example, the symbol scanners 208, 210 can obtain images of the objects and their corresponding barcodes, locate these barcodes, and decode the barcodes to determine the barcode information. As shown in FIG. 5, the computing device 212 is in communication with both of the symbol scanners 208, 210 and thus the computing device 212 can receive raw (or processed) data from the symbol scanners 208, 210. For example, the computing device 212 can receive the images from the symbol scanners 208, 210 for subsequent analysis, such as to decode and extract barcode information. Similarly, the symbol scanners 208, 210 can determine the barcode information (by obtaining and appropriately decoding) each barcode of each object, and transmit this barcode information to the computing device 212.

In some embodiments, the transport system 202 can include a scale 224 that is fixed relative to the travel path 214, and which allows the weight (or mass, or other pressure or weight distribution) of objects to be sensed as objects travel along the travel path 214. As shown, the scale 224 is separate from other components of the transport system 202, and thus can include the appropriate circuitry to transmit the pressure (or other) data to the computing device 212 (or other device). In some cases, the scale 224 can be integrated within the dimensioner 204, so that the dimensioner 204 can, via the scale 224, determine the weight data (or mass data) of the objects and transmit this data to the computing device 212.

As shown, an object 226 having a barcode 228, and an object 230 having a barcode 232 are supported by and are being transported along the travel path 214. The objects 226, 230 are positioned in an SBS configuration, which can be detected by (or based on information from) either of the dimensioners 204, 206. For example, as these objects 226, 230 pass through the dimensioners 204, 206, the dimensioners 204, 206 can determine the various dimensions of the objects 226, 230 together as one "group" (e.g., the dimensioners 204, 206 assume that object travel single file along the travel path 214) and identify that a spacing between the objects 226, 230 that may not allow proper scanning for barcode information or subsequent sorting.

If it is determined that an issue exists (e.g., inconsistencies with a dimension, such as indicating a gap, non-uniformity of a dimension, etc.), the computing device 212 can flag this particular event (e.g., group of objects) with a classification. For example, the computing device 212 can apply an SBS classification to this event (e.g., to each of the objects 226, 230), which can be used, as appropriate, to adjust routing of the objects 226, 230. For example, the objects 226, 230 may have been previously destined to continue traveling on the travel path 214, but, after application of an SBS classification, can (via instruction by the computing device 212) be transferred from the travel path 214 to the travel path 216 (e.g., via activation of the actuator 220). In this way, the objects 226, 230 can be recirculated for subsequent scanning or other remedial measures (e.g., manual intervention). As also discussed above, the removal of the SBS group of objects 226, 230 from the travel path 214 can prevent improper sorting and other problems (e.g., downstream issues that may arise if the objects 226, 230 were to continue traveling through the facility in the SBS configuration). In some embodiments, the actuator assembly 218 (or other redirection device) can be positioned downstream of the dimensioners 204, 206, and the symbol scanners 208, 210. In this way, the computing device 212 (or a different computing device, such as a computing device of the symbol scanner 208) can determine a classification for an event, determine a validity of the event, etc., before the object passes by the actuator assembly 218 (or other redirection device). Thus, advantageously, the computing device 212 can appropriately route the object by causing the actuator assembly 218 to implement the appropriate action on the object, without the object having to be recirculated, sent to a reworking path, etc., after determination of a classification has occurred (e.g., a SBS classification).

As shown, a different object 234 having a barcode 236 is supported by and is being transported along the travel path 214. The object 234 has a gap situated along the entire length of the object 234, which can be sensed by either of the dimensioners 204, 206. In some cases, this gap can cause improper identification of one or more of the dimensions of the object 234 by the dimensioners 204, 206. For example, due to the gap, the dimensioner 204, 206 may improperly identify the object 234 as two objects, resulting in dimensional data that indicate that the object 234 is in an SBS configuration. Correspondingly, an SBS classification may be applied to this event (e.g., to the object 234), which can, if nothing else is done, impact the subsequent routing of the object 234. For example, the computing device 212 having received (or determined) the SBS classification, can change the previous routing of the object 234 (e.g., by the computing device instructing the actuator assembly to move the object from one travel path to another). In some cases, this can include the computing device 212 causing the object 234 to be placed on the recirculation path. Thus, because the object 234 is not actually two objects, the sorting system 200 may undesirably continuously recirculate the object 234.

In some embodiments, however, the sorting system 200 can ignore (or remove the classification) based on the barcode information by implementing functionality according to this disclosure. For example, following the case of the object 234, the computing device 212 has already determined that the object 234 is in an SBS configuration, which can include applying the SBS classification to this particular event (e.g., to the object 234). The computing device 212 can then receive barcode information (or symbol information) from the barcode 236 (or other symbol) of the object 234, identify the barcode information as including common barcode information (or common symbol information) with previously analyzed events and locate characteristic dimensional data associated with the common barcode information. The characteristic dimensional data can then be compared with dimensional data obtained for the object 234 (e.g., from the dimensioners 204, 206) and, based on this comparison, it can be determined whether the SBS classification has been properly applied or should be negated (e.g., removed or otherwise ignored). For example, if the measured dimensions of the object 234 satisfy threshold criteria of characteristic dimensional data associated with the common barcode information, it may be determined that the SBS classification is incorrect and can be ignored. Correspondingly, for example, the object 234 can be maintained along its previous routing (e.g., not moved from one travel path to another). In contrast, for example, if the measured dimensions of the object 234 do not satisfy threshold criteria of characteristic dimensional data associated with the common barcode information, it may be determined that the SBS classification is correct and routing of the object 234 can be controlled accordingly. Thus, by a combined analysis of dimensional and barcode information, both correctly applied SBS classifications and incorrectly applied SBS configurations can be identified and routing of objects can be adjusted (or not) accordingly.

Figure 6:
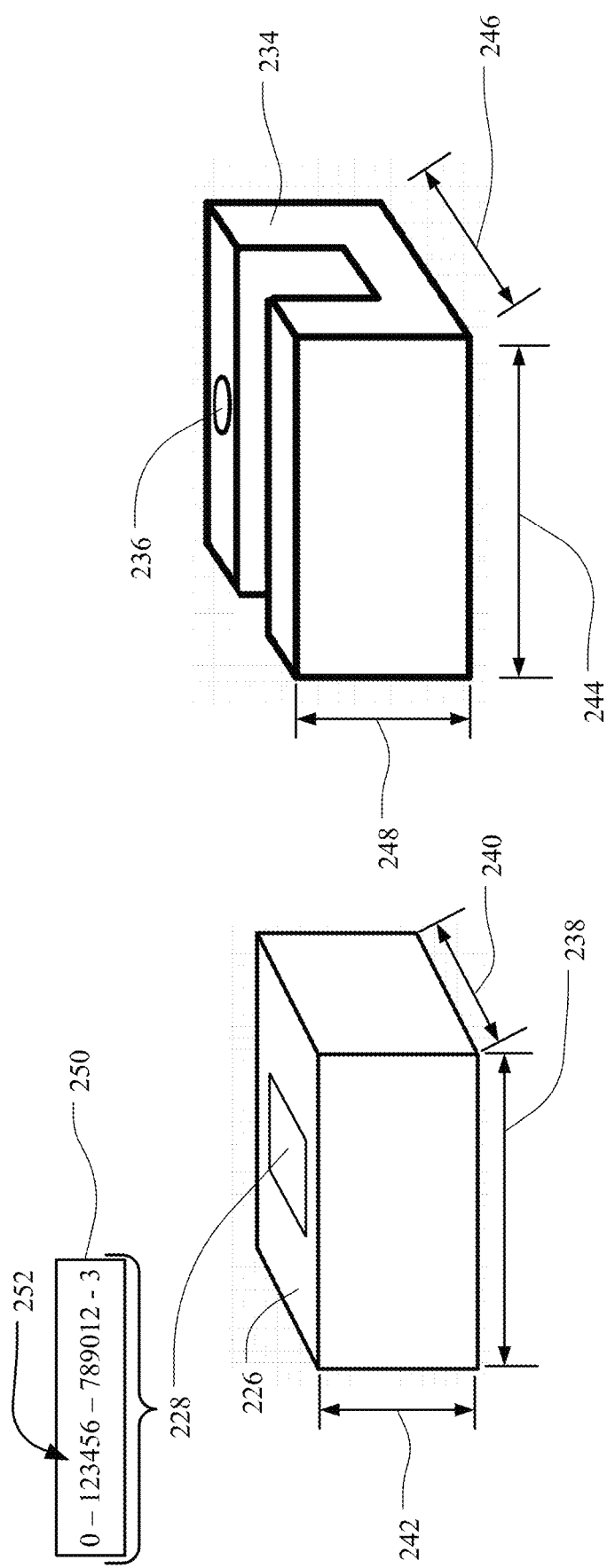
FIG. 6 shows isometric views of the objects illustrated with the sorting system of FIG. 5.

FIG. 6 shows isometric views of the objects 226, 234. As described above, the dimensioners 204, 206 can determine various dimensional data of the object 226, which can include a length 238, a width 240, a height 242, and a volume of the object 226. Similarly, the dimensioners 204, 206 can also determine various dimensional data of the object 234, which can include a length 244, a width 246, a height 248, and a volume of the object 234. In other implementations, other types of objects can be analyzed or other dimensions can be measured.

The object 226 also includes the symbol 228 (e.g., a barcode) that can be sensed by the symbol scanners 208, 210 and used to determine symbol information 250 (e.g., barcode information) that is encoded by the symbol 228. The symbol 228 can be implemented in various ways, such as being one or more alphanumeric strings, numeric strings, etc., that can be determined using one or more images of the symbol 228 (e.g., using optical character recognition processes), different barcode configurations such as a one-dimensional ("1D") barcode, a two-dimensional ("2D") barcode, etc. Similarly, the symbol 228 can utilize different formats (or standards) such as, a global trade item number ("GTIN") format (e.g., GTIN-12), a global standard ("GS") format (e.g., GS1), etc. Additionally, the symbol information 250 can include various sub-data that can correspond with other objects (e.g., be the same or partially the same as other objects), such as a product code (e.g., a universal product code), an international standard serial number ("ISSN"), a stock keeping unit ("SKU"), an object identity ("ID"), other alpha text, numeric text, alpha-numeric text, etc. In the illustrated embodiment, the symbol information 250 includes a product reference number 252, which can be the common symbol information (e.g., other objects also having the same product reference number 252). Thus, the common symbol information need not be the exact barcode string for each type of object, but can be a subset of the exact barcode string. In other configurations, the common symbol information can be different, such as the barcode standard, barcode format, etc. While the following description mainly describes a symbol being a barcode, and the common symbol information being common barcode information, it is to be understood that barcodes are just an example of a symbol.

Figure 7:
FIG. 7 shows a schematic representation of a table that visually represents data for various events.

FIG. 7 shows a schematic representation of a table 300 that is one way in which event data can be stored, however, in alternative configurations, the event data can be stored and organized in different ways. The table 300 can be stored in memory of a computing device (e.g., the computing device 212, a server, etc.) and accessible, as appropriate, by all devices in communication with the computing device. In some cases, the table 300 can be populated as objects travel along a sorting system, while in other cases, the table 300 can be pre-populated and the computing device 212 can simply receive the data of the table 300 (e.g., from a server). In some cases, the table 300 can be configured as a database, populated using object data from different (and many)

sorting systems. In this way, different sorting systems (e.g., those in a new facility) can begin operating at substantially high efficiencies by simply receiving the object data (of the table 300), or other datasets related to the object data of the table 300, including as described below.

As shown in FIG. 7, the table 300 includes records of a plurality of events, which can be related to a single object (e.g., the object 234) or can be related to a plurality of objects (e.g., the objects 226, 230 or multiple instances of the object 234). Generally, each event corresponds to data obtained by the sorting system 200 for one or more objects during a period of time (e.g., during a scanning interval associated with a particular trigger). Each event can have a plurality of data types, which can include barcode information, dimension data, classification data, and validity data. The barcode information can include the barcode information for each barcode of each object for the event. Correspondingly, the stored barcode information can include common barcode information relative to multiple events.

In some embodiments, the dimension data can include one or more of the length, width, height, or volume of each object for each event. The classification can include the specific classification type for an event (e.g., the SBS classification) and may include multiple classifications in some cases. In some cases, the validity of the classification can also be stored for any particular event. For example, if it is determined that a particular classification is incorrect, a value indicating this determination can be stored. In some implementations, a validity value may not necessarily be stored in the table 300. For example, the table 300 may include historical event information and the validity of a classification for a particular event can be stored in other locations (e.g., in a temporary runtime table or data field).

In some embodiments, additional data can be stored for each event. For example, an image of the scene (e.g., of the one or more objects) from one of the symbol scanners 208, 210 can be stored for each event. These stored images can be helpful, for example, in evaluating the validity of a classification for a particular event (or a group of events having common barcode information). In some embodiments, the additional data can include weight (or mass) data for the even (e.g., as a subset of the dimensional data). In some configurations, each event can have more than one classification with corresponding validity designations. For example, an event may include for one classification an SBS configuration with one corresponding validity, and for another classification a multi-code configuration with a second corresponding validity (e.g., more than one barcode read for an event). In some cases, each event can have a final validity designation, if for example, there is more than one classification. For example, if the validity of each classification is determined to be incorrect, then the final validity designation can also be determined to be incorrect. The computing device can ignore the previous classifications that may have otherwise adjusted routing of the object, if the final validity is determined to be incorrect.

In some cases, the additional data can include a time stamp of the event, a number of barcodes identified, a number of objects determined (e.g., based on the total number of unique barcodes within the event), an expiry date of each object of the event, a valuation for each object of the event (e.g., a price or cost for each object), a demand or urgency for each object of the event (e.g., a value or score that relates to the need for the object by a downstream entity), an identification of the symbol scanner used, the identification of the dimensioner used, a location where the sorting system operates (e.g., a specific facility), a density of the one or more objects of the event (e.g., utilizing both the volume and mass or weight data for the event), etc. In some embodiments, the demand or urgency value can be a value within a range (e.g., 0-100 and an integer value), and can be determined based on the barcode information (e.g., by comparing the barcode information to a demand table or model).

In some embodiments, classifications can include a no code classification (e.g., no barcode information obtained from the object(s) of the event), a multi-code classification (e.g., more than one set of barcode information obtained from the object(s) of the event, which can correspond to multiple barcodes), a single object classification (e.g., indicating a single object, rather than multiple objects such as an SBS configuration), an adjacency classification (e.g., a classification related to the spatial relationship between two or more objects, including an SBS classification, a stacked classification, etc.), an unexpected shape profile for the one or more objects.

In some embodiments, a subset of events 302 having common symbol information (e.g., common barcode information) can be selected for subsequent analysis. For example, as shown, the subset of events 302 include event 1 and event 2 having common symbol information (e.g., common barcode information in the numeric string of "789012"), as may indicate that the same object type (or the same object) was scanned during each event. As one example of subsequent analysis, the events 1 and 2 of the subset 302 can be further analyzed in order to determine whether the SBS classifications were correct, including as further discussed below.

As another example, this subset 302 can be analyzed to determine characteristic dimensional data for objects that exhibit the associated common barcode information (e.g., objects of a particular type). In different embodiments, characteristic dimensional data can be determined in different ways. For example, a distribution for each dimension for all events from the subset 302 can be created, and statistical methods deployed to determine statistical information from each of these distributions including the mean, the standard deviation, the confidence interval, the curve that follows (or fits) the distribution, etc. Thus, for example, the characteristic dimensional data can be a value (e.g., the mean), a range (e.g., a confidence interval), a curve (e.g., a best fit curve) for each dimension of the subset of events 302, as desired. As such, in some cases, while there could be dimensional data for each dimension in the subset of events 302, the characteristic dimensional data may only include a width and a length dimension. In some cases, characteristic dimensional data may be determined in particular for subsets of events with incorrect classifications (e.g., as shown for the subset 302). In other cases, however, characteristic dimensional data can be determined for objects having common barcode information regardless of whether the objects where subject to a particular classification.

After characteristic dimensional data has been determined, the characteristic dimensional data can be associated with the common barcode information. For example, in the illustrated embodiment, the characteristic dimensional data can be a width of 10.4 cm with a ±0.2 cm range (i.e., a mean and a threshold range), and can be associated with the common barcode information being "789012." This associated characteristic dimensional data can then be utilized by a run-time module of the sorting system, including as described below, to determine validity of runtime classification of objects and to adjust (or not adjust) the routing of object accordingly.

Figure 8:
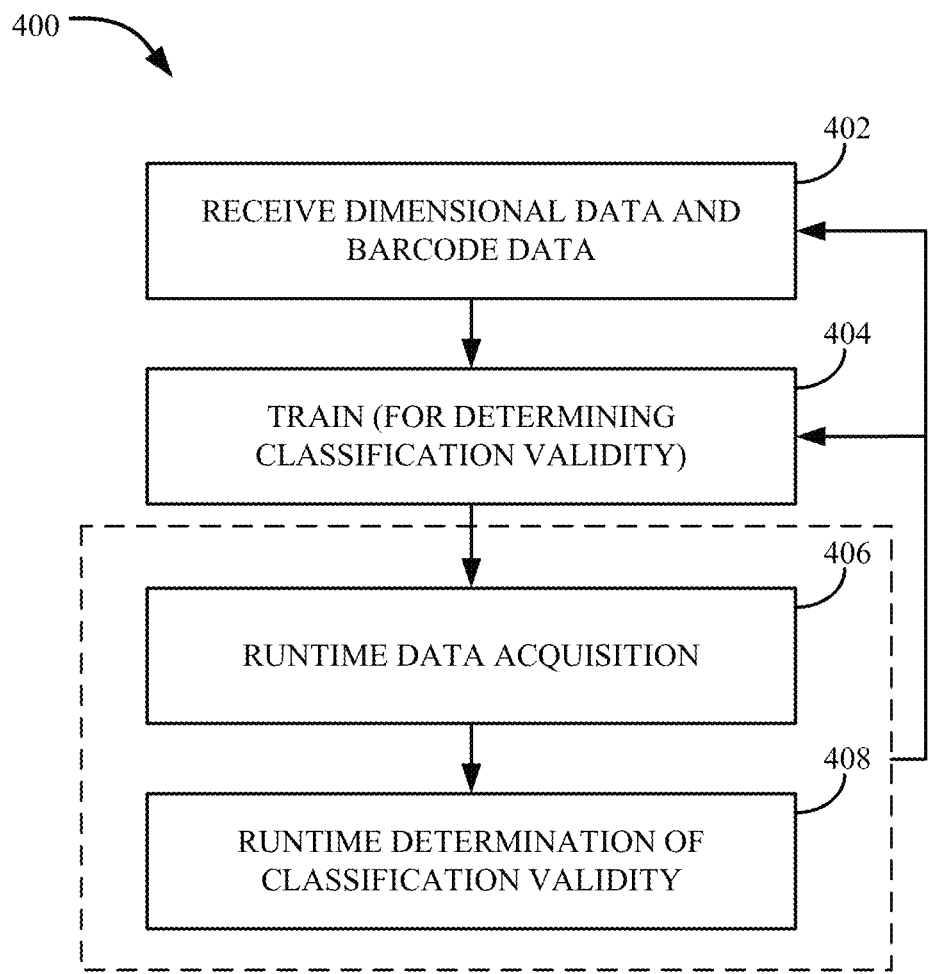
FIG. 8 shows a flowchart of a process for sorting objects.

FIG. 8 shows a flowchart of a process 400 for sorting objects, which can be implemented on any of the previously described computing devices or using other known computing systems. Similarly, portions of process 400 can be completed on different sorting systems, different computing devices (e.g., a server), etc.

At 402, the process 400 can include a computing device receiving dimensional data and barcode data. For example, this can include a sorting system obtaining run-time dimensional data and barcode data for each object traveling through the sorting system (and subsequently storing the data as appropriate), including by using any variety of known dimensioners or symbol scanners. As another example, this can include a computing device receiving a table (e.g., a database record) that includes both dimensional data and barcode data (e.g., the table 300) for one or more objects or object types. In some cases, dimensional data and barcode data can be obtained from multiple sorting systems, each operating in a different location (facility, or portion of a facility).

At 404, the process 400 can include a computing device executing training operations, including as may support determining classification validity of one or more events (e.g., if a particular classification is correct or incorrect for one or more objects). For example, the computing device can determine, using the obtained dimensional data and barcode data, characteristic dimensional data for events having common barcode information. In particular, the computing device can select only those events that have common barcode information (e.g., a product code), and determine the characteristic dimensional data using dimensional data only from (or otherwise associated with) those events. In some cases, characteristic dimensional data can be determined using events that also have the same classification (e.g., an SBS classification), and have an incorrect validity for that classification (e.g., an incorrect SBS classification). As described above, the characteristic dimensional data can be a value (e.g., a mean), a range (e.g., a confidence interval), a curve (e.g., a best fit curve) of dimensional data for a set of events. In some cases, the characteristic dimensional data can include data for each relevant dimension of an object or set of objects (e.g., length, width, and height).

In some cases, as further discussed below, characteristic dimensional data can be associated (or related, or linked) to particular common barcode information, and this associated characteristic dimensional data can be transmitted to a runtime module (e.g., of the computing device) so that subsequent objects having the common barcode information can be analyzed appropriately.

Also at 404, the process 400 can include determining whether a particular classification or set of classifications is correct. For example, as further discussed below, a computing device may identify a set of events that have common barcode information and have also been designated with a common classification (e.g., a SBS classification). Based on appropriate factors, including the frequency or absolute number of common classifications, the process 400 can include evaluating whether the classifications have been appropriately assigned. For example, a representation of an object of a relevant set with common classifications and shared common barcode information can be presented to a user so that the user can provide input indicating whether the classification is correct. In some cases, computer learning algorithms or other approaches can be used to a similar effect. When a particular classification has been determined to be incorrect for a set of events, this information can then be used during subsequent operations to evaluate whether similar subsequent classifications can be ignored.

Although blocks 402, 404 have been described above with reference to a single instance of common barcode information, blocks 402, 404 can be implemented for many different instances of common barcode information. For example, characteristic dimensional data can be determined and associated for each differing instance of common barcode information, as appropriate. In other words, groups of events that share first common barcode information can have a characteristic dimensional data determined and associated with the first common barcode information. Similarly, groups of events that share second common barcode information can also have a characteristic dimensional data determined and associated with the second common barcode information. This can be completed for the first, second, to N instances of common barcode information.

At 406, process 400 can include a computing device, and in particular a runtime module (of the computing device or other computing system), obtaining data during a runtime of the sorting system. For example, as objects (i.e., runtime objects) travel through the sorting system, dimensional data of objects (e.g., the dimensions) and barcode information for each barcode of each object can be obtained. As described above, the dimensional data and barcode information can be used by the computing device to determine a classification for each runtime event. For example, the computing device can utilize the dimensional data to determine that an SBS configuration for the runtime event appears to exist, and accordingly apply an SBS classification to this runtime event. As another example, the computing device can utilize the barcode information to determine that a multi-code configuration appears to exist (e.g., that more than one barcode is present for this runtime event), and accordingly apply a multi-code classification to this runtime event.

In some cases, one or more runtime objects can be the same objects that have previously been (or are currently being) used to train a system for runtime operation, including to determine common characteristic dimensional data or common barcode information that may be associated with a particular classification or incorrect classification. In some cases, one or more runtime objects can be objects that have not been previously scanned by a system, or that have not been previously scanned except as part of runtime operations.

At 408, process 400 can include a computing device (e.g., the runtime module) determining a validity of one or more classifications for each relevant runtime event. For example, the computing device can compare the barcode information obtained for the runtime object to the common barcode information, to identify one or more similarities or dissimilarities between the barcode information of the runtime object and the common barcode information. After dimensional data and barcode information of a runtime object are compared to relevant characteristic dimensional data and barcode information, the computing device can, depending on the comparisons, evaluate whether a particular classification for the runtime object (e.g., the runtime event) is correct.

In some cases, comparing barcode information can include identifying that the barcode information for the runtime object identically matches the common barcode information (e.g., the barcode information of the runtime object shares the same barcode data string as the common barcode information). As another example, this can include identifying that the barcode information for the runtime object partially matches the common barcode information (e.g., the barcode information of the runtime object partially shares the same barcode data string as the common barcode information, such as a product code number). As yet another example, this can include identifying an identical (or partial) match between the barcode information of the runtime object and the common barcode information using known fuzzy hash algorithms (e.g., with various customized thresholds).

In some cases, the computing device can also compare the dimensional data obtained for the runtime object to the common characteristic dimensional data (that was previously associated with the common barcode information). For example, this can include determining if the dimensional data for the runtime object exceeds or is within a dimensional threshold that is defined by the common characteristic dimensional data. In some cases, this comparison can include identifying an identical (or partial) match between the dimensional data for the runtime object and the common characteristic dimensional data, including as may sometimes be completed using known fuzzy hash algorithms (e.g., with various customized thresholds).

As a specific example, a given event can have a single object (e.g., the object 234) that has a single barcode (e.g., the barcode 228), and an SBS classification can be applied to this event. In this case, the computing device can utilize a unique portion of the barcode information extracted from the single barcode (e.g., the product code) and compare this to data that is stored in a database, a table, memory (generally), etc. If a match exists, indicating that this unique portion of the barcode information is common barcode information relative to other objects or events, the computing device can receive the associated characteristic dimensional data for the common barcode information. Then, the computing device can compare the obtained dimensional data for the runtime event to the associated characteristic dimensional data. If, for example, the obtained dimensional data is within bounds defined by (or otherwise matches) the associated characteristic dimensional data, the computing device can ignore the SBS classification (e.g., can remove the SBS classification, indicate that the SBS classification is incorrect, etc.), and thereby appropriately control the routing of the object (e.g., by modifying a routing that was previously changed based on the SBS classification). Alternatively, if no match exists to common barcode information, or if a match exists but the obtained dimensional data exceeds the bounds defined by the associated characteristic dimensional data, the computing device can maintain the SBS classification for this event and the object can be routed accordingly.

As shown, the data obtained from one or both of blocks 406, 408 can be utilized by the computing device for further iterations of the blocks 402, 404. For example, runtime dimensional data and barcode information obtained at block 406 can be utilized at block 402 of process 400 (e.g., this data also being stored). As another example, runtime dimensional data and barcode data, classifications, and validity for each classification of block 408 can be utilized at block 402 of process 400 (e.g., this data also being stored). In some cases, the data from either of blocks 406, 408 can be utilized for training of the computing device for determining the validity of the one or more classifications (e.g., at block 404).

In some embodiments, these blocks 402, 404, 406, 408 of process 400 (or others) can be implemented on the same computing device (e.g., the computing device 108, the server 111, etc.). For example, all these blocks of process 400 can be implemented on a single sorting system (e.g., the sorting system 100). As a specific example, all these blocks of process 400 can be implemented on a single computing device (e.g., computing device 108) of the sorting system. As a more specific example, all these blocks can be implemented on different layers (e.g., software layers), of the computing device. For example, one layer of the single computing device can include the operation of blocks 402, 404 of process 400 to store previously obtained data and train for further classification validity, while a second layer can include the operation of blocks 406, 408 of process 400 to determine runtime classification validity. As another example, these blocks of process 400 can be split between computing devices. For example, blocks 402, 404 can operate on one computing device (e.g., a server) that is remote to the sorting system, while blocks 406, 408 can operate on a second computing device (e.g., a computing device of the sorting system) that is near, in proximity, and in the same facility as the sorting system.

Figure 9:
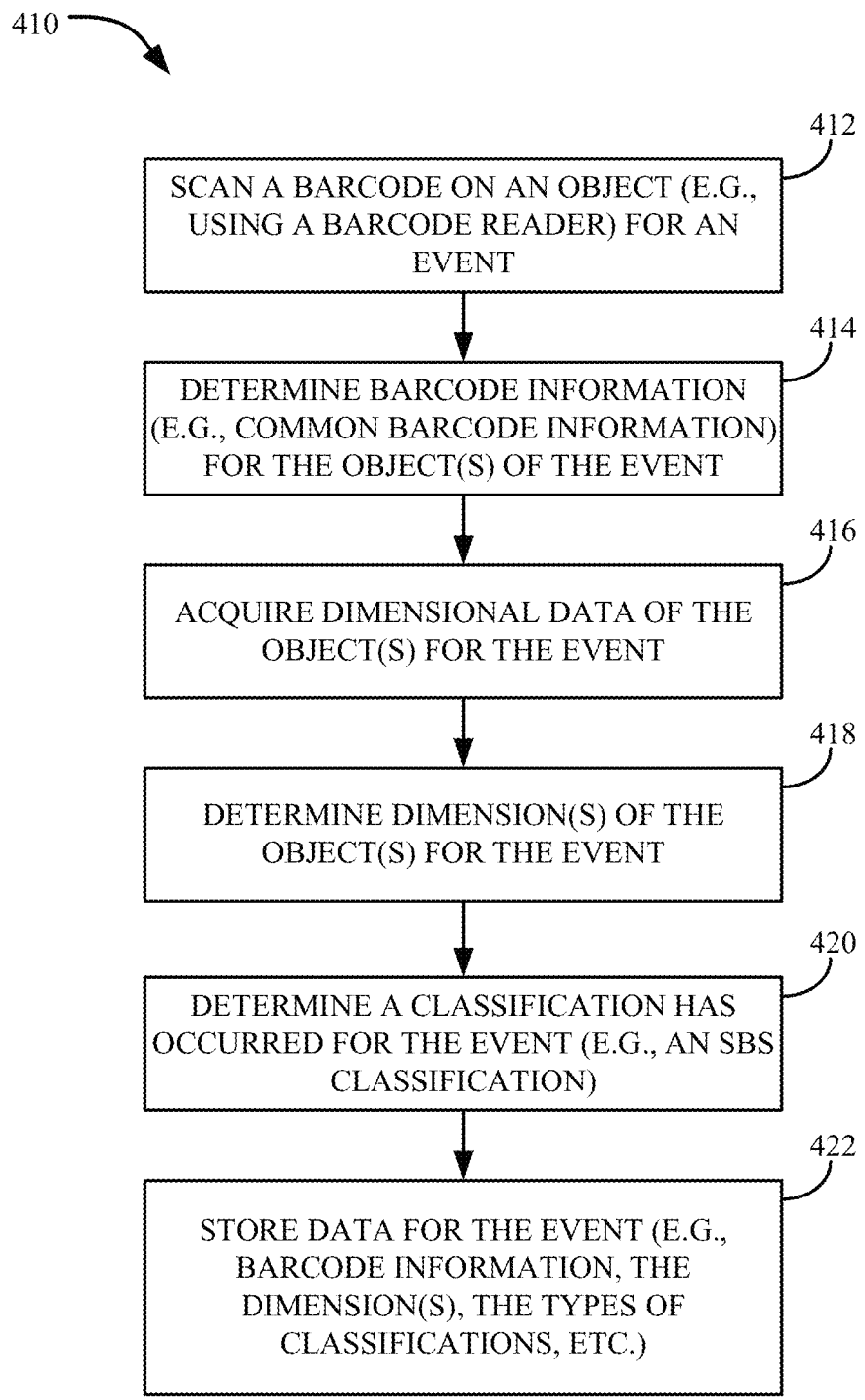
FIG. 9 shows a flowchart of a process for obtaining dimensional data and barcode information of events.

FIG. 9 shows a flowchart of a process 410 for obtaining dimensional data and barcode information for events, which can be implemented using a suitable computing device. In some embodiments, the process 410 is a specific implementation of block 402 of the process 400.

At 412, the process 410 can include a symbol scanner (e.g., the symbol scanner 106) scanning a barcode on an object, as the object travels along a sorting system. In some configurations, this can include the symbol scanner obtaining an image (or multiple images) of a scene having a field of view that includes the object (and one or more barcodes of the object). In some cases, if there is more than one object for the event (e.g., a period of time the sorting system operates), then the symbol scanner can scan each barcode of each object (e.g., by obtaining images of each object). In some configurations, the symbol scanner can transmit these images to a computing device (e.g., the computing device 108) for subsequent analysis.

At 414, the process 410 can include a computing device determining barcode information for each object of the event. In some cases, the symbol scanner can locate a barcode within each image (of each object), and decode the barcode to extract the barcode information. In some configurations, the symbol scanner (or other computing device) can determine a unique portion of the barcode information (e.g., a product code). In other configurations, such as if the images are transmitted to a computing device, the computing device can locate and decode each barcode in each image to determine the barcode information. In some cases, the symbol scanner (or computing device) can determine the number of barcodes for the event, and can determine, for each barcode, the barcode size (e.g., spatial footprint), or barcode type (e.g., a 1D, 2D, etc., barcode), both of which could be used to determine common barcode information.

At 416, the process 410 can include obtaining dimensional data of the objects for the event. In some cases, dimensional data for the event can relate to a single object, while in other cases, dimensional data for an event can relate to multiple objects. In different embodiments, dimensioners of a variety of known types can be used, including 3D imaging devices, ToF sensors, and so on. In some configurations, dimensional data can be transmitted from a dimensioner to a separate computing device for subsequent analysis.

At 418, the process 410 can include a computing device determining dimensions of the objects for an event based on the obtained dimensional data. For example, these dimensions can include a length, a width, a height, a volume, etc., of one or more objects for the event. In some cases, a dimensioner can determine the dimensions for the one or more objects using the dimensional data, while in other cases, such as when the dimensioner transmits the dimensional data to a computing device, the computing device can determine the dimensions.

At 420, the process 410 can include a computing device determining that one or more classifications have occurred for the event. For example, based on the dimensions (or dimensional data) for the one or more objects of the event, the computing device can determine that an SBS configuration appears to have occurred, and based on this determination, the computing device can indicate an SBS classification for this event. Similarly, based on the barcode information for one or more objects of an event, the computing device can determine that a multi-code configuration has occurred, and based on this determination, the computing device can indicate a multi-code classification for this event. Thus, for each event, multiple classifications can sometimes be determined.

At 422, the process 410 can include a computing device storing data for the event. In some cases, the computing device can store for each event the barcode information, common barcode information, dimensions, images (e.g., obtained at block 412), the classification(s), etc. As further discussed above and below, the stored data can later be used in order to evaluate whether a particular set of classifications is correct, including during training or runtime operations.

In some cases, the data from 422 (e.g., for each event) can be stored in a table similar to the table 300 of FIG. 7, while in other configurations this data can be stored in other formats. In some configurations, this data can be stored in memory of a computing device remote to the facility of a sorting system (e.g., a server), while in other configurations, this data can be stored in the memory of the computing device within the facility of the sorting system. In this regard, storing the data from the block 422 within a computing device that is at or within the facility the sorting system operates in can be advantageous, in that the required time to query a database that includes the data from the block 422 is significantly shortened, as compared to using a network to query a database (e.g., that is external to the facility including being in a different geographical location such as a different country).

Although the process 410 was described as being for a single event, the process 410 can be completed for many events to obtain a suitable amount of data. In this regard, for example, the process 410 can be used to populate a communal database (with appropriate access, such as for a single company) so that the sample size increases, which can increase the accuracy of the determinations discussed below, and which can increase the likelihood that an object has been seen previously (e.g., by another facility having a different sorting system).

In some embodiments, a plurality of events to which the processes described herein are applied can include a first event for an object traveling through the sorting system during a first time period, and a second event for the same object traveling through the sorting system during a second time period (e.g., after recirculation of the object). In other embodiments, some of the events within the plurality of events can correspond to different objects that have the same common barcode information.

Figure 10:
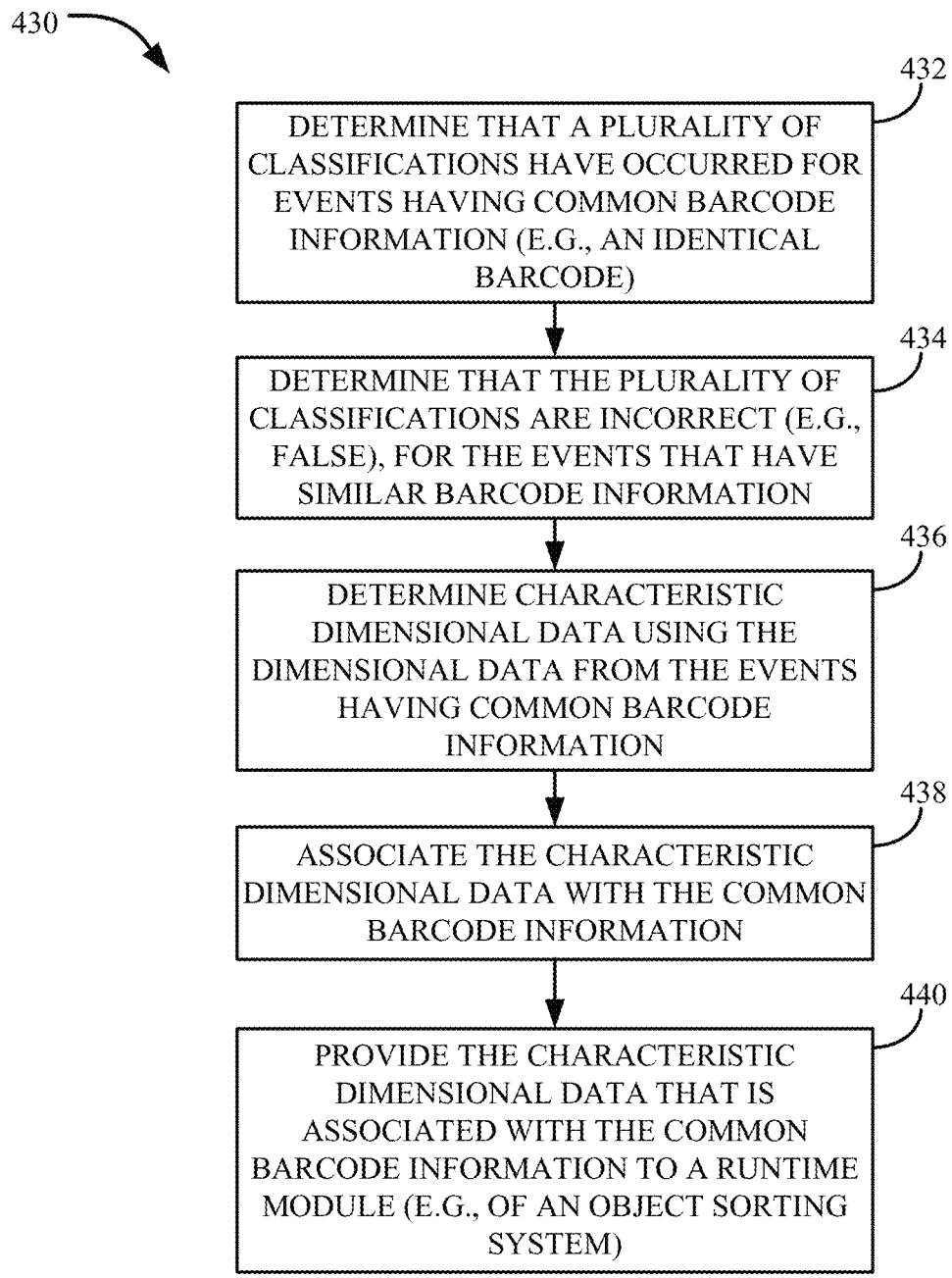
FIG. 10 shows a flowchart of a process for determining the validity of classifications for events having common barcode information.

FIG. 10 shows a flowchart of a process 430 for associating various data with common barcode information, which can include determining the validity of classifications for events having common barcode information. The process 430 can be implemented using one or more computing devices, as appropriate. In some embodiments, process 430 can be a specific implementation of block 404 of process 400.

At 432, process 430 can include a computing device determining that a plurality of classifications have occurred for a plurality of events with objects that have common barcode information. In some cases, the computing device can utilize a database, table, etc., to select all events (or a subset of events) that each have a common classification (e.g., an SBS classification) and common barcode information (e.g., the same product code, the exact same barcode information string, or the same alpha-numeric string). For example, a computing device can access data obtained and stored under the process 410 (see FIG. 9) for analysis under the process 430.

At 434, process 430 can include a computing device determining that, for a plurality of events (e.g., as determined at block 432), one or more of the common classifications are incorrect. In some cases, this incorrect validity for the common classification can be pre-populated in the database (e.g., previously determined, such as by a machine learning algorithm) or other data storage format. In other cases, classifications for one or more events can be indicated as being incorrect after being selected. For example, an image related to one or more events within a plurality of events can be presented to a user, who can then evaluate the validly of the classifications and apply a belief value (e.g., incorrect, correct, etc.) to the classification for relevant event within the plurality of events. In other cases, a machine learning algorithm can evaluate the validity of the classification for each event. Other detailed examples regarding identification of false classifications, including details regarding identification of particular events to be evaluated for classification validity, are also presented above or below.

In some specific cases, each event that has been determined to have a false classification can be deemed to be an "exception." For example, an event being classified as an SBS classification, can be determined to be false and thereby reclassified as a false SBS exception (i.e., an exception to an initial SBS classification, due to the SBS classification being incorrect). This definition framework is also applicable to other classifications, including as described above.

At 436, the process 430 can include a computing device determining characteristic dimensional data from the dimensional data of one or more objects for one or more events, which may occur based on, in parallel with, or independently of a determination of incorrect classifications under 434. Determination of characteristic dimensional data can be implemented in different ways. For example, as also discussed above, for one or more dimensions or the one or more objects of each event across a plurality of events, a computing device can determine characteristic dimensional data based on (e.g., as) statistical information (e.g., a mean, a standard deviation, a variance, a confidence interval, etc.), a curve that corresponds with the dimensional data (e.g., a best fit line), etc. For example, in some cases, the characteristic dimensional data can include a value (e.g., a mean) and a threshold (e.g., a confidence interval aligning with the mean) for one or more dimensions. As a more specific example, characteristic dimensional data can include a first value and a first threshold for the width dimension, and a second value and a second threshold for the height dimension, and so on.

In some cases, dimensions across all relevant events (e.g., with common barcode information) can exhibit a unimodal, bimodal, or multimodal distribution. Thus, characteristic dimensional data can sometimes include multiple values, thresholds, etc., for one or more dimensions. For example, in the case of a bimodal distribution for a particular dimension, characteristic dimensional data can include a first value that corresponds to (e.g., aligns with) one dimensional peak, a first threshold that corresponds with and includes the first value, a second value that corresponds to another dimensional peak, and a second threshold that corresponds with and includes the second value. Correspondingly, when a computing device evaluates a runtime event, a dimension of an object of a similar type can be appropriately evaluated relative to a bimodal dimensional profile.

As described above, in some embodiments, dimensional data can include weight or mass data of one or more of objects. Thus, in some cases, characteristic dimensional data can include values, thresholds, curves, etc., for a weight (or mass), based on the weight (or mass) distribution of the plurality of events. Additionally, in some cases, characteristic dimensional data include a combination of size and weight (or mass) data for particular objects or events. For example, characteristic dimensional data can include size and weight data individually, or can include a density value and corresponding density threshold (e.g., that includes the density value).

In some cases, characteristic dimensional data can be determined based on user input. For example, a computing device can modify previously determined characteristic dimensional data for the common barcode information, based on the user input. For example, user input can be used to adjust the span of a threshold (e.g., a range) for a dimension that is included in the characteristic dimensional data or to adjust other parameters as appropriate. In this way, a user can advantageously select how conservative the sorting system is, when, for example, recirculating or reworking objects.

At 438, process 430 can include a computing device associating the characteristic dimensional data with the common barcode information. For example, the characteristic dimensional data, which was derived using events all having common barcode information, can be associated with the corresponding common barcode information in a table such as is illustrated in FIG. 7.

In some embodiments, a computing device can receive a user input (e.g., a user) that can associate or modify particular characteristic dimensional data or characteristic dimensional data thresholds for particular common barcode information. For example, in some cases, a user can select particular dimensions (e.g., the height), or particular thresholds related to the particular dimensions to be associated with the common barcode information. In this regard, for example, the user input can also modify a portion of the previously determined characteristic dimensional data. For example, a user may decrease the span of a dimensional threshold (e.g., to improve accuracy of the object sorting), while in other cases a user may increase the span of a dimensional threshold (e.g., to improve object throughput). In this way, a user can adjust the accuracy and throughput of the sorting system, as the user sees fit, based on how conservative the object sorting processes should be to fit desired object sorting goals (e.g., higher throughput, higher accuracy, etc.). In some cases, a computing device can receive a user input that defines a global threshold value, which can thereby modify each threshold for each associated characteristic dimensional data. For example, if the global threshold value was set to ±10 percent of a corresponding value, then each threshold within each associated characteristic dimensional data would also be set to ±10 percent to a corresponding value.

At 440, process 430 can include a computing device providing the characteristic dimensional data that is associated with the common barcode information to a runtime module. For example, data from the process 430 can be passed to processes under block 408 of the process 400 (see FIG. 8) for determination of validity of certain classifications for runtime events. For example, for a runtime event with an object having particular common barcode information and having been determined to have an SBS classification, the computing device can evaluate the validity of the SBS classification based in part of the characteristic dimensional data determined under the process 430.

As generally noted above, particular blocks of illustrated processes can sometimes be executed in different orders than those in which they are represented in the Figures. For example, in some cases, some blocks of process 430 can be executed in other orders. For example, block 434 can be executed in a different order than as illustrated in FIG. 10, such as after one or both of blocks 436, 438. In this case, the characteristic dimensional data can be determined for events that have not been determined to have incorrect classifications.

Figure 11:
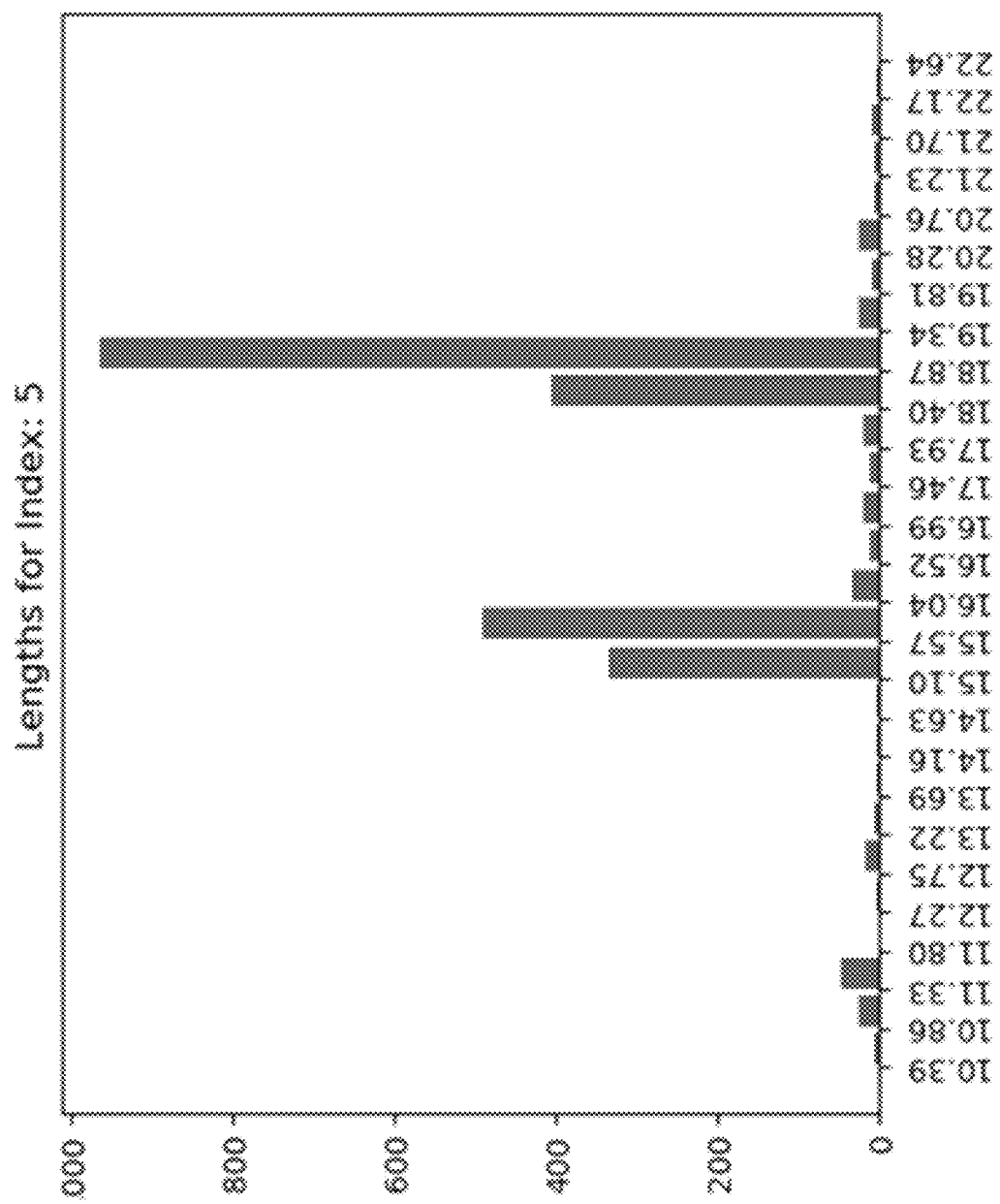
FIG. 11 shows a graph of a distribution of length data for a plurality of events having common barcode information.
Figure 12:
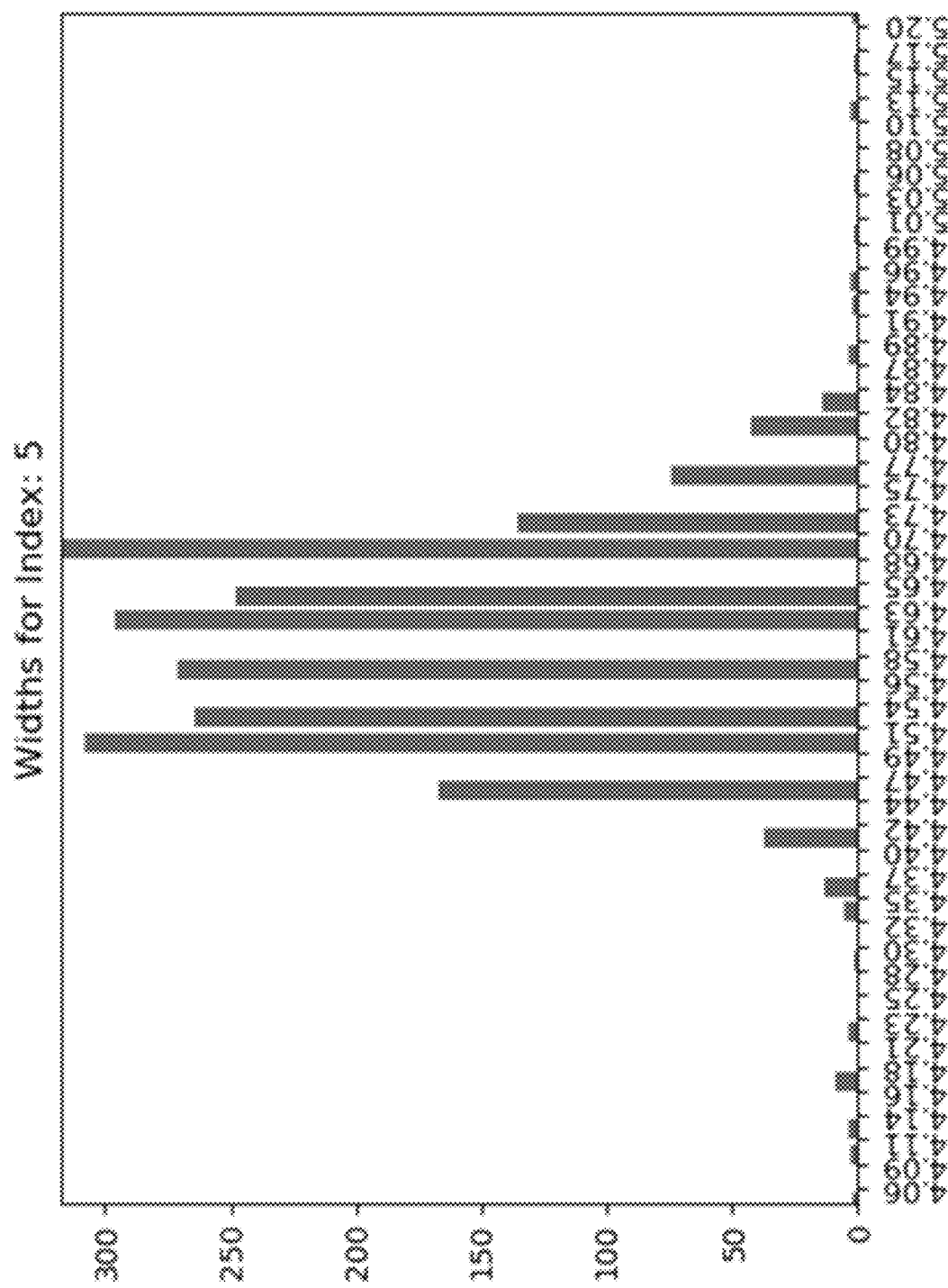
FIG. 12 shows a graph of a distribution of width data for the plurality of events having common barcode information as utilized in the distribution of FIG. 11.
Figure 13:
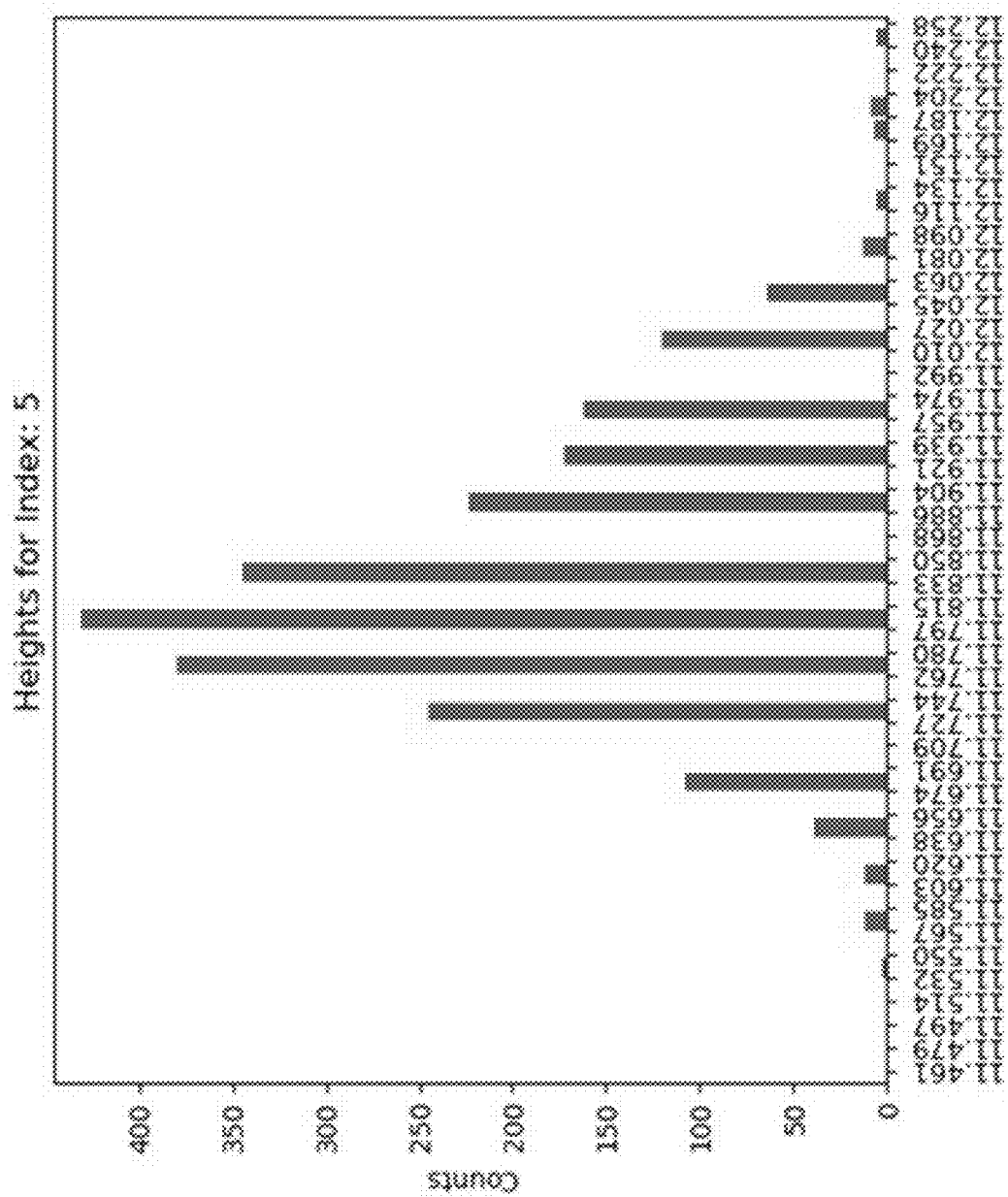
FIG. 13 shows a graph of a distribution of height data for the plurality of events having common barcode information as utilized in the distributions of FIGS. 11, 12.
Figure 14:
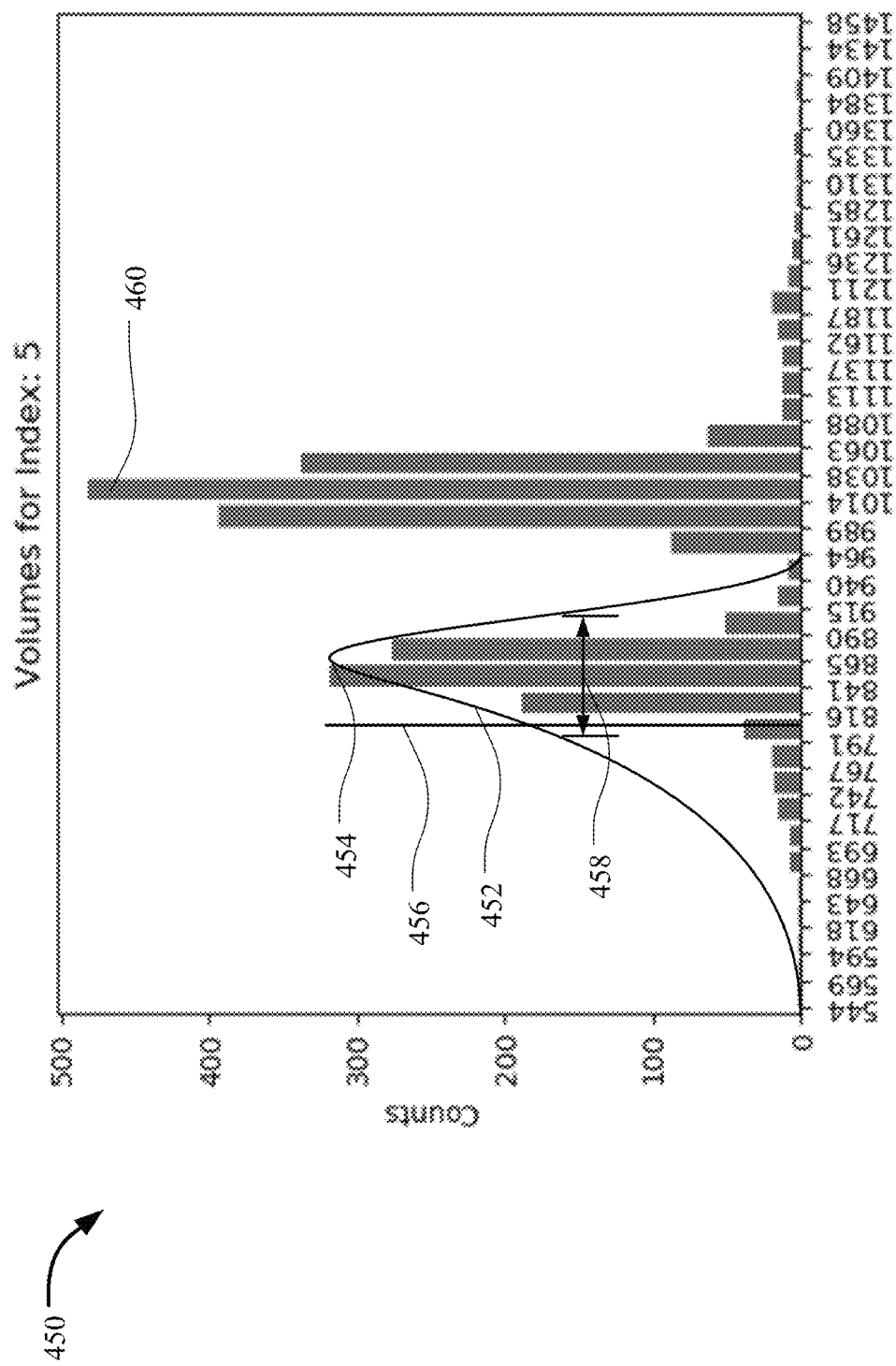
FIG. 14 shows a graph of a distribution of volume data for the plurality of events having common barcode information as utilized in the distribution of FIGS. 11-13.

Consistent with the principles above, including relative to determining characteristic dimensional data under block 436 (see FIG. 10), some embodiments can be operated to obtain dimensional data for multiple events that include objects with a common barcode or common barcode information. The dimensional data can then be aggregated and analyzed in order to determine characteristic dimensional data for those objects, as may be associated with the common barcode or common barcode information. In this regard, for example, FIG. 11 shows a graph of a bimodal distribution of length data for a plurality of events having common barcode information, FIG. 12 shows a graph of a unimodal distribution of width data for these events, and FIG. 13 shows a graph of a unimodal distribution of height data for these events. Continuing, FIG. 14 shows a graph 450 of a distribution of volume data for the same events, which exhibits a bimodal aspect based on the bimodal length distribution of FIG. 11.

As appropriate, statistical or other analysis can be applied to the data represented in FIGS. 10-13 in order to determine characteristic dimensional data for the associated events and, correspondingly, for the associated common barcode information. As described above, the characteristic dimensional data can include specific values, thresholds, curves, and so on. For example, as characteristic dimensional data associated with the volume data in FIG. 14, a computing device can determine a curve 452 that fits to a portion of the distribution, a peak of the curve 454, a mean 456 of a portion of the distribution, a span of the curve 458, a peak 460 of the distribution (e.g., the entire distribution), a standard deviation of a portion of the distribution, etc., or a variety of other parameters.

Figure 15:
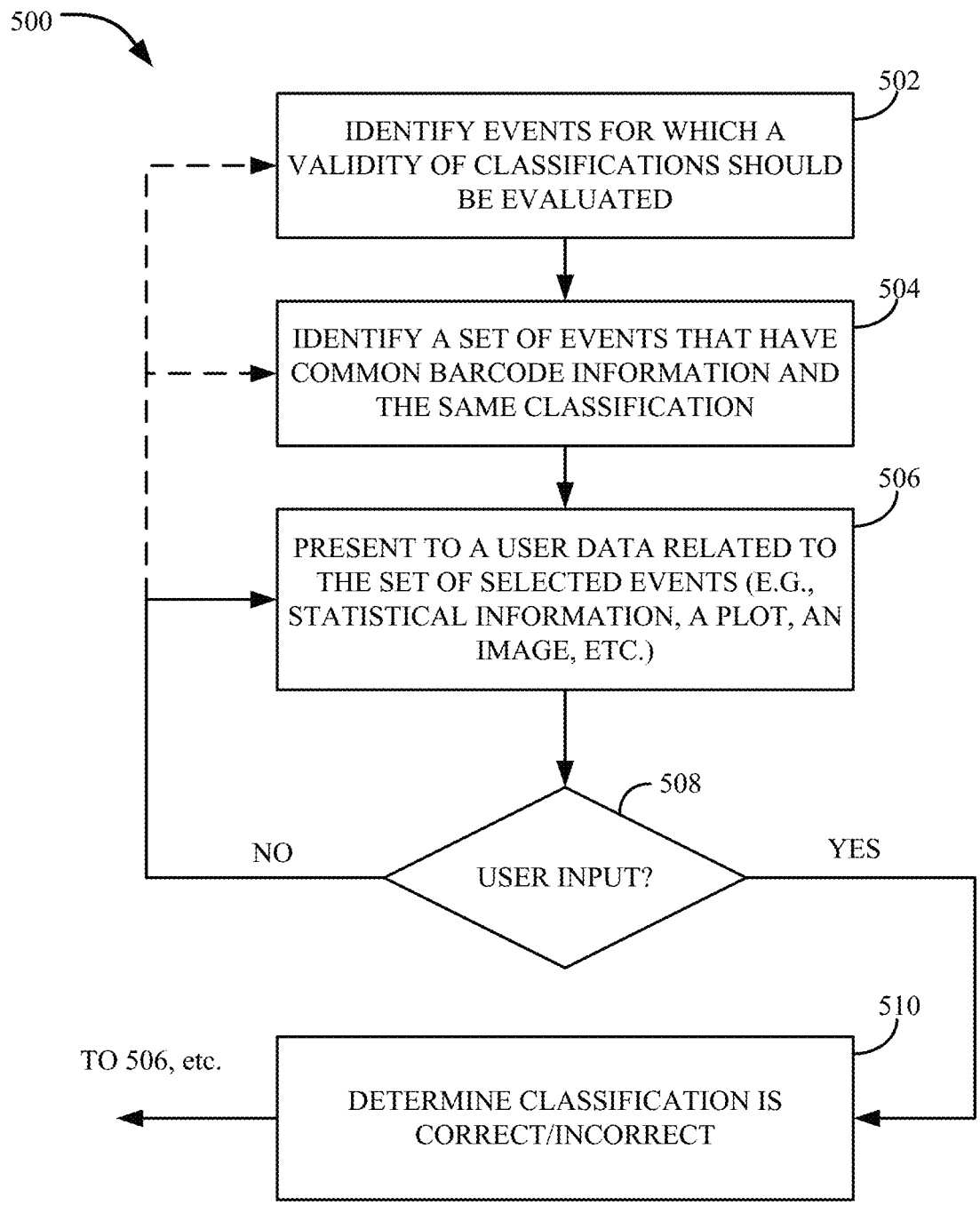
FIG. 15 shows a flowchart of a process for evaluating the validity of classifications for events that include one or more objects traveling through a sorting system.

Also consistent with the principles above, including relative to block 434 (see FIG. 10, some embodiments can be operated to evaluate whether one or more classifications for a set of events are correct. In this regard, for example, FIG. 15 shows flowchart of a process 500 for evaluating the validity of classifications for one or more events, which can be implemented on any of the previously described computing devices or using other known computing systems.

At 502, the process 500 can include a computing device identifying one or more events for which a validity of one or more classifications should be evaluated. In some cases, validity of all classifications may be evaluated. In some cases, validity of only certain classifications may be evaluated. For example, historical information from training or runtime can be aggregated in order to identify repeated classifications of a same type that have been applied to objects with the same common barcode information. As also noted above, this repeated association may sometimes indicate that a characteristic of a particular object type is leading to a particular classification, and that the classification may therefore be incorrect or can be otherwise uniformly mitigated.

Figure 16:
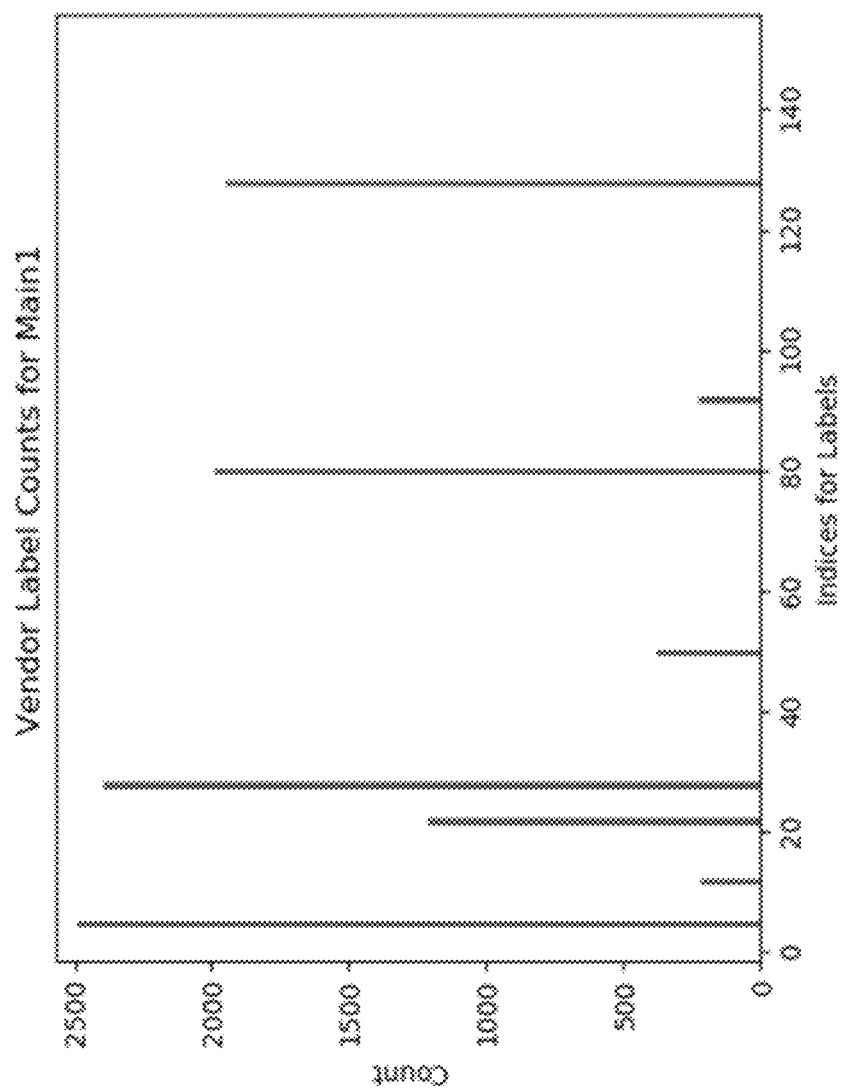
FIG. 16 shows a graph of the number of events that have common barcode information for different instances of common barcode information.

In some cases, identifying events for which classification validity should be evaluated can be based on determining that the number of events having a particular classification and sharing common barcode information exceeds a predetermined threshold or other limit. For example, a sorting system (e.g., the computing device) can store a running count of the number of events that have common barcode information and a particular classification, e.g., as an SBS classification. If the number of events exceeds the particular threshold or other limit, a computing device can then proceed with further operations under process 500, as appropriate. For example, FIG. 16 shows a graph of the number of events that have common barcode information for different instances of common barcode information. In some cases, only those common barcodes (labels, in FIG. 16) that exceed a particular count and, as appropriate, that exhibit a particular occurrence of a common classification, may be identified for review of classification validity.

As further examples, predetermined thresholds or other limits can be similarly applied relative to a rate of events over a period of time, or a percentage of the events having the same classification and sharing common barcode information relative to a total number of events (e.g., over a period of time, such as a working shift, or a day). In some cases, value or urgency characteristics for events having the same classification and sharing common barcode information can be considered. For example, particular objects may be associated with particular values, e.g., retail value. Correspondingly, a computing device can determine a running total of the values (or rates of the values) for objects of a plurality of events that have the same classification and that share common barcode information, and can proceed with the process 500 if the running total value (or rate) exceeds a predetermined threshold or other limit. Similarly, particular object may be associated with particular urgency values that indicate a degree of demand by downstream entities (e.g., retail locations). Correspondingly, the computing device can determine a running urgency total (or rate of urgency) for objects of each event that have the same classification and that share common barcode information, and the computing device can determine that if the running urgency total (or current rate of urgency) exceeds the predetermined threshold (e.g., is above the threshold), then the computing device can proceed with process 500 to store or notify a user to evaluate (at a later time) the events having the particular common barcode information.

At 504, process 500 can include a computing device identifying a set of events that have the common barcode information and the same classification. In some cases, the computing device (e.g., via a user input) can select a subset of the events (e.g., a more manageable number of events), or the entire set of events that have the common barcode information and the same classification. In some configurations, as also described above, the computing device can create a report that includes all (or select) instances of common barcode information exceeding an associated threshold, such as may indicate a need for further evaluation. For example, a generated report can include a list of all the product codes (e.g., common barcode information) that have exceeded their respective predetermined threshold (e.g., as determined in block 502 of process 500). In this way, after certain periods of time, a user can evaluate all instances of common barcode information that may require an evaluation, rather than evaluating each instance as it is initially identified.

At 506, the process 500 can include a computing device presenting to a user (e.g., on a visual display) data related to an identified set events. For example, once a set of events with common barcode information and a shared classification have been identified for further evaluation, a representation of one of the objects (e.g., an obtained image of a common field of view for a relevant event) can be displayed to a user, along with other relevant information, such as the type of classification. Correspondingly, a user can then visually (or otherwise) evaluate whether or not the particular classification is valid.

At 508, process 500 can include a computing device determining whether or not a user input is received. If the computing device does not receive a user input, process 500 can return to blocks 502, 504, or 506, as appropriate. For example, the computing device can continue presenting the information (or generate and present other data), can expand the number of events selected, or can proceed back to determining whether particular common barcode information exceeds their respective thresholds. Although not shown, the process 500 can end after a number of iterations, or a period of time, such as if a user input is never received.

Alternatively, if at 508 the computing device determines that a user input has been received, then depending on the user input, the computing device can proceed to block 510 (or block 512). At 510, the process 500 can include a computing device determining that a particular classification or set of classifications (e.g., for an identified set of events) is correct or incorrect, based on received user input. For example, in some cases, a user input specifying that a particular classification is incorrect for one or more events can cause a computing device to apply an incorrect validity determination (or remove the previous classification) for other similar events (e.g., all other events having the common barcode information, the shared classification, and similar dimensional data). As a specific example, the selected events can all have an SBS classification and common barcode information, and the computing device can determine that the SBS classification is false for each of these events, based on the user input at 508 of process 500. In other cases, the computing device can determine that the particular classification for these events having common barcode information is correct. In this case, the computing device can proceed accordingly, including by applying or retaining a correct validity for the relevant classifications, or can prevent future classification evaluation for this particular classification for this particular common barcode information.

In some embodiments, after the classification has been evaluated at block 510, process 500 can proceed back to block 506 (or block 504). For example, when there are other classifications to evaluate, the computing device can proceed to present data to a user for evaluation of a different classification. In some embodiments, after the classification has been evaluated at block 510, process 500 can proceed to other process blocks discussed herein. For example, once user input has been used to evaluate a classification for a common barcode, a runtime determination of classification of validity under block 408 of FIG. 8 can proceed accordingly.

In some embodiments, identifying events for which validity of classifications should be evaluated can be based on factors other than those discussed above. For example, in some implementations, sets of events for further evaluation may be identified based on shared dimensional data, such as dimensions that match previously determined characteristic dimensional data that is associated with particular common barcode information.

Figure 17:
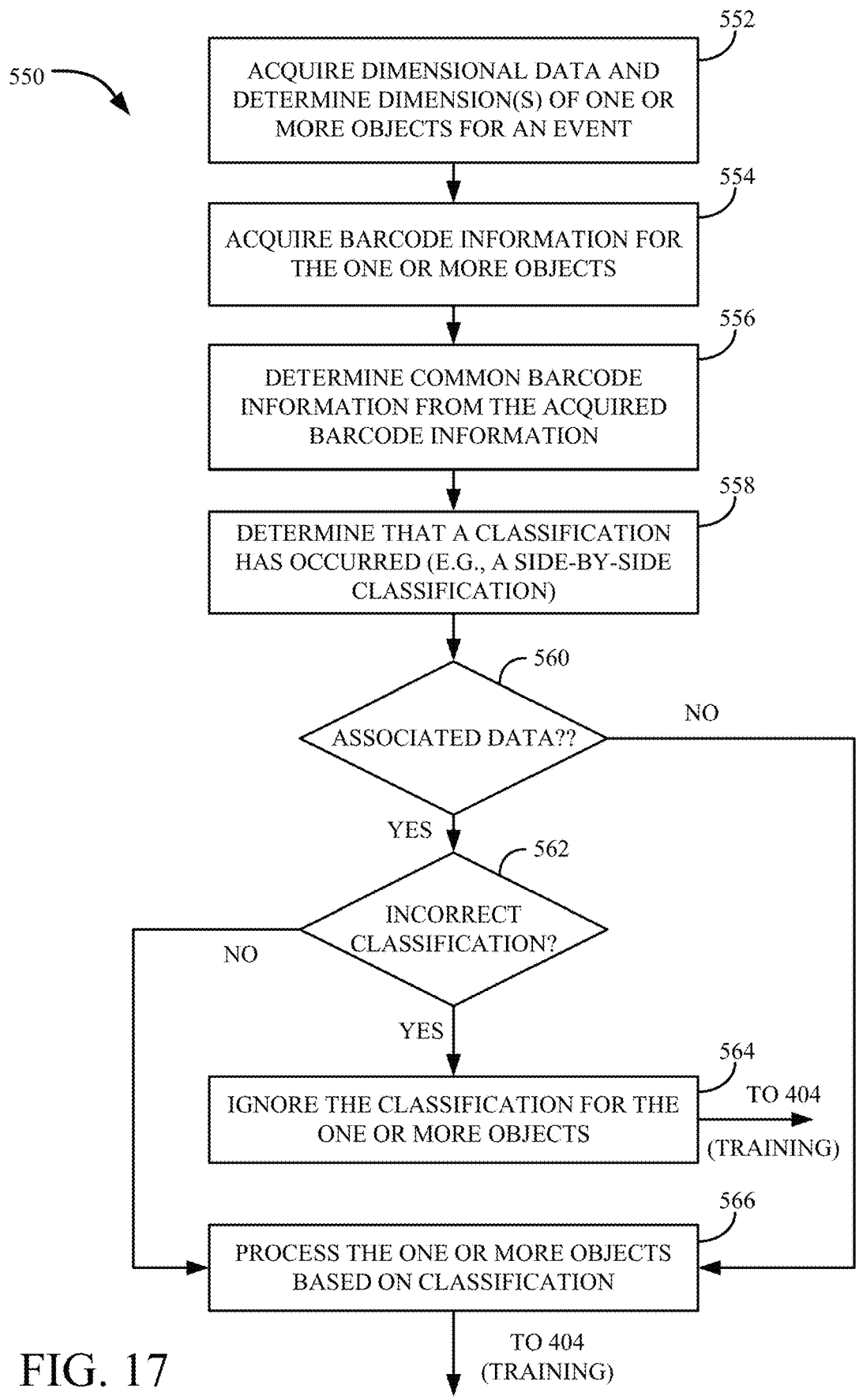
FIG. 17 shows a flowchart of a process for sorting objects using a sorting system.

FIG. 17 shows a flowchart of a process 550 for sorting objects using a sorting system. The process 550 can be implemented using various computing devices of various systems. For example, parts or all of process 550 can be implemented using a computing device of a sorting system, a server, etc. As a specific example, process 550 can be implemented on a runtime module of a computing device in communication with a sorting system (e.g., as a specific implementation of block 408 of the process 400).

At 552, process 550 can include a computing device obtaining dimensional data, e.g., using a dimensioner, of one or more objects for an event and determining dimensions of the one or more objects, based on the dimensional data. In some embodiments, block 552 can be similar to blocks 416, 418 of process 410. For example, the dimensioner can determine one or more dimensions of the one or more objects, such as a width, length, height, volume, etc.

At 554, the process 550 can include a computing device obtaining barcode information for the one or more objects of the event. In some embodiments, block 554 can be similar to blocks 412, 412 of process 410. For example, each barcode of the one or more objects of the event can be scanned, and decoded to extract the common barcode information from each barcode.

At 556, the process 550 can include a computing device determining common barcode information from the obtained barcode information. In some cases, the obtained barcode information has a unique portion, such as a product code, which can be the common barcode information. In other cases, the common barcode information can be the obtained barcode information (e.g., the entire barcode data string).

At 558, the process 550 can include a computing device determining that a classification has occurred for the event. In some cases, a classification can be determined based on dimensional data or barcode information (e.g., as also described above). In some cases, the classification is an SBS classification. In some cases, there can be more than one classification that is determined for this event (e.g., an SBS classification, and a stacked classification).

At 560, the process 550 can include a computing device determining whether or not there is characteristic dimensional data associated with the common barcode information. In some embodiments, the computing device can use the determined common barcode information to query a table stored in memory to determine whether the determined common barcode information is associated with any stored associated characteristic dimensional data. If the computing device determines that there are no matches for the determined common barcode information, the process 550 can proceed to 566 to process the object according to the classification(s). Alternatively, if the computing device determines that there is characteristic dimensional data associated with the determined common barcode information, the computing device can utilize this associated characteristic dimensional data to evaluate the validity of the classification.

For example, At 562, process 500 can include a computing device determining whether or not the determined classification is incorrect. For example, the computing device can compare one or more of the determined dimensions (e.g., at 552 of process 550) with the associated characteristic dimensional data that shares common barcode information with the event. If the one or more determined dimensions appropriately match the characteristic dimensional data (e.g., are within the relevant dimensional thresholds), the computing device can determine that the event is incorrect (e.g., the event is a false SBS exception) and the process 550 can proceed to block 564. Alternately, if the one or more determined dimensions do not appropriately match the characteristic dimensional data (e.g., exceed the thresholds defined by the associated characteristic dimensional data), then the computing device can determine that the classification is correct and the process 550 can proceed to 566.

In some cases, such as when the event has more than one classification, each of the classifications can be separately evaluated by the computing device, and if the dimensional data for both classifications are within their particular thresholds, the computing device can determine that an exception has occurred and process 550 can proceed to 564. Alternatively, if one classification is determined by the computing device to be correct, while the other classification is determined by the computing device to be incorrect, the computing device can proceed to 566 and only utilize the exception that was determined to be incorrect. In other words, the computing device can adjust routing of the object to no longer be dependent on the incorrect classification.

At 564, the process 550 can include a computing device ignoring the classification (e.g., an SBS classification) for the one or more objects of the event. In some cases, this can include reverting the routing of the object to a previous destination, thus overriding a prior change based on the incorrect classification. In some embodiments, this can include the computing device removing a previously applied classification. In other cases, this can include the computing device applying an incorrect validity indicator to the event, so the computing device disregards and does not route the object according to the classification.

In some cases, ignoring a classification when processing an object can include allowing the object to travel unimpeded along a travel path (e.g., travel path 214 of FIG. 5) of a sorting system. In other cases, this can include not causing the object to be recirculated, not causing the object to change travel paths (e.g., conveyors), etc. In some configurations, this can include a computing device preventing a redirection device from moving the object as the object travels past the redirection device.

In some embodiments, data obtained during runtime evaluation of events, can be utilized to further train the computing device (or sorting system) for determining the validity of the same or other classifications. Thus, in some cases, process 550 (after block 564) can proceed generally to block 404 of process 400.

At 566, the process 550 can include a computing device processing the one or more objects of the event based on the classification. For example, this can include the computing device causing the object to be moved to a recirculation path, causing the object to be moved to a location for manual sortation by operators, etc. Similarly to block 564, the data obtained during this runtime evaluation can be utilized to further train a sorting system for determining the validity of the same or other classifications. Thus, in some cases, process 550 (after block 566) can proceed generally to block 404 of process 400.

As also noted above, in some embodiments, data obtained during runtime operation can be used to update characteristic dimensional (or other) data that is associated with relevant common barcode information. Thus, for example, obtained dimensional (or other) data for an initial event can inform characteristic dimensional (or other) data that can be used to evaluate a subsequent event that includes the same common barcode information.

Figure 18:
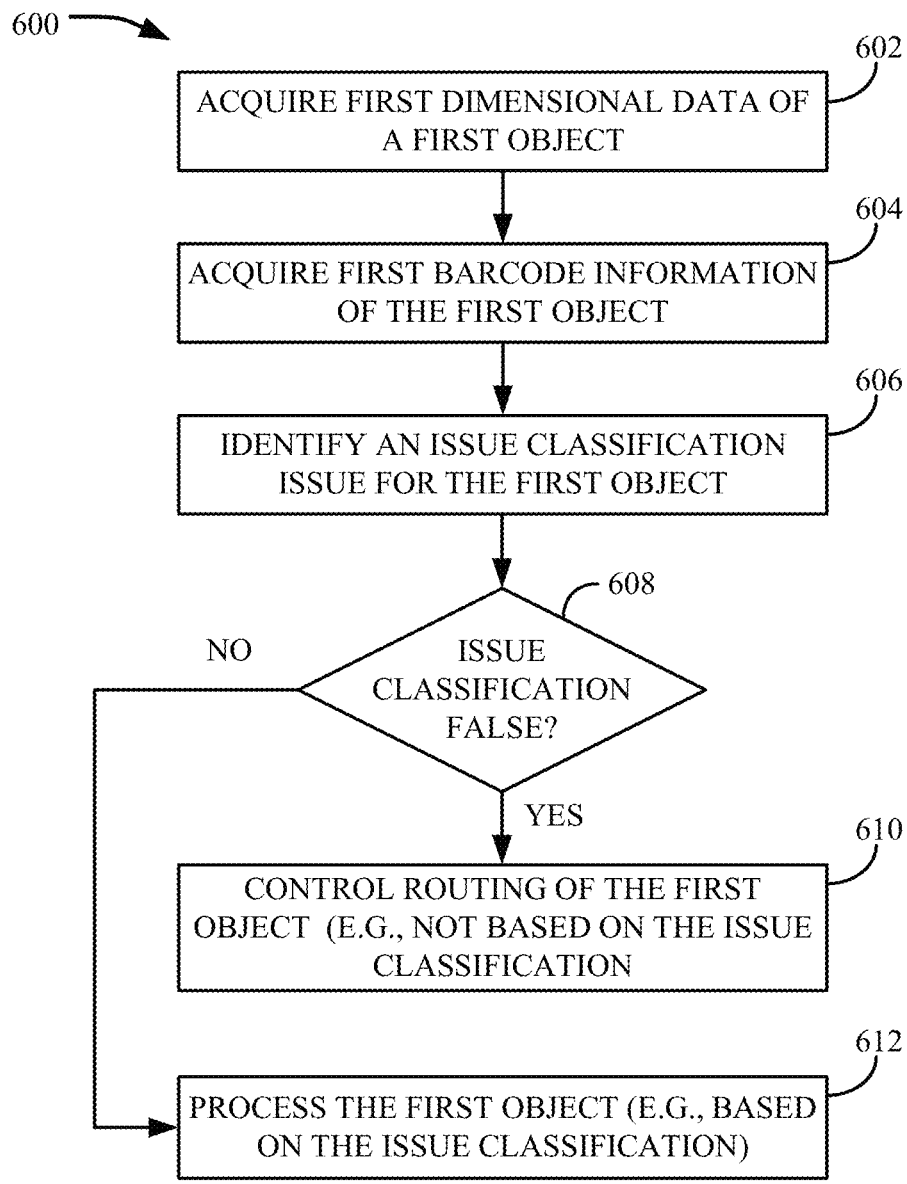
FIG. 18 shows a flowchart of a process for sorting one or more objects.

FIG. 18 shows a flowchart of a process 600 for sorting one or more objects, which can be implemented using any of the sorting systems described herein. In addition, the process 600 can be implemented using one or more computing devices, as appropriate.

At 602, the process 600 can include a computing device obtaining first dimensional data of a first object (e.g., as the first object travels through the transport system), which can be similar to the block 402 of the process 400. For example, the computing device can obtain the first dimensional data of the first object, as the object travels along a conveyor of the transport system (e.g., past, through, etc., the dimensioner). In some cases, the first dimensional data can include one or more dimensions of the first object, including, for example, a height of the first object, a width of the first object, a length of the first object, a volume of the first object.

At 604, the process 600 can include a computing device obtaining first barcode information of the first object, which can be similar to the block 412 (and the block 414) of the process 410. For example, the computing device can obtain the barcode information of the first object, as the first object travels along a conveyor of the transport system. In some cases, the barcode information can include a product code (e.g., a universal product code ("UPC")), which can be in the form of a data string (e.g., a numerical number, an alpha-numerical string, etc.).

At 606, the process 600 can include a computing device identifying an issue classification for the first object, which can be similar to the block 420 of the process 410, the block 558 of the process 550, etc. For example, this can include a computing device identifying an issue classification for the first object, based on the first dimensional data, or the first barcode information. As a more specific example, this can include a computing device identifying the issue classification for the first object, based on the presence of a gap within the first dimensional data. As another specific example, this can include a computing device identifying the issue classification for the first object, based on the presence of multiple different types of barcode information (e.g., different types of common barcode information) within the first barcode information, such as, for example, multiple different UPCs.

At 608, the process 600 can include a computing device identifying whether or not the issue classification is false (e.g., the issue classification identified at the block 606). If at the block 608, the computing device determines that the issue classification is false (e.g., the issue classification is actually incorrect), the process 600 can proceed to the block 610. However, if at the block 608, the computing device determines that the issue classification is true (e.g., the issue classification is actually correct), then the process 600 can proceed to the block 612.

At 610, the process 600 can include a computing device controlling routing of the first object (e.g., which is not based on the issue classification). For example, this can include a computing device ignoring the issue classification, removing the issue classification from being associated with the first object, etc. As another example, this can include moving the first object to a different second routing path within the transport system that is different than a first routing path of the transport system. For example, a computing device can cause a redirection device (e.g., an actuator) to move (e.g., physically move by contacting the first object) the first object off a first conveyor (e.g., defining the first routing path, which can be a recirculation path) to a second conveyor (e.g., defining the second routing path). In some cases, this can include preventing recirculation of the first object through the transport system (e.g., preventing recirculation, based on the identified issue classification).

At 612, the process 600 can include a computing device controlling routing of the first object (e.g., based on the issue classification). For example, this can include a computing device using the issue classification to route the first object (e.g., within the transport system), maintaining that the issue classification is associated with the first object, etc. In some configurations, this can include moving the first object to a different second routing path within the transport system that is different than a first routing path of the transport system. For example, a computing device can cause a redirection device (e.g., an actuator) to move (e.g., physically move by contacting the first object) the first object off a first conveyor (e.g., defining the first routing path) to a second conveyor (e.g., defining the second routing path, which can be a recirculation path). In some cases, this can include causing the first object to be recirculated through the transport system (e.g., based on the identified issue classification).

In some embodiments, including when a recirculation device is positioned downstream of a symbol scanner (and a dimensioner), the blocks 602, 604, 606, 608 (and the block 610) can be implemented before the first object passes by the recirculation device. In this way, the first object can be correctly routed within the transport system by the recirculation device. In other words, the first object does not, as a default, have to be recirculated to allow time for the sorting system to evaluate the validity of the issue classification.

Figure 19:
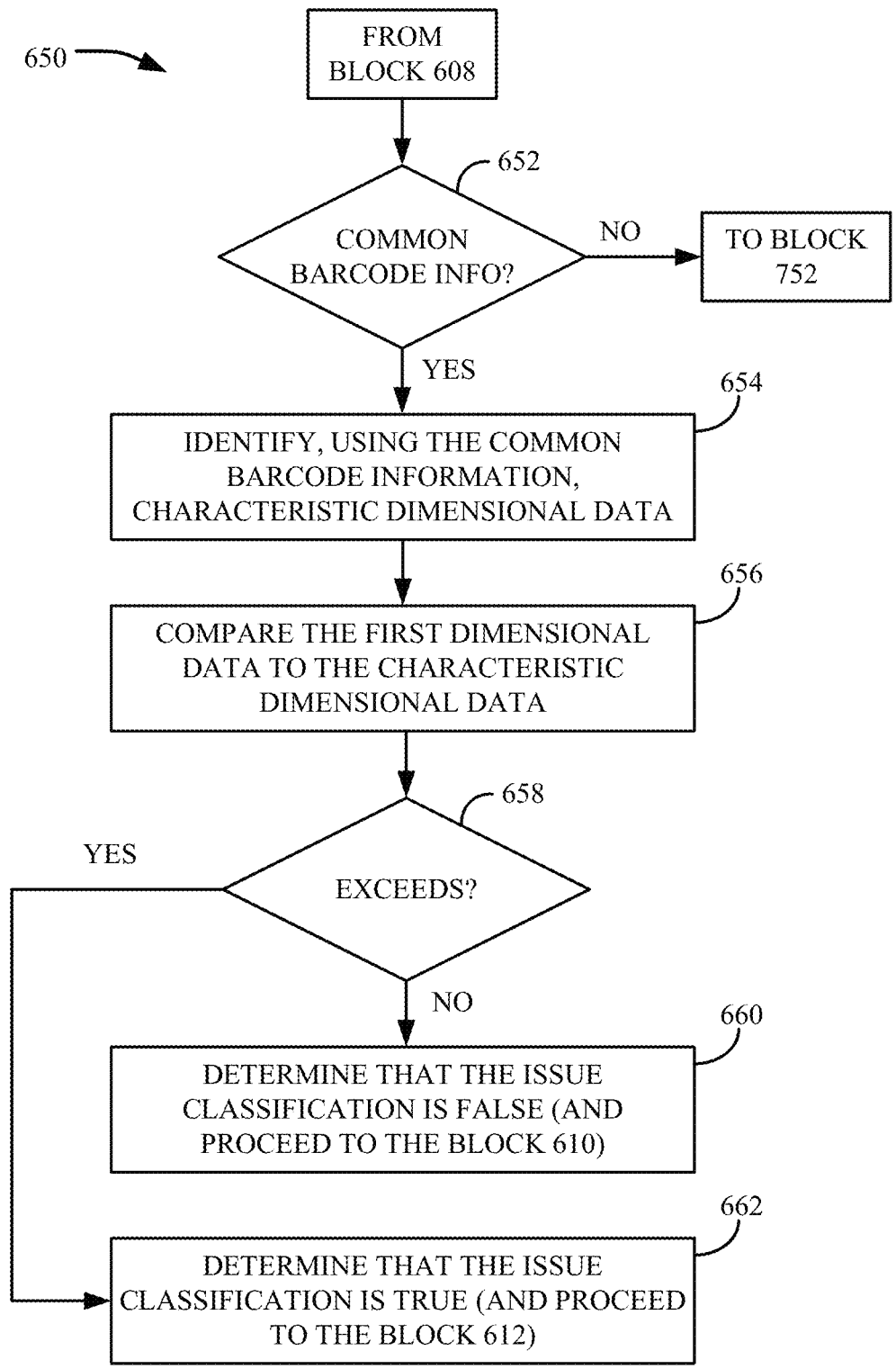
FIG. 19 shows a flowchart of a process for determining the validity of an issue classification.

FIG. 19 shows a flowchart of a process 650 for determining the validity of an issue classification, which can be a specific implementation of the block 608 of the process 600. The process 650 can be implemented using any of the sorting systems described herein, and can be implemented using one or more computing devices, as appropriate.

At 650, the process 650 can include determining whether or not the first object has common barcode information with a first type of object, which can be similar to the block 408 of the process 400, the block 556 of the process 550, etc. For example, the computing device can determine whether or not a portion of (or the entire) first barcode information matches with a portion of (or the entire) barcode information associated with a first type of object. As a more specific example, if a UPC of the first barcode information matches with a UPC associated with a first type of object (e.g., stored in a database), then the computing device can determine that the first object has common barcode information, and thus the first object is the first type of object. If, however, the first barcode information does not match any barcode information (e.g., within a database), then the computing device can determine that the first barcode information does not have common barcode information with a first type of object (or any other types of objects information of which is stored in the database). If at the block 652, the computing device determines that the first object does not have common barcode information with the first type of object (or any other type of object within the database), then the process 650 can proceed to the block 752 (e.g., to evaluate the validity of the issue classification in a different manner). If, however, at the block 652, the computing device determines that the first object has common barcode information with the first type of object, the process 650 can proceed to the block 654, which can include identifying the common barcode information of the first type of object.

At 654, the process 650 can include a computing device determining, using the common barcode information, characteristic dimensional data that is associated with the common barcode information, which can be similar to the block 558 of the process 550. In some cases, the characteristic dimensional data can include one or more dimensional thresholds (e.g., a length threshold, a width threshold, a height threshold, a volume threshold, etc.) that are associated with the common barcode information, and thus the first type of object.

At 656, the process 650 can include a computing device comparing the first dimensional data to the characteristic dimensional data. For example, this can include comparing one or more dimensions of the first object to one or more corresponding dimensional thresholds of the characteristic dimensional data indicative of the first type of object. As a more specific example, this can include comparing a width of the first object to a width threshold of the characteristic dimensional data. As another more specific example, this can include comparing a volume of the first object to a volume threshold of the characteristic dimensional data.

At 658, the process 650 can include a computing device determining whether or not the first dimensional data exceeds the characteristic dimensional data. For example, this can include a computing device determining whether or not the width of the first object exceeds the width threshold (e.g., a width range). If at the block 658, the process 650 determines that the first dimensional data is within the characteristic dimensional data (e.g., does not exceed the characteristic dimensional data, such as, for example, the width of the first object being within the width threshold), the process 650 can proceed to the block 660 to determine that the issue classification is false. If, however, at the block 658, the process 650 determines that the first dimensional data exceeds the characteristic dimensional data (e.g., the width of the first object is outside of the threshold), then the process 650 can proceed to the block 662 to determine that the issue classification is true.

At 660, the process 650 can include a computing device determining that the issue classification is false, and accordingly, the process 650 can proceed to the block 610. Correspondingly, at 662, the process 650 can include a computing device determining that the issue classification is true, and accordingly, the process 650 can proceed to the block 612.

Figure 20:
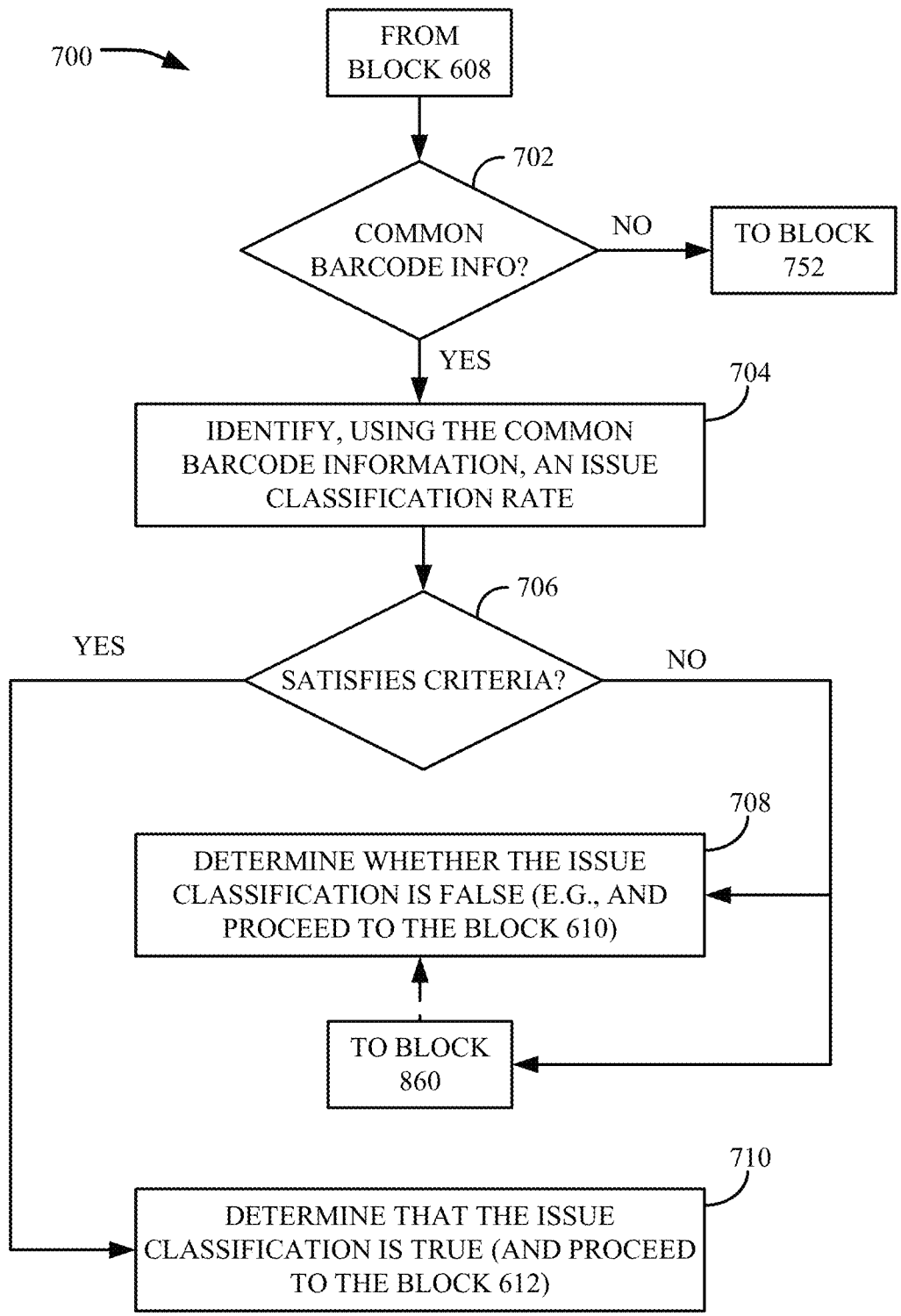
FIG. 20 shows a flowchart of another process for determining the validity of an issue classification.

FIG. 20 shows a flowchart of a process 700 for determining the validity of an issue classification, which can be a specific implementation of the block 608 of the process 600. The process 700 can be implemented using any of the sorting systems described herein, and can be implemented using one or more computing devices, as appropriate.

At 702, the process 700 can include a computing device determining whether or not the first object has common barcode information with a first type of object, which can be similar to the block 652 of the process 650. If at the block 702, the computing device determines that the first object does not have common barcode information, then the process 700 can proceed to the block 752 (e.g., to evaluate the validity of the issue classification in a different manner). If, however, the computing device determines that the first object has common barcode information with the first type of object, the process 700 can proceed to the block 704, which can include identifying the common barcode information of the first type of object.

At 704, the process 700 can include a computing device identifying, using the common barcode information, an issue classification rate associated with common symbol information (e.g., that is associated with the common barcode information). For example, for an issue classification for the first object of the first type as discussed above (or for other objects with common barcode information), the issue classification rate for a first type of issue classification can be the rate of identification of the first type of issue classification for of objects of the first type (or other objects with common barcode information), as can be expressed as a historical or current probability or frequency of the first type of issue classification for the relevant objects (e.g., as a proportion of the total handling rate of the relevant type(s) of objects). As a more specific example, for an SBS issue classification, a runtime issue classification rate for objects with common barcode information can indicate a rate of determination of a SBS issue classification for the objects with the common barcode information, as can be expressed, for example, as a ratio of the number of SBS issue classifications relative to the total number of events for the objects in which an SBS issue classification was possible (e.g., a total number of passes through a particular sorting system).

While some issue classification rates can be associated with common barcode information, some issue classification rates can be independent of the common barcode information or can selectively include a combined (e.g., mean) rate for multiple common barcodes. In some embodiments, a reference issue classification rate can indicate a global rate relative to a particular type of symbol, common symbol information, facility, operational period, or other category, For example, a reference issue classification can include a historical average rate of identification of a particular type of issue classification for an entire facility or portion thereof. As another example, the issue classification rate can be the current issue classification rate for a specific type of issue classification (e.g., a SBS issue classification), during a period of time for a sorting system (e.g., an hour, a day, a week, etc.), or for a number of objects.

Correspondingly, as also discussed below, determining whether a particular issue classification is true or false can include comparing a relevant (e.g., runtime) issue classification rate for the particular issue classification (or symbol information or object type) to a reference (e.g., global historical) issue classification rate. For example, in this way, if a particular issue classification rate during runtime of a system is relatively high (e.g., a rate for 100 objects of the same type or otherwise with common barcode information), then a sorting system can automatically determine that a subsequent similar issue classification (e.g., for the relevant common barcode information) is false and that the associated object should be routed accordingly (e.g., by ignoring the issue classification). In some cases, this issue classification rate can be iteratively updated for each object that passes through the sorting system. In this way, the current issue classification rate can be a running average of the issue classification rate for a subset of objects that are processed by the sorting system (e.g., objects of a particular type or with particular common barcode information), as may help to limit the memory or computational requirements, while allowing the tracking of relatively high influxes of issue classification rates.

In some configurations, an issue classification rate can be the rate of issue classifications for a specific type of issue classification for a total number of objects. For example, if every object (during a relevant period of time) has a SBS issue classification, then an SBS issue classification rate can be determined to be equivalent to 1 (or in other words 100 percent). As another example, if half of the objects (during the period of time) have an SBS issue classification, then an SBS issue classification rate can be determined to be equivalent to 0.5 (or 50 percent). Thus, in some cases, the issue classification can be an issue classification frequency (and the issue classification rate threshold is an issue classification frequency threshold), such as, for example, the frequency of the SBS issue classification for a number of objects (e.g., seen by the sorting system).

At 706, the process 700 can include a computing device determining whether or not the issue classification rate satisfies (e.g., exceeds) relevant criteria. For example, the criteria can include an issue classification rate threshold (e.g., for the first type of issue classification). As a more specific example, operations at 706 sometimes can include determining that the issue classification rate (e.g., a rate of SBS issue classifications per object of a first type) exceeds a threshold (reference) issue classification rate for the first type of issue classification (e.g., a rate of SBS issue classifications per object for all object types, or a subset thereof). In some embodiments, a reference issue classification rate can indicate a rate of true issue classifications (e.g., true SBS issue classifications). In some embodiments, a reference issue classification rate can indicate a rate of total issue classifications (e.g., SBS issue classifications) regardless of whether true.

In some embodiments, a computing device can determine an issue classification rate threshold based on a number of events, in which each event can have an issue classification of the first type of issue classification (e.g., a SBS issue classification), and each event can be of one or more different types of objects (e.g., two different types of objects). In this way, for example, if an uncharacteristically high rate of an issue exceeds a global average for the rate of those issues, the computing device can assume that the issue classification is likely false.

In some cases, if at the block 706, the computing device determines that the issue classification rate does not satisfy the criteria (e.g., exceeds a reference issue classification rate by at least a threshold value), then the process 700 can proceed to the block 708 to determine that the issue classification is false, including with similar operations as discussed relative to the block 660. In some cases, after determining that the issue classification rate does not satisfy the criteria, the computing device can escalate one or more particular events for further review. For example, as shown in FIG. 20, the method 700 can sometimes then proceed to block 860, as further discussed below, to assess the validity of a particular issue classification for one or more or objects or object types.

In some configurations, after the computing device determines that the issue classification rate does not satisfy the relevant criteria, then the process 700 can proceed to the block 860 (described below) to evaluate the validity of the type of issue classification for the common barcode information. In this way, for example, an uncharacteristically high rate of issue classifications can advantageously prompt further analysis, by, for example, a user that can visually evaluate an image of the object.

In some configurations, if at the block 706, the computing device determines that the issue classification rate satisfies the criteria (e.g., is within or does not exceed a threshold, etc.), then the process 700 can proceed to the block 710 to determine that the issue classification is true or can otherwise proceed with other operations (e.g., processing the object according to the issue classification, updating runtime and historical rate issue classification rates or dimensional data, etc.).

At 708, the process 700 can include a computing device determining that the issue classification is false, and accordingly, the process 700 can proceed to the block 610. Correspondingly, at 710, the process 700 can include a computing device determining that the issue classification is true, and accordingly, the process 700 can proceed to the block 612.

Figure 21:
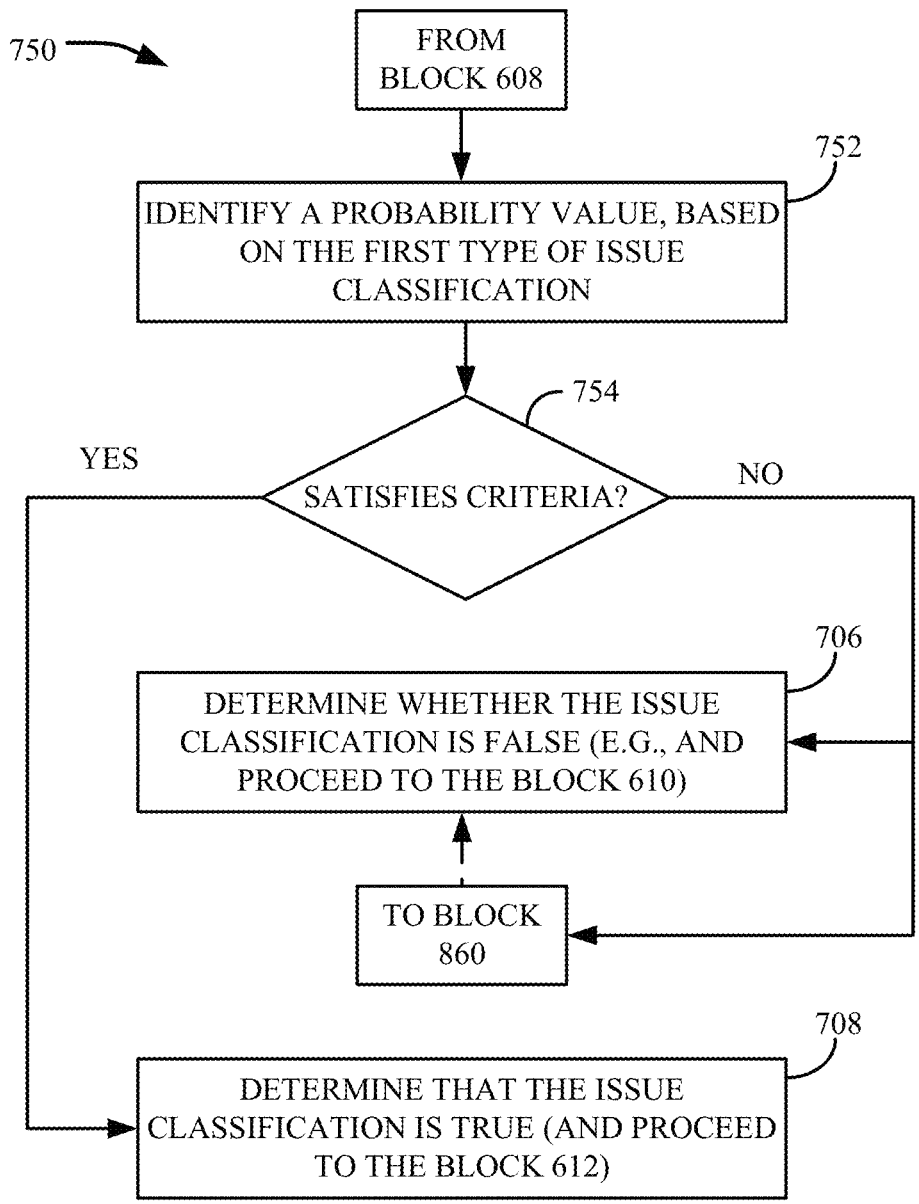
FIG. 21 shows a flowchart of another process for determining the validity of an issue classification.

FIG. 21 shows a flowchart of a process 750 for determining the validity of an issue classification, which can be a specific implementation of the block 608 of the process 600. The process 750 can be implemented using any of the sorting systems described herein, and can be implemented using one or more computing devices, as appropriate.

At 752, the process 750 can include a computing device identifying a probability value associated with a first type of issue classification (e.g., an SBS issue classification), in which the issue classification of the first object is the first type of issue classification (e.g., an SBS issue classification).

At 754, the process 750 can include a computing device determining whether or not the probability value satisfies (e.g., exceeds) criteria (e.g., whether or not the probability value exceeds a threshold probability value). For example, this can include determining that the probability value (e.g., corresponding to the likelihood or in other words confidence of the issue classification of the first type actually being true) being less than a threshold probability value (e.g., corresponding to the likelihood or in other words confidence of an issue classification of any type actually being true). In some cases, the threshold probability value can be the percentage of true issue classifications relative to the total number of issue classifications (e.g., or the percentage of false issue classifications relative to the total number of issue classifications). Correspondingly, the probability value can be the percentage of true issue classifications of the first type of issue classification relative to the total number of issue classifications of the first type of issue classification. In this way, a computing device can, as a quick preliminary analysis, assume that rare issue classifications are likely false, relative to the total number of issue classifications. In other words, the data for different types of issue classifications can be used to evaluate the validity of specific types of issue classifications, and in particular, the rare issue classifications.

In some cases, if at the block 754, the computing device determines that the probability value does not satisfy the criteria (e.g., exceeds a reference rate by at least a threshold value), then the process 750 can proceed to the block 706 to determine that the issue classification is false, including with similar operations as discussed relative to the block 660. For example, the computing device can determine that the issue classification is false, based on the probability value being less than a threshold probability value when the probability value and the threshold provability value are based on the likelihood that the issue classification is true. As another example, the computing device can determine that the issue classification is false, based on the probability value being greater than a threshold probability value when the probability value and the threshold provability value are based on the likelihood that the issue classification is false.

Alternatively, in some cases, if at the block 708, the computing device determines that the probability value does satisfy the criteria, then the process 750 can proceed to the block 708 to determine that the issue classification is true. For example, the computing device can determine that the issue classification is true based on the probability value being greater than a threshold probability value when the probability value and the threshold provability value are based on the likelihood that the issue classification is true. As another example, the computing device can determine that the issue classification is false, based on the probability value being less than a threshold probability value when the probability value and the threshold provability value are based on the likelihood that the issue classification is false.

In some configurations, and similarly to the process 700, in the process 750, if the computing device determines at the block 754 that the criteria has been satisfied, then the process 750 can proceed to the block 860. In other cases, after the computing device determines that the issue classification is false, the process 750 can proceed to the block 860.

At 706, the process 700 can include a computing device determining that the issue classification is false, and accordingly, the process 700 can proceed to the block 610. Correspondingly, at 708, the process 700 can include a computing device determining that the issue classification is true, and accordingly, the process 700 can proceed to the block 612.

Figure 22:
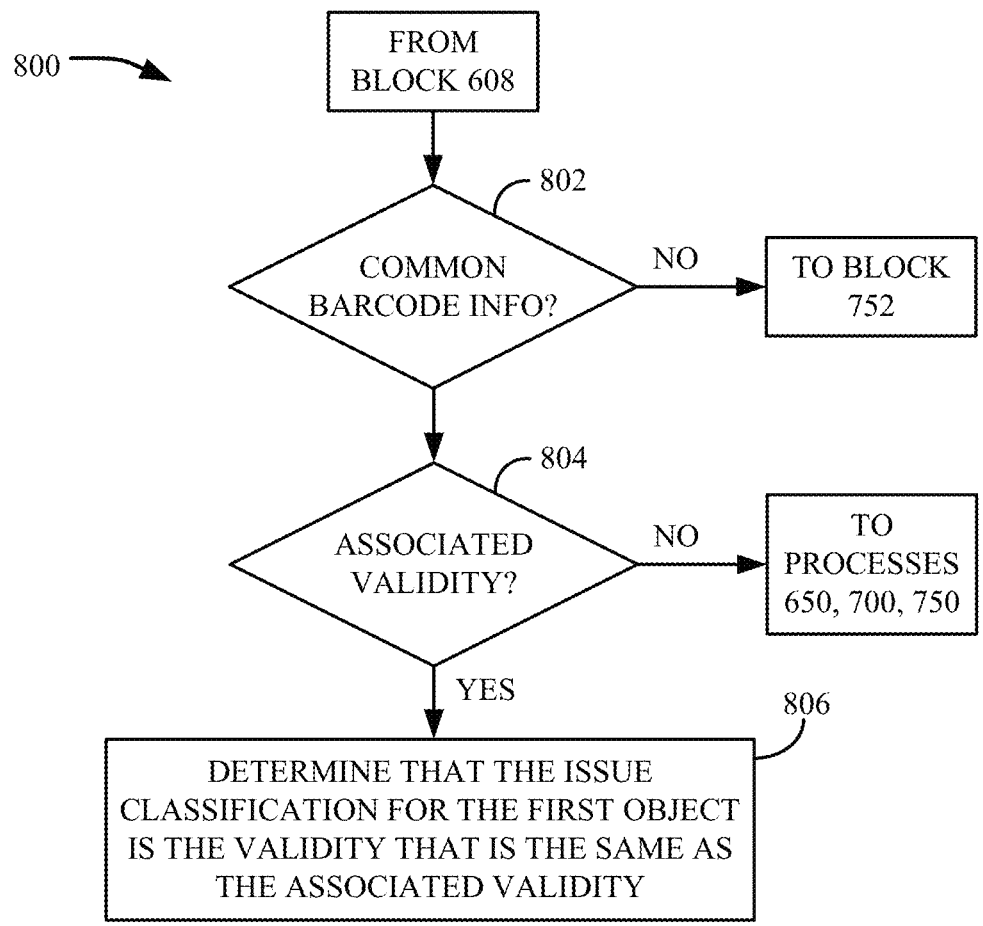
FIG. 22 shows a flowchart of another process for determining the validity of an issue classification.

FIG. 22 shows a flowchart of a process 800 for determining the validity of an issue classification, which can be a specific implementation of the block 608 of the process 600. The process 800 can be implemented using any of the sorting systems described herein, and can be implemented using one or more computing devices, as appropriate.

At 802, the process 800 can include a computing device determining whether or not the first object has common barcode information with a first type of object, which can be similar to the block 652 of the process 650. If at the block 802, the computing device determines that the first object has common barcode information with the first type of object, the process 800 can proceed to the block 804.

At 804, the process 800 can include a computing device determining whether or not the common barcode information for the first type of object is associated with a validity for the first type of issue classification, in which the issue classification of the first object is the same as the first type of issue classification. If at the block 804, the computing device determines that the common barcode information does have an associated validity for the first type of issue classification, then, the computing device can proceed to the block 806. If, however, at the block 806 the computing device determines that the common barcode information does not have an associated validity for the first type of issue classification, then the process 800 can proceed to any of the processes 650, 700, or 750 to determine the validity of the issue classification in a different manner.

At 806, the process 800 can include a computing device determining the validity of the issue classification is the same as the validity of the first type of issue classification associated with the common barcode information. For example, the computing device can determine that the issue classification is false, based on the issue classification being false for the first type of issue classification that is associated with the common barcode information. As another example, the computing device can determine that the issue classification is true, based on the issue classification being true for the first type of issue classification that is associated with the common barcode information. In this way, the computing device can, during runtime, leverage previous analysis for the same types of object that have the same barcode. In some embodiments, the first object can be routed according to the determined validify of the issue classification, after, for example, the block 806.

In some embodiments, with respect to the process 600, satisfying different criteria can lead to utilizing different issue classification determination methods (e.g., the processes 650, 700, 750, 800, etc.). For example, some validity determination processes can be more accurate than others, but can require more time, while other validity determination processes can be less accurate, but can be faster. Thus, different criteria can lead to utilizing different issue classification determination methods. As a more specific example, the process 650 can be more accurate (e.g., because comparing the characteristic dimensional data can have relatively small variabilities), but can require additional time (e.g., to query a database). Thus, in some cases, when a value of a type of object (e.g., the cost, the demand, etc.) exceeds a threshold, a more accurate validity determination process can be deployed. For example, a computing device can determine a cost that is associated with common barcode information (e.g., a cost associate with a UPC), can determine that the cost exceeds a threshold cost (e.g., $100), and based on the cost exceeding the threshold cost, the computing device can implement one of the processes 650, 700, 750, or 800.

Figure 23:
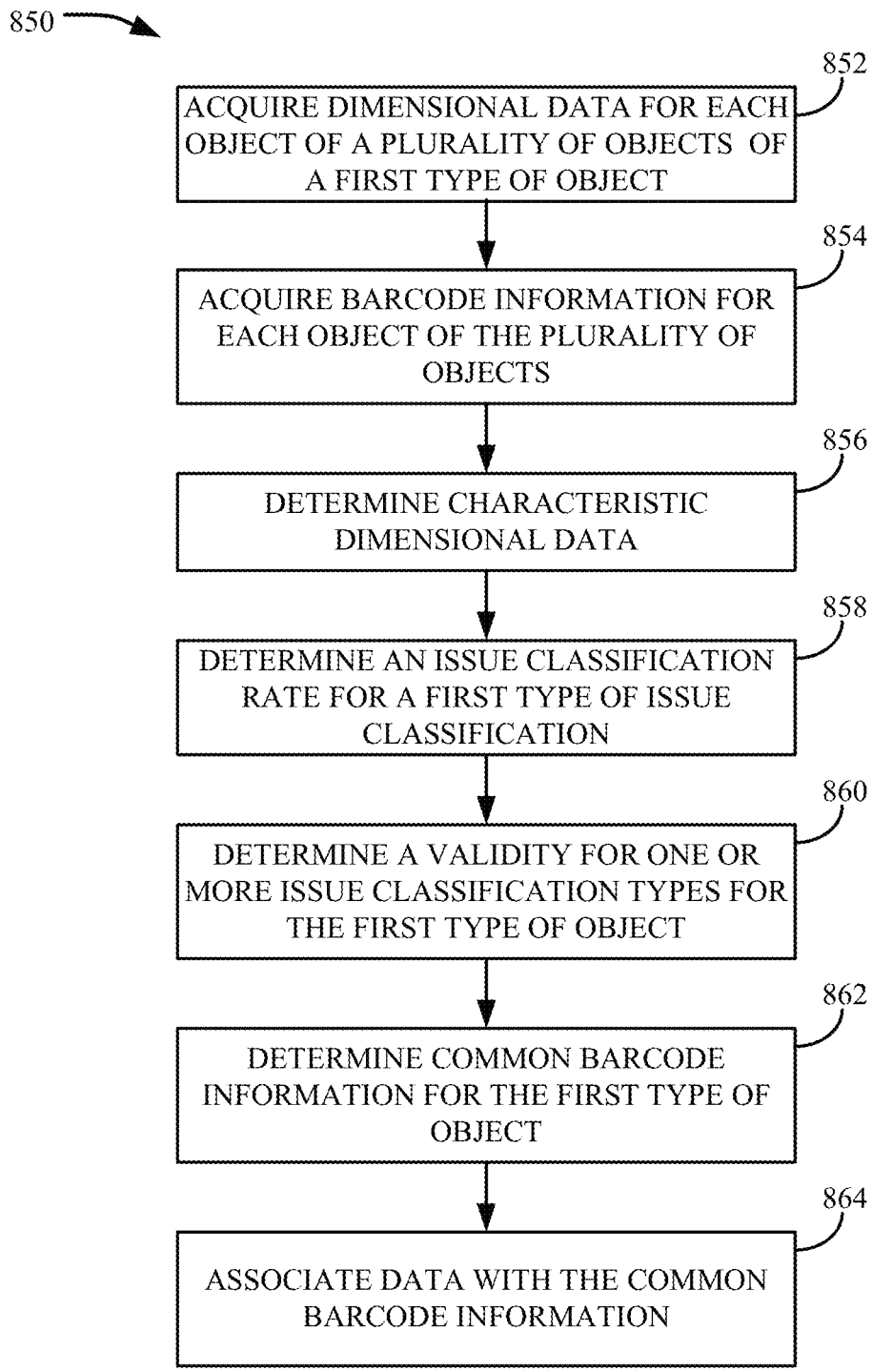
FIG. 23 shows a flowchart of a process for associating data for training a sorting system.

FIG. 23 shows a flowchart of a process 850 for associating data for training a sorting system, which can be implemented using any of the sorting systems described herein. In addition, the process 850 can be implemented using one or more computing devices, as appropriate.

At 852, the process 850 can include a computing device obtaining dimensional data for each object of a plurality of objects of a first type of object (e.g., using a dimensioner), which can be similar to the block 552 of the process 550.

At 854, the process 850 can include a computing device obtaining barcode information for each object of the plurality of objects (e.g., using a symbol scanner), which can be similar to the block 554 of the process 550.

At 856, the process 850 can include a computing device determining characteristic dimensional data using the dimensional data for each of the plurality of objects, which can be similar to the block 436 of the process 430. In some cases, the block 856 can include determining one or more dimensional thresholds, which can be based on a statistical model. For example, the statistical model can be generated using the dimensional data for each of the plurality of objects of the same type. As a more specific example, the statistical model can include a common dimension (e.g., the width) for the plurality of objects of the same type, and can be an average of the common dimension, a running average of the common dimension, etc. Then, a dimensional threshold can be determined by determining a standard deviation (centered around the average), a running standard deviation (centered around the running average), etc., to define the dimensional threshold. For example, the dimensional threshold can be the boundary defined by one or more standard deviations of the common dimension (e.g., the width) about the average of the common dimension. In this way, by using a running average (and running standard deviation), or by iteratively updating an average (and standard deviation), updating a dimensional threshold can be fast, as opposed to statistically analyzing all the data points in-depth (e.g., by generating a curve for determining a dimensional threshold).

At 858, the process 850 can include a computing device determining an issue classification rate for a first type of issue classification (e.g., a SBS classification). For example, this can include determining a number of false issue classifications of the first type of issue classification (e.g., from a user input) for the plurality of objects, determining a total number of the plurality of objects, and using the number of false issue classifications of the first type of issue classification and the total number of the plurality of objects to determine the issue classification rate for the first type of issue classification rate (e.g., by dividing the number of false issue classifications by the total number of the plurality of objects).

At 860, the process 850 can include a computing device determining a validity for one or more issue classification types for the first type of object. For example, the block 858 can occur after a previous plurality of objects (e.g., 50 objects) of the first type have been determined to have an issue classification. In some cases, this can include a computing device determining a validity for each issue classification type for the first type of object.

At 862, the process 850 can include a computing device determining common barcode information for the first type of object using the barcode information for each object of the plurality of objects. In some cases, the block 860 can be similar to the block 556 of the process 550.

At 864, the process 850 can include a computing device associating data (e.g., from the one or more of the blocks 856, 858, 860, etc.), with the common barcode information indicative of the first type of object. For example, this can include associating the characteristic dimensional data with the common barcode information (e.g., the UPC). As another example, this can include associating the issue classification rate for a first type of issue classification with the common barcode information. As yet another example, this can include associating the validity (e.g., the determined validity) for each issue classification type for the first type of object with the common barcode information. In some cases, with the data associated with the common barcode information, validity analysis of issue classifications can be more accurate.

Thus, the sorting systems and methods described above can improve the efficiency and throughput of a sorting system, while also mitigating (e.g., preventing) inaccuracies in classifications that could adversely influence downstream logistical operations.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

The invention claimed is:

1. A sorting system for use to control routing of objects within a transport system that includes a conveyor that supports and moves one or more objects for routing operations, the sorting system comprising:
   a dimensioner that is configured to obtain dimensional data of the one or more objects, as the one or more objects move along the conveyor;
   a barcode scanner that is configured to scan one or more barcodes of each of the one or more objects to obtain corresponding barcode information as the one or more objects move along the conveyor;
   one or more computing devices in communication with the dimensioner and the barcode scanner, the one or more computing devices being configured to:
   obtain, using the dimensioner, first dimensional data of a first object that moves along the conveyor;
   obtain, using the barcode scanner, first barcode information of the first object;
   identify, using the first dimensional data, or the first barcode information, an issue classification for the first object corresponding to a first routing path for the first object within the transport system;
   determine that the issue classification is false by:
      determining, using the first barcode information, that the first object has common barcode information with a first type of object;
      identifying characteristic dimensional data associated with the common barcode information;
      comparing the first dimensional data with the characteristic dimensional data of the first type of object; and
      based on the comparing of the first dimensional data with the characteristic dimensional data, determining that the issue classification is false; and
   control routing of the first object within the transport system along the first routing path or a second routing path that is different from the first routing path, based on the issue classification for the first object having been determined to be false.

2. The sorting system of claim 1, wherein the characteristic dimensional data includes a dimension threshold, and wherein comparing the first dimensional data with the characteristic dimensional data includes:
   comparing a dimension of the first dimensional data to the dimension threshold; and
   based on the dimension of the first dimensional data being within the dimension threshold, determine that the issue classification is false.

3. The sorting system of claim 2, wherein the one or more computing devices are configured to:
   receive a respective common dimension for each of at least one object that is of the first type of object;
   generate, using the at least one respective common dimension for the at least one object, a statistical model for the common dimension; and
   determine the dimensional threshold using the statistical model of the dimension.

4. The sorting system of claim 3, wherein the at least one object that is of the first type of object is a plurality of objects of the first type, and
   wherein generating the statistical model includes as each object of the plurality of objects of the first type moves past the dimensioner, iteratively update a running average of the common dimension, and
   wherein the running average of the common dimension is based on a subset of the plurality of objects.

5. The sorting system of claim 1, wherein the one or more computing devices are configured to control the routing of the first object by at least one of:
   removing the issue classification for the first object;
   preventing recirculation of the first object through the transport system; or
   ignoring the issue classification for the first object relative to travel of the first object through the transport system.

6. The sorting system of claim 5, further comprising a redirection device that is positioned downstream of the dimensioner and the barcode scanner, the redirection device being configured to move the one or more objects to the second routing path from the first routing path, and
   wherein the one or more computing devices are configured to control the routing of the first object by preventing the redirection device from moving the first object to the second routing path, thereby allowing the first object to continue traveling along the first routing path on the conveyor past the redirection device.

7. The sorting system of claim 1, wherein the issue classification is a side-by-side classification.

8. The sorting system of claim 1, further comprising a redirection device that is positioned downstream of the dimensioner and the barcode scanner, the redirection device being configured to move the one or more objects to the second routing path from the first routing path, and
wherein the one or more computing devices are configured to:
determine the issue classification for the first object, and
determine the issue classification is false for the first object before the first object travels past the redirection device.

9. The sorting system of claim 8, with the conveyor configured to move the one or more objects along the conveyor at a speed of greater than or equal to 1 meter per second between the barcode scanner and the redirection device, wherein the one or more computing devices are configured to control routing by controlling the redirection device relative to the first object.

10. The sorting system of claim 1, wherein a computing device of the barcode scanner is configured to:
determine the issue classification for the first object, based on the first dimensional data, or the first barcode information;
determine that the issue classification is false; and
control routing of the first object within the transport system based on the issue classification for the first object having been determined to be false.

11. A method of sorting an object within a transport system, the method comprising:
receiving, with one or more processor devices, first dimensional data of a first object as the first object moves along a conveyor;
receiving, with the one or more processor devices, first barcode information of the first object as the first object moves along the conveyor;
identifying, with the one or more processor devices, an issue classification for the first object;
identifying, with the one or more processor devices, common barcode information included in the first barcode information, the common barcode information being associated with objects of a first type;
identifying, using the first dimensional data or the first barcode information, an issue classification for the first object that is a first type of issue classification;
identifying an issue classification rate associated with the common barcode information;
determining, with the one or more processor devices, that the issue classification is false, based on:
comparing the first dimensional data with characteristic dimensional data associated with the common barcode information;
comparing the issue classification rate to a threshold issue classification rate of the first type of issue classification; and
determining that the issue classification rate exceeds the threshold issue classification rate; and
controlling, with the one or more processor devices, a routing of the first object within the transport system based on the issue classification for the first object having been determined to be false.

12. The method of claim 11, wherein controlling the routing of the first object comprises at least one of:
removing the issue classification for the first object;
preventing recirculation of the first object through the transport system; or
ignoring the issue classification for the first object relative to travel of the first object through the transport system.

13. The method of claim 11, wherein the issue classification is a side-by-side classification.

14. The method of claim 11, wherein determining the issue classification is false for the first object occurs before the first object travels past a redirection device associated with the conveyor.

15. A sorting system for use to control routing of objects within a transport system that includes a conveyor that supports and moves one or more objects for routing operations, the sorting system comprising:
a barcode scanner that is configured to scan one or more barcodes of each of the one or more objects to obtain corresponding barcode information as the one or more objects move along the conveyor;
one or more computing devices in communication with the dimensioner and the barcode scanner, the one or more computing devices being configured to:
receive first dimensional data of a first object that moves along the conveyor;
receive, from the barcode scanner, first barcode information of the first object;
identify, using the first dimensional data, or the first barcode information, an issue classification for the first object corresponding to a first routing path for the first object within the transport system;
determine, using the dimensional data and the first barcode information, that the issue classification is false, based on the first dimensional data and by:
determining that the first barcode information includes common barcode information associated with a first type of object;
determining, using the common barcode information, a value of the first type of object;
determining that the value of the first object exceeds criteria;
based on the value of the first object exceeding the criteria, querying a database that has a validity for a type of issue classification that is associated with the common barcode information, the type of issue classification being the same type as the first issue classification;
based on the validity being false for the type of issue classification, determining that the first issue classification is false; and
control routing of the first object within the transport system along the first routing path or a second routing path that is different from the first routing path, based on the issue classification for the first object having been determined to be false.

16. The sorting system of claim 15, wherein the one or more computing devices are configured to control the routing of the first object by at least one of:
removing the issue classification for the first object;
preventing recirculation of the first object through the transport system; or
ignoring the issue classification for the first object relative to travel of the first object through the transport system.

17. The sorting system of claim 16, further comprising a redirection device that is positioned downstream of the barcode scanner, the redirection device being configured to move the one or more objects to the second routing path from the first routing path, and wherein the one or more computing devices are configured to control the routing of the first object by preventing the redirection device from moving the first object to the second routing path, thereby allowing the first object to continue traveling along the first routing path on the conveyor past the redirection device.

18. The sorting system of claim 15, wherein the issue classification is a side-by-side classification.

19. The sorting system of claim 15, further comprising a redirection device that is positioned downstream of the barcode scanner, the redirection device being configured to move the one or more objects to the second routing path from the first routing path, and wherein the one or more computing devices are configured to:

determine the issue classification for the first object, and determine the issue classification is false for the first object before the first object travels past the redirection device.

20. The sorting system of claim 19, with the conveyor configured to move the one or more objects along the conveyor at a speed of greater than or equal to 1 meter per second between the barcode scanner and the redirection device, wherein the one or more computing devices are configured to control routing by controlling the redirection device relative to the first object.

* * * * *